(12) United States Patent
Platt et al.

(10) Patent No.: US 12,073,362 B2
(45) Date of Patent: Aug. 27, 2024

(54) SYSTEMS, DEVICES AND METHODS FOR CREATING A COLLABORATIVE VIRTUAL SESSION

(71) Applicant: vSpatial, Inc., Prosper, TX (US)

(72) Inventors: Richard B. Platt, Prosper, TX (US); John G. Goodman, Springville, UT (US); R. Daniel Platt, Prosper, TX (US); David L. Swanson, Orem, UT (US); Son Thanh Tran, Dallas, TX (US)

(73) Assignee: VSPATIAL, INC., Prosper, TX (US)

(*) Notice: Subject to any disclaimer, the term of this patent is extended or adjusted under 35 U.S.C. 154(b) by 0 days.

(21) Appl. No.: 17/815,029

(22) Filed: Jul. 26, 2022

(65) Prior Publication Data

US 2023/0051795 A1 Feb. 16, 2023

Related U.S. Application Data

(63) Continuation of application No. 17/302,384, filed on Apr. 30, 2021, now Pat. No. 11,403,595, which is a
(Continued)

(51) Int. Cl.
*G06Q 10/10* (2023.01)
*G06F 3/01* (2006.01)
(Continued)

(52) U.S. Cl.
CPC .......... *G06Q 10/103* (2013.01); *G06F 3/011* (2013.01); *H04L 65/1069* (2013.01); *H04L 65/4053* (2013.01); *G06F 3/0481* (2013.01)

(58) Field of Classification Search
CPC .............. G06Q 10/103; H04L 65/1069; H04L 65/4053; G06F 3/011; G06F 3/0481
See application file for complete search history.

(56) References Cited

U.S. PATENT DOCUMENTS

| 6,672,961 B1* | 1/2004 | Uzun ...................... A63F 13/30 463/31 |
| 2008/0309675 A1* | 12/2008 | Fleury .................... G06T 17/00 345/581 |

(Continued)

*Primary Examiner* — Eric J. Bycer
(74) *Attorney, Agent, or Firm* — Boisbrun Hofman, PLLC

(57) ABSTRACT

Disclosed are systems, including client devices and servers, and methods for creating a collaborative virtual session between client devices, wherein each of the client devices is associable with a coupler agent for interfacing with a communicating entity (such as a person). A client device includes a processor and memory operable to: generate a locally instantiated virtual room; instantiate a virtual representation of a first entity associated with the client device in the locally instantiated virtual room; transmit metadata representative of the first entity to a second client device; receive metadata representative of a second entity associated with the second client device; and, instantiate a virtual representation of the second entity as a function of the received metadata, from a perspective of the first entity, in the locally instantiated virtual room. A server can be utilized to join the client devices in the collaborative virtual session and exchange the metadata.

20 Claims, 41 Drawing Sheets

Related U.S. Application Data continuation of application No. 16/337,524, filed as application No. PCT/US2018/018569 on Feb. 18, 2018, now Pat. No. 10,997,558.

(60) Provisional application No. 62/461,102, filed on Feb. 20, 2017.

(51) Int. Cl.
*G06F 3/0481* (2022.01)
*H04L 65/1069* (2022.01)
*H04L 65/4053* (2022.01)

(56) References Cited

U.S. PATENT DOCUMENTS

| | | | | |
|---|---|---|---|---|
| 2009/0199090 A1* | 8/2009 | Poston | ................. | G06F 16/907 707/999.102 |
| 2009/0254843 A1* | 10/2009 | Van Wie | ............... | H04L 67/131 707/999.005 |
| 2009/0263777 A1* | 10/2009 | Kohn | ....................... | G09B 7/00 434/350 |
| 2011/0055919 A1* | 3/2011 | Hamilton | ................ | A63F 13/12 715/757 |
| 2011/0161837 A1* | 6/2011 | Betzler | .................. | G06Q 10/10 715/757 |
| 2012/0204118 A1* | 8/2012 | Lefar | .................. | G06F 3/04883 715/756 |
| 2014/0053086 A1* | 2/2014 | Kim | .................... | H04N 1/32106 715/753 |
| 2014/0082526 A1* | 3/2014 | Park | ....................... | H04L 65/403 715/757 |
| 2014/0096036 A1* | 4/2014 | Mohler | .................. | G06Q 10/10 715/753 |
| 2016/0072862 A1* | 3/2016 | Bader-Natal | ............. | H04N 7/15 715/755 |
| 2016/0378861 A1* | 12/2016 | Eledath | .................. | G06V 20/52 707/766 |
| 2017/0237940 A1* | 8/2017 | Chaney | .................. | H04N 7/142 348/14.07 |
| 2017/0339372 A1* | 11/2017 | Valli | ..................... | G06T 15/005 |
| 2018/0232934 A1* | 8/2018 | Schmidt | ................. | G06Q 10/10 |

\* cited by examiner

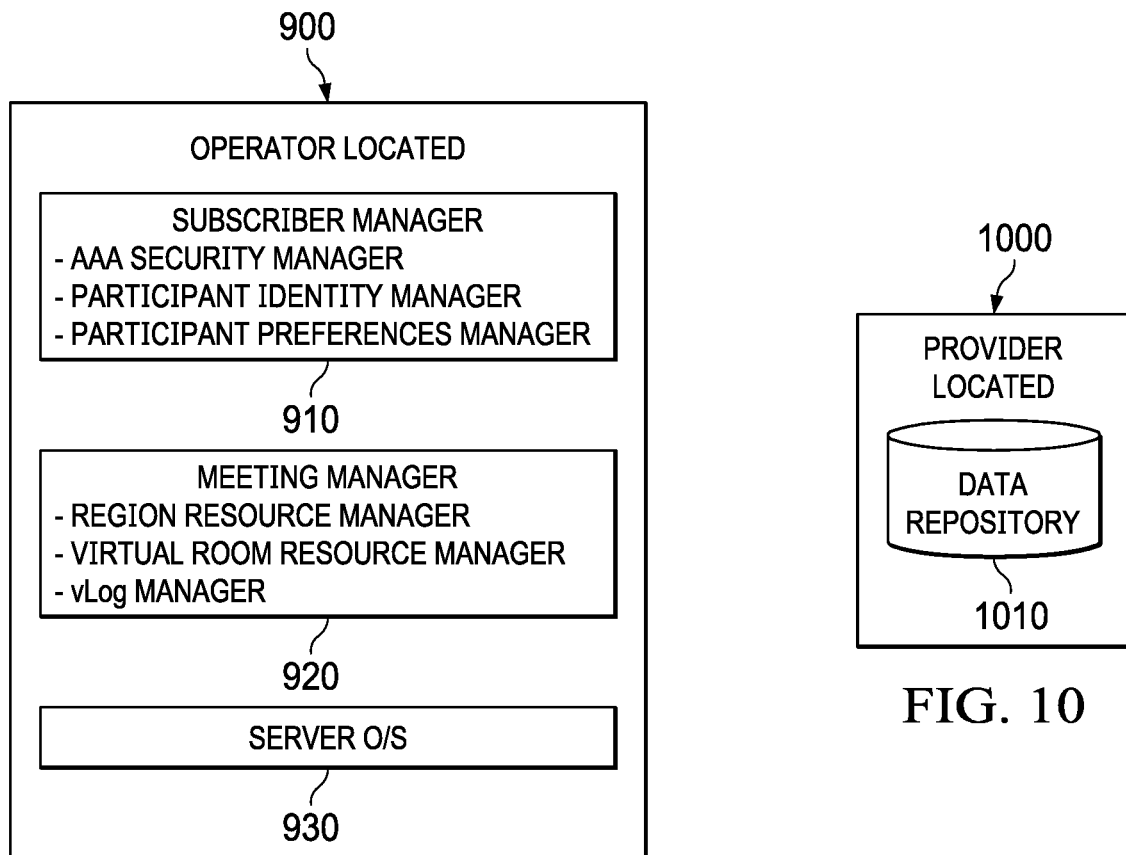
FIG. 9
FIG. 10
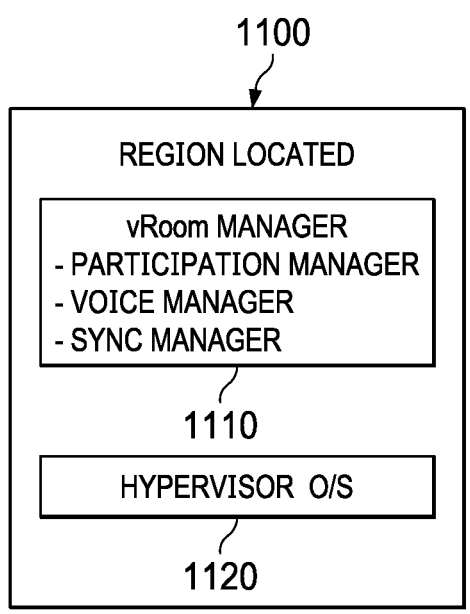
FIG. 11

FIG. 15

Quick Login

| Passcode | Login |

Free Signup

| Email... |

| Password | Reenter Password |

| Display Name (First Last) |

| MeetingID (For Meeting Invites) |

| Gender ∨ | BirthYr | Passcode |

| English ∨ | ☑ I accept vSpatial's Terms and Privacy Policy. |

Password Login

| Email... |

| Password |

| Login |

| Register | Test | GuestMale |

Status

| ` | 1 | 2 | 3 | 4 | 5 | 6 | 7 | 8 | 9 | 0 | - | = | Backspace |
| Tab | q | w | e | r | t | y | u | i | o | p | [ | ] | Return |
| Caps Lock | a | s | d | f | g | h | j | k | l | ; | ' | # | |
| Shift | \ | z | x | c | v | b | n | m | . | , | / | Shift | |
| Ctrl | Win | Alt | | AltGr | Menu | Ctrl |

FIG. 16

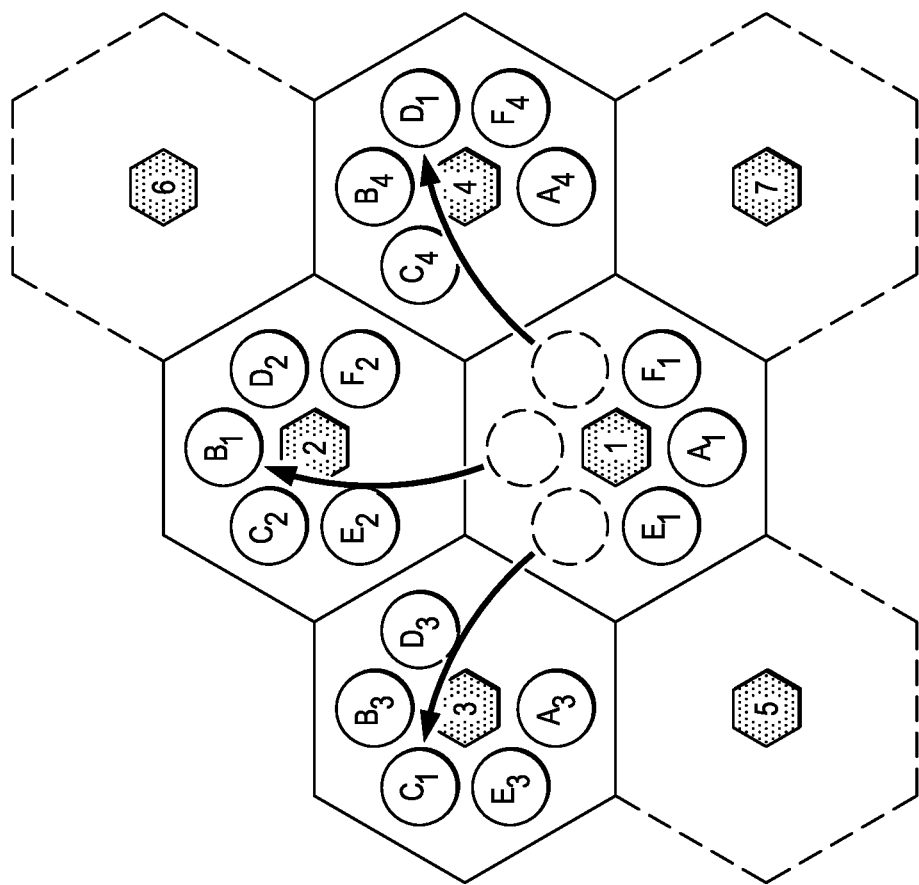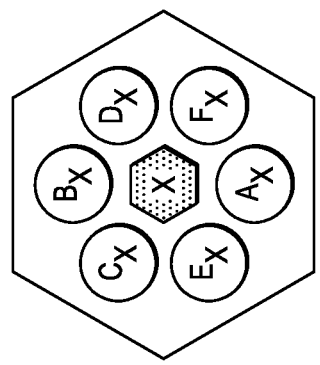
FIG. 21

SYSTEMS, DEVICES AND METHODS FOR CREATING A COLLABORATIVE VIRTUAL SESSION

RELATED APPLICATIONS

This application is a continuation of U.S. patent application Ser. No. 17/302,384, entitled "DEVICES AND METHODS FOR CREATING A COLLABORATIVE VIRTUAL SESSION," filed on Apr. 20, 2021 (which issued as U.S. Pat. No. 11,403,595 on Aug. 2, 2022), which is a continuation of U.S. patent application Ser. No. 16/337,524, entitled "SYSTEM AND METHOD FOR CREATING A COLLABORATIVE VIRTUAL SESSION," filed on Mar. 28, 2019 (which issued as U.S. Pat. No. 10,997,558 on May 4, 2021), which claims the benefit of PCT Application No. PCT/US2018/018569, entitled "SYSTEM AND METHOD FOR CREATING A COLLABORATIVE VIRTUAL SESSION," filed Feb. 18, 2018, which claims the benefit of U.S. Provisional Application No. 62/461,102 entitled "SYSTEM AND METHOD FOR CREATING A COLLABORATIVE VIRTUAL SESSION," filed Feb. 20, 2017, each of which is incorporated herein by reference.

TECHNICAL FIELD

The present invention is directed, in general, to the communication systems and, more specifically, to systems, devices and methods for creating a collaborative virtual session.

BACKGROUND

In the new business environment, employees operating and communicating in nontraditional office spaces such as conference rooms, shared cubicles, hotel rooms, and home offices have become a common business norm. A characteristic of the new office environment is a need to provide collaborative processes among a number of persons addressing a common task. Thus, a number of persons collectively operating on common tasks now depend on sharing computer data files as well as verbally and visually communicating in real time. Organizations have responded to these needs by employing cloud storage systems that provide remote and simultaneous communication and/or collaboration for participation by a number of individuals that are not necessarily collocated.

Current state-of-the-art systems for remote communication and/or collaboration are typically constructed with a network voice system that optionally includes a network video system (e.g., video conferencing), and a network collaboration system (e.g., a shared computer screen). These current state-of-the-art systems for remote communication and/or collaboration share information, but lack an immersive quality of in-person communication and/or in-person collaboration.

In-person communication and/or collaboration is often advantageous over remote communication and/or collaboration because it allows the communicating persons to select an appropriate, accessible venue as well as tools for their communication and/or collaboration. Sometimes the most appropriate venue for communication and/or collaboration is a board room. At other times, it is a conference room, war room, huddle room, auditorium or library. During in-person communication and/or collaboration, communicating entities use tools such as whiteboards, projectors, monitors, and table tops as a physical shared space and computers and/or notebooks for a more limited personal space.

Entities dependent on communication have long sought a venue replicating the benefits of in-person communication and/or collaboration, while eliminating or at least mitigating the need for travel. Systems for remote communication and/or collaboration convey shared information, but lack the immersive quality of in-person communication and/or collaboration, namely, the ability to customize the ideal venue and tools for the contemplated communication and/or collaboration.

Hence, there is a need for an improved form of remote communication and collaboration that can provide an immersive quality while saving the expenses of time and money. The system should also work in combination with data-sharing systems and solutions. It is highly desirable, therefore, to develop a system and method for remote communication that can provide both simultaneous sharing of data files and other digital objects as well as the benefits of face-to-face contact, while preserving private spaces of each party. A system that addresses the aforementioned needs can enhance current collaborative needs, and provide a substantial increase in employee efficiency as well as a reduction in the inherent expenses and delays associated with physical travel.

SUMMARY

The foregoing problems are generally solved or circumvented, and technical advantages are generally achieved, by advantageous embodiments of the present invention. Disclosed are systems, including client devices and servers, and methods for creating a collaborative virtual session between two or more client devices, wherein each of the client devices is associable with a coupler agent for interfacing with a communicating entity (such as a person). A client device, in accordance with the inventive principles, comprises at least one processor and at least one memory, the memory containing instructions whereby, when executed by the processor, the client device is operable to: generate a locally instantiated virtual room; instantiate a virtual representation of a first entity associated with the client device in the locally instantiated virtual room; transmit metadata representative of the first entity to the second client device; receive metadata representative of the second entity from the second client device; and, instantiate a virtual representation of the second entity as a function of the received metadata, from a perspective of the first entity, in the locally instantiated virtual room. A server, intermediate to the client devices, can be utilized to join the client devices in the collaborative virtual session and exchange the metadata.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIGS. 9 to 11 illustrate block diagrams of embodiments of servers;

FIGS. 15 and 16 illustrate screen shots of embodiments of registration/login screens associated with a virtual access room;

FIG. 21 illustrates a top view of an embodiment of a collaborative virtual room demonstrating the scalability of a virtual meeting;

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

Figure 1:
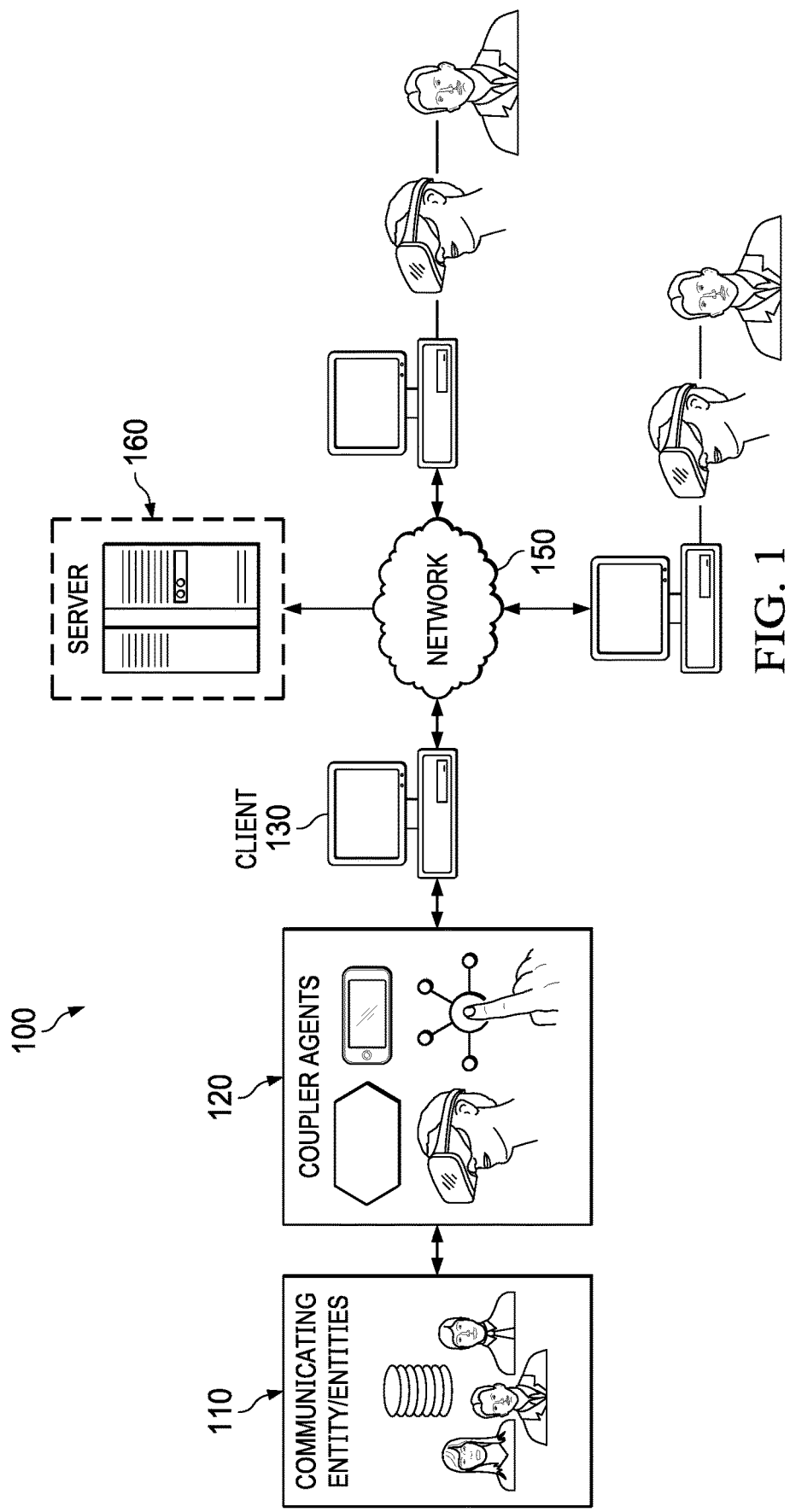
FIGS. 1 to 3 illustrate system level diagrams of embodiments of communication systems.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with a system and method for creating a collaborative virtual session.

A system will be described herein with respect to exemplary embodiments in a specific context, namely, a communication system operable with a plurality of clients for immersive, remote communication and/or collaboration between remotely entities. While the principles will be described in the environment of an internet communication system coupled over a wide-area network, any environment such as a wired or wireless local communication system that may benefit from such a system and method that enables these functionalities is well within the broad scope of the present disclosure.

There are several classes of meetings including many-to-many (typical collaborative meetings between two or more individuals), one-to-many (typical of conferences, classrooms, etc.), one-to-one (a derivative of the many-to-many where "many" equals one), one-to-data (an interactive session between an individual with datasets including artificial intelligence ("AI")), and many-to-data (an interactive session between multiple individuals with data sets including AI). The system as described herein can facilitate any one of these types of "meetings" in an immersive and collaborative manner.

There are also many types of meetings such as an in-person meeting (two or more people located at the same physical site), virtual reality ("VR") meeting (multiple sites with at least one person communicating via a virtual reality (or virtual) session), a hybrid video conferencing (VC") meeting (at least one collocated person communicating with at least one remote site via video conferencing), and remote video conferencing meeting (multiple sites including at least one person each communicating via a video conferencing session). While in-person meetings are beneficial, virtual meetings have the ability to create "virtual" collaboration objects instantly and without cost. Virtual zooming (viewing the outside of an object and then zooming to the inside to increase comprehension of the inner-workings) is possible in a virtual meeting, but not in an in-person meeting.

The following TABLE 1 summarizes the advantages of the different types of meetings.

TABLE 1

| Quality | In-person | Virtual Reality | Hybrid VC | Remote VC |
| --- | --- | --- | --- | --- |
| Immersion | Excellent | Excellent | Mediocre | Poor |
| Speech (voice) | Excellent | Excellent | Excellent | Mediocre |
| Timeliness | Poor | Excellent | Mediocre | Excellent |
| Collaboration | Excellent | Excellent | Mediocre | Poor |
| Simplicity | Excellent | Excellent | Mediocre | Poor |
| Cost | Poor | Excellent | Mediocre | Excellent |
| Information Sharing | Mediocre | Excellent | Excellent | Excellent |
| Body Language | Excellent | Mediocre | Excellent | Mediocre |

Of course, the importance of these attributes is meeting dependent, for instance, a lecture may prioritize information sharing over collaboration. The virtual reality system takes advantage of many of the more important attributes of remote conferencing systems.

Traditionally, remote conferencing systems process voice, video and data and connect to remote sites through network protocols that reduce latency many times at the expense of bandwidth. Voice and video are synchronized together. Some higher end video conference systems employ custom rooms to create a sense of "being there" by making rooms identical in lighting, color and furniture with video monitors of sufficient size to match actual body size.

The VR system as described herein differs significantly from traditional communication systems. In essence, it immerses the participant in a software created virtual world and connects the participant to other participants (entities) as if they were located in the same physical space. Additionally, it not only enhances collaborative interaction as if the participants were together, but also provides collaborative operations that are not possible in physical space (such as shrinking all participants to a size that permits collaboration inside of objects such as a virtual representation of a microcircuit).

Of particular note is the difference between the rooms of traditional systems and those of the VR system. A traditional system by definition includes multiple and disparate rooms in which the participants are located. The VR system may include a virtual room where the personas (or virtual representations) of the participants are instantiated, thereby providing the immersive feeling that all the participants are together. Additionally, the VR system (because of its virtual nature) provides each participant with the preferable (e.g., optimum) view and experience as if they were located in the best position with all the collaborative components arrayed directly in front of them (this is not possible in the physical world nor in traditional systems).

The following TABLE 2 summarizes several of the main differences between traditional video conference systems and the VR system.

sometimes necessary, but the default choice is to cover the most common scenarios (e.g., the private zone where one interacts with settings or files would by default cause a muting of the voice when the participant or entity turns towards a private space).

Turning now to FIG. 1, illustrated is a system level diagram of an embodiment of a communication system 100. The communication system 100 such as a VR system includes a plurality of entities (one of which is a first entity designated 110) communicating via a network 150 to a server 160. The first entity 110 is physically connectable to a coupler agent 120, which is coupled to a client 130.

The communication system 100 includes both user and network components. The user components create an immersive experience for the first entity 110 through the coupler agent 120 such as a head mounted display ("HMD"), which visually and substantially shuts the first entity 110 out of the physical surroundings and transforms the experience into a completely different room and location (a virtual room). Nevertheless, to complete the immersion experience, the communication system 100 connects the senses of movement and expression in the physical world with similar motion and expression in the virtual world (movement) synchronized across the network 150 (metadata movement) to other entities. For conferencing, the communication system 100 synchronizes the voices across the network 150 both in quality and spatiality to complete the immersion. Finally, the collaboration components are both created and synchronized virtually.

The plurality of entities including the first entity 110 may be an individual and/or dataset (data objects). The dataset may be physically located on a device associated with the

TABLE 2

|  | Video Conferencing Systems | Virtual Reality System |
| --- | --- | --- |
| Rooms | Physical rooms. High-end systems will customize rooms to increase perception of locality | Virtual rooms. Rooms are constructed (rendered) in a compute client and are populated (instantiated) with personas (virtual representations) by compute servers. The virtual rooms are immersive in the sense that all participants (entities) feel temporal and spatial presence in the same location. The virtual room customization is unlimited. |
| People | Real people with video used to project upper-body (usually face) views to remote locations. | Virtual representations (personas or avatars) that are constructed/rendered locally. Even people calling in via traditional telephone systems are rendered as a persona in the virtual room. Appearance is simulated and emotions are captured as metadata. No or little video network bandwidth required. |
| Audio | Usually bridged by the cloud servers. The high-end systems will send streams separately to create spatiality of audio. | Audio is spatial. |
| Interfaces | Microphone, speakers, video camera, video display (usually computer monitor or projector), compute client. | Head Mounted Display (HMD or VR headset containing stereoscopic display, microphone, spatial audio, motion and position sensors), compute client and additional optional coupler agents such as haptic gloves. |

There are several guiding principles considered during the design of the VR system including, without limitation, immersion trumps pretty, simplicity trumps flexibility and collaboration trumps communication (except in the case of voice). These guiding principles are not necessarily exclusive of each other. For example, flexibility and choice are participant (e.g., smartphone), within the client 130, within the server 160, in the network 150, and/or within one of the other entities. The coupler agents such as coupler agent 120 are devices that connect the entity (e.g., the first entity 110) with the client (e.g., the client 130). These primarily include a HMD as well as other devices (both active and passive)

that "couple" the physical world of the first entity 110 with the "virtual" world rendered by the client 130.

The client such as the client 130 is formed with a computer that might be integrated with the HMD (e.g., a smartphone coupled with an HMD) or standalone with either wireless or cabling to the coupler agent 120. A virtual room is a digital construct created by the client 130 that represents the virtual world into which the first entity 110 (and other entities) is rendered via the coupler agent 120 and populated virtually by the server 160. The network 150 (such as an internet protocol ("IP") network) provides connectivity between the clients (e.g., including the client 130) with each other as well as with the server 160. The server 160 performs functions such as identity validation, proxy forwarding such as session traversal utilities for network access translator ("STUN")/traversal using relays for network access translator ("TURN") (to resolve firewall issues), synchronization, storage, etc.

The components of the virtual room including the entities are digitally created. The main real-time information that flows between remote sites is audio that is rendered spatially for each entity. Most other aspects of a conversation (e.g., body language, appearance) and collaboration are synchronized as metadata. Consequently, the network bandwidth primarily consists of low-bandwidth audio with small sets of metadata intermixed as needed. The bandwidth savings alone may be a 20:1 benefit in favor of virtual reality over video conferencing.

An improved system for remote communication and/or collaboration utilizes a hardware/software/network system that provides a mechanism for immersive, remote communication and/or collaboration between participants (or entities). The participants may include one person with a number of datasets, some of which may be local and some networked. The participants may be engaged with a communication arrangement between two persons working simultaneously on a common task such as editing a document or a spreadsheet. The participants may be many persons, each with their own data sets, some shared, some private. The participants may be one person communicating with many persons, such as in a classroom or lecture hall environment. The participants may also be many persons communicating with many persons, such as in a board meeting.

The collaboration system for remote communication and/ or collaboration can provide a way to connect multiple personas (or virtual representations such as avatars) together and may include voice, video, and data elements. A first virtual representation that may include voice, video, and the data elements may talk to a second virtual representation through a network using voice, video, or data. The network can be any network, local, or wide area network, and may be coupled to a conference bridge that may be remote from either virtual representation. The conference bridge can provide a participation function as a way to connect multiple virtual representations together. The conference bridge can sum inputs together and track out the participant or element to whom it is sending information. The system can take multiple voices or other inputs, sum the parts together, and track participant(s) to whom it is sending the voices or other inputs. An immersive, remote communication and/or collaboration experience takes place within a virtual and/or augmented reality space defined by a VR system, and includes coupling and binding methods to the physical world that enhance the immersive experience.

Figure 2:
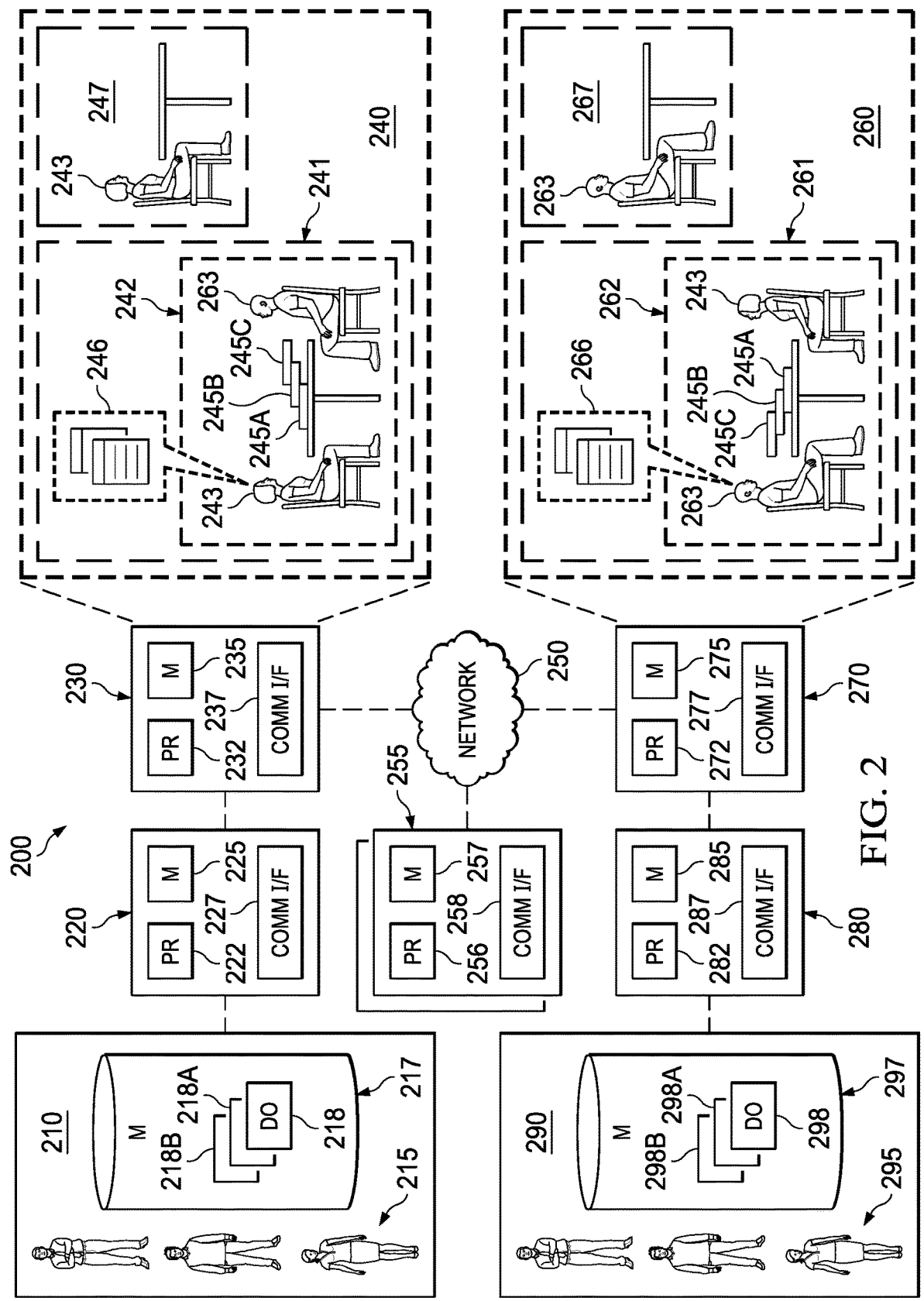

Turning now to FIG. 2, illustrated is a system level diagram of an embodiment of a communication system 200. The communication system 200 such as a VR system includes a first coupler agent 220 physically connectable to a first entity 215 at a first location 210, and a second coupler agent 280 physically connectable to a second entity 295 at a second location 290. The first and second coupler agents 220, 280 may include a personal coupler agent such as a virtual reality/augmented reality headset, a desk coupler such as a keyboard, a drawing coupler such as a mouse or stylus, a hand coupler such as a glove fitted with haptic sensors arranged to sense and tingle a finger, and a data coupler such as a modem and/or a router.

The communication system 200 also includes a first client 230, coupled to the first coupler agent 220 and a server 255 via a network 250, configured to access (e.g., initiate) a virtual session with the server 255, receive an instruction from the server 255 to instantiate a first virtual representation 243 of the first entity 215 in a first public zone 242 of a first collaborative virtual room 241 of a first virtual space 240, receive a response from the server 255 including metadata representing a second virtual representation 263 of the second entity 295, and instantiate the second virtual representation 263 in the first public zone 242 of the first collaborative virtual room 241 rendered from a perspective of the first entity 215. The communication system 200 also includes a second client 270, coupled to the second coupler agent 280 and the server 255 via the network 250, configured to access (e.g., join) the virtual session with the server 255, receive an instruction from the server 255 to instantiate the second virtual representation 263 in a second public zone 262 of a second collaborative virtual room 261 of a second virtual space 260, receive a response from the server 255 including metadata representing the first virtual representation 243 of the first entity 215, and instantiate the first virtual representation 243 in the second public zone 262 of the second collaborative virtual room 261 rendered from a perspective of the second entity 295. The first client 230 and the second client 270 may include a compute engine, a graphics engine and a networking engine operable on the respective processors 232, 272 and memory 235, 275 to perform the operations as described herein. The network 250 may be an IP-based network including communication systems that provide quality of service ("QoS") capability. The server 255 is configured to create a record (a vRecord) of the virtual session between the first entity 215 and the second entity 295. The first client 230 and/or the second client 270 is configured to originate voice and metadata that form part of the virtual record and optionally search for and analyze information in the record. The first virtual representation 243 and the second virtual representation 263 may be presented as avatars and include a single persona and/or multiple personas. As illustrated with respect to FIG. 3, the first client 230 may be embodied in the first coupler agent 220 and the second client 270 may be embodied in the second coupler agent 280, or vice versa.

The first coupler agent 220 includes a processor 222, memory 225 and a communication interface 227, and the first client 230 includes a processor 232, memory 235 and a communication interface 237. The second coupler agent 280 includes a processor 282, memory 285 and a communication interface 287, and the second client 270 includes a processor 272, memory 275 and a communication interface 277. The server 255 includes a processor 256, memory 257 and a communication interface 258.

The processors, which may be implemented with one or a plurality of processing devices, performs functions associated with its operation including overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof The communication interfaces may provide a wired and/or wireless interface to other devices. If a wireless interface, the communication interfaces modulate information onto a carrier waveform for transmission by the respective device via respective antenna(s) to another device. The respective communication interfaces also demodulates information received via the antenna(s) for further processing by other devices. The communication interfaces are capable of supporting duplex operation for the respective communication device. If a wired interface, the communication interfaces perform similar functions over a wired communication path.

The techniques shown in the FIGUREs illustrated herein can be implemented using code and data stored and executed on one or more communication devices. Such communication devices store and communicate (internally and/or with other communication devices over a network) code and data using non-transitory tangible machine readable medium (e.g., magnetic disks; optical disks; read only memory; flash memory devices; phase-change memory) and transitory machine-readable communication medium (e.g., electrical, optical, acoustical or other forms of propagated signals-such as carrier waves, infrared signals, digital signals, etc.). In addition, such communication devices typically include a set of one or more processors coupled with one or more other components, such as memory, one or more input/output devices (e.g., keyboard, a touchscreen, and/or a display), and a network connection. The coupling of the set of processors and other components is typically through one or more busses or bridges (also termed bus controllers). The memory and signals carrying the network traffic respectively represent one or more non-transitory tangible machine readable medium and transitory machine-readable communication medium. Thus, the memory of a given communication device typically stores code and/or data for execution on the set of one or more processors of that communication device. Of course, one or more parts of an embodiment of the invention may be implemented using different combination of software, firmware, and/or hardware. For example, the techniques shown in the FIGUREs have been described with reference to a specific entity performing the techniques. One of skill in the art would recognize that in other embodiments other or different entities may perform the same techniques. Further entities shown as separate may be combined as one entity in other embodiments without changing the fundamental teachings of the techniques.

The first client 230 is configured to create a first private zone 246 (that may include a navigation zone) within the first collaborative virtual room 241, and the second client 270 is configured to create a second private zone 266 (that may include a navigation zone) within the second collaborative virtual room 261. The first private zone 246 and the second private zone 266 may only be accessible by the first entity 215 and the second entity 295, respectively. The first client 230 is also configured to create a first access virtual room 247 to, without limitation, register the first entity 215 by providing information about the first entity 215 and the metadata representing the first virtual representation 243 of the first entity 215 to the server 255. The second client 270 is also configured to create a second access virtual room 267 to, without limitation, register the second entity 295 by providing information about the second entity 295 and the metadata representing the second virtual representation 263 of the second entity 295 to the server 255. The first access virtual room 247 and the second access virtual room 267 may only be accessible by the first entity 215 and the second entity 295, respectively.

The first client 230 is configured to select a position of the second virtual representation 263 in the first public zone 242 of the first collaborative virtual room 241. The position of the second virtual representation 263 in the first public zone 242 of the first collaborative virtual room 241 may be based on a role of the second entity 295. The second client 270 is configured to select a position of the first virtual representation 243 in the second public zone 262 of the second collaborative virtual room 261. The position of the first virtual representation 243 in the second public zone 262 of the second collaborative virtual room 261 may be based on a role of the first entity 215. The first and second clients 230, 270 can position the virtual representations of other entities at any location within their respective public zones of the collaborative virtual rooms.

The first client 230 is configured to produce metadata representing a digital object virtual representation 245A of a digital object 218, instantiate the digital object virtual representation 245A in the first public zone 242 of the first collaborative virtual room 241 from a perspective of the first entity 215, and provide the metadata representing the digital object virtual representation 245A to the server 255. The digital object 218 may be stored in memory 217 and include a single object or a data set. The second client 270 is configured to receive the metadata representing the digital object virtual representation 245A from the server 255, and instantiate the digital object virtual representation 245A in the second public zone 262 of the second collaborative virtual room 261 from a perspective of the second entity 295.

The first client 230 may alter the metadata representing the digital object virtual representation 245A and produce a first altered digital object virtual representation 245B of the digital object 218. The first client 230 is then configured to instantiate the first altered digital object virtual representation 245B in the first public zone 242 of the first collaborative virtual room 241 from the perspective of the first entity 215, and provide metadata representing the first altered digital object virtual representation 245B to the server 255. The second client 270 is then configured to receive the metadata representing the first altered digital object virtual representation 245B from the server 255, and instantiate the first altered digital object virtual representation 245B in the second public zone 262 of the second collaborative virtual room 261 from the perspective of the second entity 295. The first client 230 or the second client 270 is configured to save a revised digital object 218A representing the first altered digital object virtual representation 245B of the digital object 218. The first client 230 may save a revised digital object 218A representing the first altered digital object virtual representation 245B of the digital object 218 in a native format.

With respect to the first altered digital object virtual representation 245B, the second client 270 may also alter the metadata representing the first altered digital object virtual representation 245B, and produce a second altered digital object virtual representation 245C of the digital object 218. The second client 270 is then configured to instantiate the second altered digital object virtual representation 245C in the second public zone 262 of the second collaborative virtual room 261 from the perspective of the second entity 295, and provide metadata representing the second altered digital object virtual representation 245C to the server 255. The first client 230 is then configured to receive the metadata representing the second altered digital object virtual representation 245C from the server 255, and instantiate the second altered digital object virtual representation 245C in the first public zone 242 of the first collaborative virtual room 241 from the perspective of the first entity 215. The first client 230 or the second client 270 is configured to save a revised digital object 218B representing the second altered digital object virtual representation 245C of the digital object 218. The first client 230 may save a revised digital object 218B representing the second altered digital object virtual representation 245C of the digital object 218 in a native format.

With respect to the digital object virtual representation 245A, the second client 270 may alter the metadata representing the digital object virtual representation 245A, and produce a first altered digital object virtual representation 245B of the digital object 218. The second client 270 is then configured to instantiate the first altered digital object virtual representation 245B in the second public zone 262 of the second collaborative virtual room 261 from the perspective of the second entity 295, and provide metadata representing the first altered digital object virtual representation 245B to the server 255. The first client 230 is configured to receive the metadata representing the first altered digital object virtual representation 245B from the server 255, and instantiate the first altered digital object virtual representation 245B in the first public zone 242 of the first collaborative virtual room 241 from the perspective of the first entity 215. The first client 230 or the second client 270 is configured to save a revised digital object 218A representing the first altered digital object virtual representation 245B of the digital object 218. The first client 230 may save a revised digital object 218A representing the first altered digital object virtual representation 245B of the digital object 218 in a native format. It should be understood that the second client 270 (in cooperation with the communication system 200) may perform similar actions with respect to a digital object 298, and revised digital objects 298A, 298B. The digital object 298 may be stored in memory 297 and include a single object or a data set.

The first coupler agent 220 is also configured to detect an emotion (and/or emotions) of the first entity 215. In accordance therewith, the first client 230 is configured to interpret the emotion of the first entity 215, and provide metadata representing an interpretation of the emotion with respect to the first virtual representation 243 of the first entity 215 to the server 255. The second client 270 is configured to receive the metadata representing the interpretation of the emotion with respect to the first virtual representation 243 of the first entity 215 from the server 255, and project the emotion based on the interpretation onto the first virtual representation 243 in the second public zone 262 of the second collaborative virtual room 261 from the perspective of the second entity 295. The emotion may be an assentive emotion or a dissentive emotion. The second client is also configured to refine the interpretation of the emotion with respect to the first virtual representation 243, provide metadata representing a refined interpretation of the emotion with respect to the first virtual representation 243 of the first entity 215, and project the emotion based on the refined interpretation onto the first virtual representation 243 in the second public zone 262 of the second collaborative virtual room 261 from the perspective of the second entity 295. Of course, the principles as set forth above are applicable to other entities associated with the virtual session. Additionally, the emotion (and/or emotions) with respect to the first virtual representation 243 of the first entity 215 may be represented to other entities joining the virtual session in accordance with the metadata representing the interpretation thereof.

The first coupler agent 220 is still further configured to detect a motion (and/or gaze) of the first entity 215. The first client 230 is configured to interpret the motion of the first entity 215, and provide metadata representing an interpretation of the motion with respect to the first virtual representation 243 of the first entity 215 to the server 255. The second client 270 is then configured to receive the metadata representing the interpretation of the motion with respect to the first virtual representation 243 of the first entity 215 from the server 255, provide a positional transformation (and/or gaze orientation) based on the interpretation of the motion with respect to the first virtual representation 243, and project the positional transformation (and/or the gaze orientation) onto the first virtual representation 243 in the second public zone 262 of the second collaborative virtual room 261 from the perspective of the second entity 295. The second client 270 is also configured to refine the interpretation of the motion with respect to the first virtual representation 243, provide metadata representing a refined interpretation of the motion (and/or gaze) with respect to the first virtual representation 243 of the first entity 215, provide a refined positional transformation (and/or gaze orientation) based on the refined interpretation of the motion with respect to the first virtual representation 243, and project the refined positional transformation (and/or gaze orientation) onto the first virtual representation 243 in the second public zone 262 of the second collaborative virtual room 261 from the perspective of the second entity 295. Of course, the principles as set forth above are applicable to other entities associated with the virtual session. Additionally, the motion (and/or gaze) with respect to the first virtual representation 243 of the first entity 215 may be represented to other entities joining the virtual session in accordance with the metadata representing the interpretation thereof.

Generally, the first and second clients 230, 270 create the first and second virtual representations 243, 263 associated with the first and second entities 215, 295, respectively, and surroundings rendered locally such as by a personal computer, smartphone, etc. If the first and second entities 215, 295 are in separate locations, they are all connected to a server such as the server 255 via the first and second clients 230, 270. The server 255 performs a coordinating function, and provides voice and data streams to the first and second clients 230, 270 for the first and second entities 215, 295, respectively.

As an example for an enterprise with a high-speed local network, heavy computing resources can be performed in an enterprise data center located on premises. Thus, many of the functions of the first and/or second client 230, 270 may be absorbed into the server 255. The first and second clients 230, 270, without limitation, provide the local experience with the first and second virtual representations 243, 263 of the first and second entities 215, 295. The server 255 provides a coordination function for a virtual session.

The experience provided by the communication system 200 takes place in a virtual/augmented reality space such as the first and second virtual spaces 240, 260. What the first and/or second virtual representations 243, 263 associated with the first and second entities 215, 295 see in the virtual world, such as a virtual desk, is aligned with what one would see or otherwise experience in the real world. The result is that the first and/or second entity 215, 295 via the first and/or second virtual representation 243, 263 can physically feel the virtual desk in the real world. The physical experience of the first and/or second virtual representation 243, 263 in the real world is melded with the virtual world. In an example of such a system in a gaming environment, when the first and/or second virtual representation 243, 263 move their head, processing of the image is performed by the communication system 200 to cut down on latency so that any movement of the head is recognized as an instantaneous reflection in the virtual world.

As an example, a desk is utilized to perform a function called a binding between the virtual and physical worlds. Avatars such as the first virtual representation 243 can be employed to embody emotions and other contexts. The first entity 215 may be located, for example, in Dallas, and the second entity 295 may be located in Utah, and desire to collaborate employing an immersive process. In the immersive process, head movements such as nodding up and down are represented with metadata. The metadata that enables low latency is exchanged to represent agreeing or disagreeing emotions. A two out of three vote, for example, can be exchanged among participants (or entities) to signal a level of agreement. Algorithms can be employed to identify a majority of a sense to a statement. Artificial intelligence may be employed to provide a higher level of emotional sensing among the entities. The motions and/or emotions may be further refined to accentuate the same within the virtual world.

Further functionalities can be included in the communication process such as converting speech to text and providing real-time translations for the entities. Emotions can be related to the text to enhance collaboration. Information can be provided about business customers, which can be valuable to a company such as Facebook™ that relies on knowing attributes of the consumer.

In the virtual world, the first and second virtual representations 243, 263 can sit in a principal chair and see a drawing or sketch properly oriented therefor. The first and second entities 215, 295, therefore, will have the same or analogous view of what is generally happening. The experience is enhanced from a communication perspective. The first and second virtual representations 243, 263 may sit in a front chair. The first and second virtual representations 243, 263 as students in a classroom environment may sit in the front row of seats. What the professor sees when someone raises his hand is somebody sitting in the front row. In a sense, all the students can sit in the front row.

Figure 3:
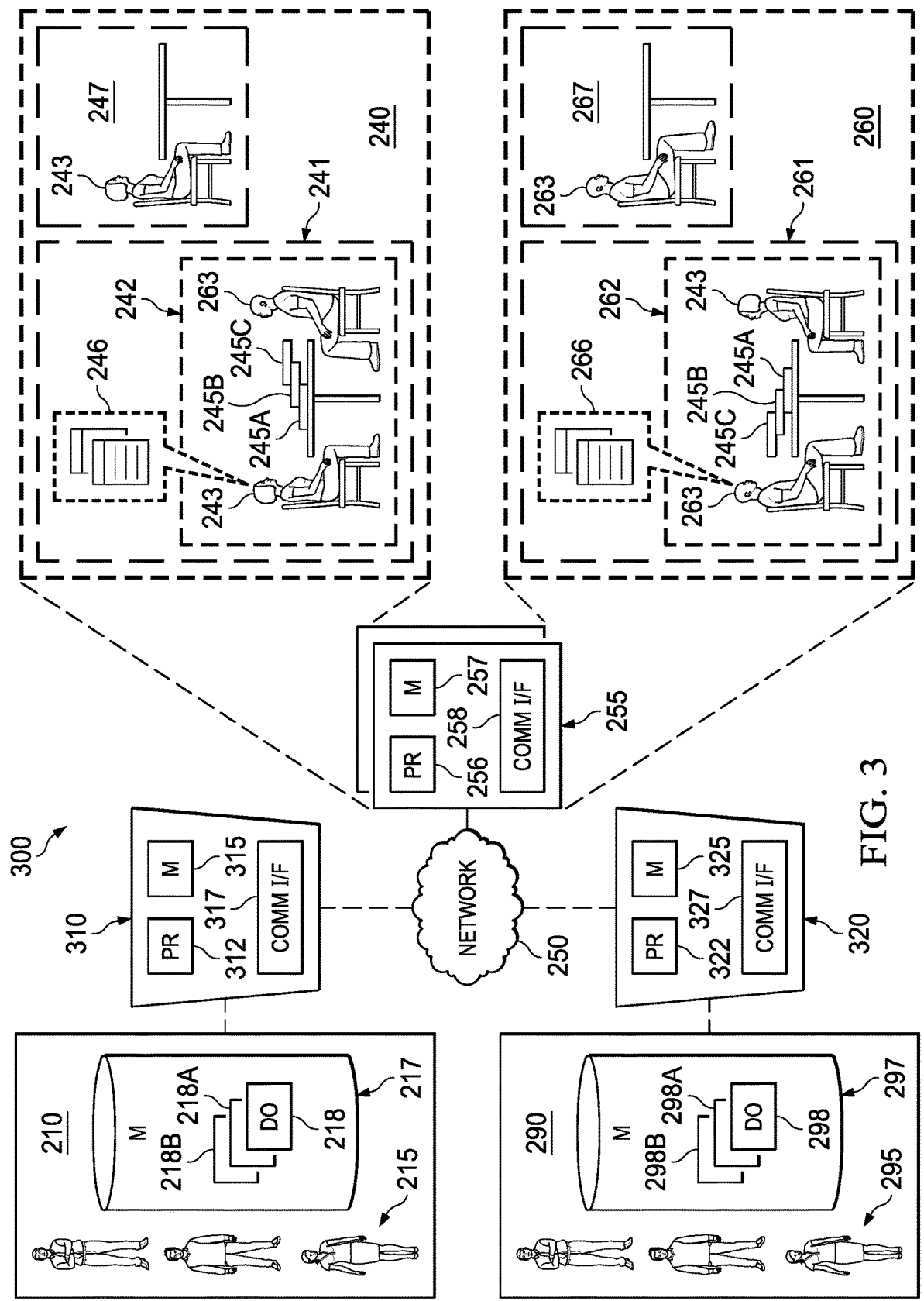

Turning now to FIG. 3, illustrated is a system level diagram of an embodiment of a communication system 300. While the communication system 300 such as a VR system is analogous to the communication system 200 of FIG. 2, a difference is that the clients are integrated into the coupler agents. Thus, the communication system 300 includes an integrated first coupler agent/client 310 including a processor 312, memory 315 and a communication interface 317. The communication system 300 also includes an integrated second coupler agent/client 320 including a processor 322, memory 325 and a communication interface 327. Otherwise, the operation of the communication system 300 and devices therein is analogous to the operation of the communication system 200 and devices therein as described above with respect to FIG. 2.

Thus, a method of communication is achieved through the communication system, wherein synchronization and meta-operations on coupler agents and clients are combined with other elements of the system. These operations mimic and/or enhance communication properties of speech, sight, body language, comprehension, and understanding beyond that of current state-of-the-art systems.

As introduced herein, a communication property of speech is enhanced through spatial operations on audio in three spatial dimensions regardless of the source such as traditional telephone participants, virtual reality and/or augmented reality participants, and/or traditional computer participants. A communication property of sight is enhanced through communication of positional operations of participant representations (e.g., virtual representations). Unlike traditional remote communication and/or collaboration systems such as video conferencing, the virtual representation position is programmable according to entity defined settings. This includes a virtual representation view that can be presented with an enhanced position with respect to surroundings, collaborative information, and other virtual representations.

A communication property of comprehension is enhanced by employing communication of contextual operations of virtual representation position and speech. For example, in a classroom setting, students who are asking questions can be placed in the "front" row for easier interaction with the teacher.

A communication property of body language is enhanced employing communication of emotive operations of virtual representations including recognition of body language and synchronization functions. For example, as a third party participant (or entity) signifies assent through head nodding, this emotive assent is recognized and synchronized across the network via metadata. Traditional remote communications such as video conferencing do not recognize emotive events and, therefore, cannot provide such information. Additionally, the associated metadata can be inserted as part of the textual record of the virtual session.

A communication property of understanding is enhanced employing translation operations performed on the speech of the originating entity. This translation operation when performed at the originating entity or at the compute services located in the network can then be transmitted as metadata of the communication stream. This reduces bandwidth requirements received by the destination entity.

A method of collaboration is achieved employing network, synchronization and meta-operations in coupler agents and clients. These synchronization and meta-operations enhance traditional two-dimensional collaboration techniques beyond the capabilities of current systems for remote communication and/or collaboration, and provide new collaboration methods that can span three dimensions, some of which are not feasible or are quite difficult even in real-life collaboration sessions. These enhancements, among others, include collaborative creation, contextual collaboration, and searchable collaboration.

The collaborative creation of information is enabled and is not bounded by temporal or resource constraints. For example, a collaborative object such as a cube may be created through interaction of an entity with an associated coupler agent and/or client enabled through client software operating on the client.

The contextual collaboration is enhanced by communicating temporal (time contextual) and/or spatial (location contextual) elements. For example, in the collaboration of building an object with several components and layers, the order that they are drawn/created and the movement of location in which they are placed/connected is valuable information to effectively collaborate. Traditional systems for remote communication and/or collaboration present static metadata information, in which temporality and spatiality are neither preserved nor synchronized.

The searchable collaborative information is presented to the entities. This searchable data might include some or all of the metadata associated with communication and/or collaboration functions as described herein as well as other metadata. For example, it is possible to search for "bookmarks" that might have been placed temporally and/or spatially during the course of a communication and/or collaboration virtual session at which point during a search, this "bookmark" is retrieved including surrounding metadata such as speech, emotion, contextual collaboration, etc.

An immersive experience is thus enabled for the communication entities through network synchronization and meta-operations on the coupler agents and/or clients. These operations remove distractions typically associated with traditional systems for remote communication and/or collaboration and enhance the human communication and/or collaboration experience beyond what can be done "in-person".

Immersive navigation operations are also enabled. Such operations may include functions of zooming, rotation, and spatial translation as well as others. For example, unlike traditional systems for remote communication and/or collaboration and even in-person conferences, the communication system may enable a beginning view that is initially established outside an automotive vehicle. The communication system then enables the communication entity to translate (spatially) one's self into the vehicle. Finally, the communication entity may be downsized to the size of an insect to discuss or collaborate regarding a single component of the vehicle.

Immersive visualization of datasets and/or ideas may also be performed such as, without limitation, real-time transformation of datasets and/or ideas into visible and interactive three-dimensional virtual components. For example, a genealogy dataset is usually represented by a binary family tree. However, in order to view the non-binary information (such as children or other spouses), traditional systems will change to a different view. The communication system as described herein can allow a third axis as well as temporal and spatial operations. Therefore, the same family tree can now be viewed along the new axis to render visualization of non-binary information including the ability to zoom in and out of such information.

An additional example of immersive dataset visualization is a representation in virtual space of 3D medical information (such as Digital Imaging and Communications in Medicine ("DICOM") magnetic resonance imaging ("MRI") files). The capture of these files is in 3D dimensional space; however, state of the art systems typically render them in a 2D display such that operations like zoom, rotate, translate are visually difficult. The communication system as described herein allows a natural interaction with this medical information since the display and ability to interact is proscribed within a 3D virtual world.

As described herein, the virtual space enables communicating entities via virtual representations (in accordance with single person, multiple persons, local datasets, and remote datasets) to interact by means of voice communication. A public zone of a collaborative virtual room enables the communicating entities present in a virtual and/or augmented reality space to interact with datasets, files, three-dimensional objects, etc. A private zone contains areas that are viewable only to an individual communicating entity. The communicating entity may display and view information/datasets privately and outside of the view of other communicating entities. The private zone also contains areas that may hold three-dimensional objects such as advertisements, brand symbols, and customized objects based upon preferences of the communicating entity. Virtual and/or augmented reality boundaries vary in opacity (from clear to solid) and contain areas for the virtual representations to store files/datasets not in use, areas that may hold two-dimensional banners for advertisements, brand symbols, and customized objects based upon the preferences of the communicating entity. Virtual and/or augmented reality boundaries that are clear avail communicating entities a view of a virtual and/or augmented reality scene, which may be populated with a sky map, object, advertisement, or other image based on preferences of the communicating entities.

In operation, one uses the virtual and/or augmented reality space to customize the environment to the needs and/or preferences of the communicating entity or entities represented by the virtual representations. For instance, the virtual and/or augmented reality scene may be a relaxing coastal scene or a bustling urban scene with advertisements, all based upon preferences of the communicating entity. The private zones may be customized by the communicating entities to suit the subject of the communication and/or collaboration. For instance, the private zone may be a virtual and/or augmented reality boardroom or an auditorium. The private zone may be customized with three-dimensional advertisements, brand symbols or other objects based on the preferences of the communicating entity. When a communicating entity wishes to store files or other information that may be necessary during a virtual session for quick retrieval, a communicating entity need only place the files or information in the private zone. The files or information are readily available for sharing from the private zone, but are not visible to other communicating entities. For files not in use, the virtual and/or augmented reality boundaries contain reference space for storage of the files.

Thus, as introduced herein, a computer-implemented system enables remote communication and/or collaboration in various virtual and/or augmented reality environments tailored to preferences and needs of communicating entities. The computer-implemented system is formed with a virtual and/or augmented reality environment including virtual and/or augmented reality representations, a virtual and/or augmented reality shared, network-synchronized zone, a virtual and/or augmented reality private zone, a virtual and/or augmented reality boundaries, and a virtual and/or augmented reality scene. The virtual and/or augmented reality environment can be tailored to the type of communication and/or collaboration contemplated by the communicating entities.

The multiple communicating entities, represented by virtual and/or augmented reality representations, are enabled to interact with each other and to customize the virtual and/or augmented reality environment suitable for the communication and/or collaboration session. A communicating entity, represented by a virtual and/or augmented reality persona (or virtual representation), is enabled to interact with many communicating entities, represented by virtual and/or augmented reality personas, while maintaining control of and tailoring the virtual and/or augmented reality environment to specific needs and preferences suitable to the primary communicating entity or, more generally, to the preferences suitable for the communication and/or collaboration between multiple communicating entities. A communicating entity is enabled to interact with datasets and to tailor the virtual and/or augmented reality environment to the specific needs and preferences suitable for communication and/or collaboration between one communicating entity and the datasets.

Multiple communicating entities are enabled to interact with datasets and to tailor the virtual and/or augmented reality environment to the specific needs and preferences suitable for communication and/or collaboration among the multiple communicating entities and the datasets. The shared or public zone enables all communicating entities to view and manipulate collectively shared objects, files, information and datasets.

The communicating entities employing the virtual and/or augmented reality private zone are enabled to customize a room-type (such as a board room, auditorium, etc.) based on the type of communication and/or collaboration contemplated by the communicating entity or entities, view information and datasets privately, and view three-dimensional advertisements, brand symbols or other objects based on the preferences of one or more communicating entities. The communicating entities, employing the virtual and/or augmented reality boundaries are enabled to customize, based upon preferences of the communicating entity, and store information and files not in use, but which may be needed for reference, and view two-dimensional advertisements, brand symbols, and customized banners based upon preferences of the communicating entity. The communicating entities, employing the virtual and/or augmented reality scene, are enabled to customize, based upon the preferences of the communicating entity, and view three-dimensional advertisements, brand symbols or other objects based on the preferences of the communicating entity.

Figure 4:
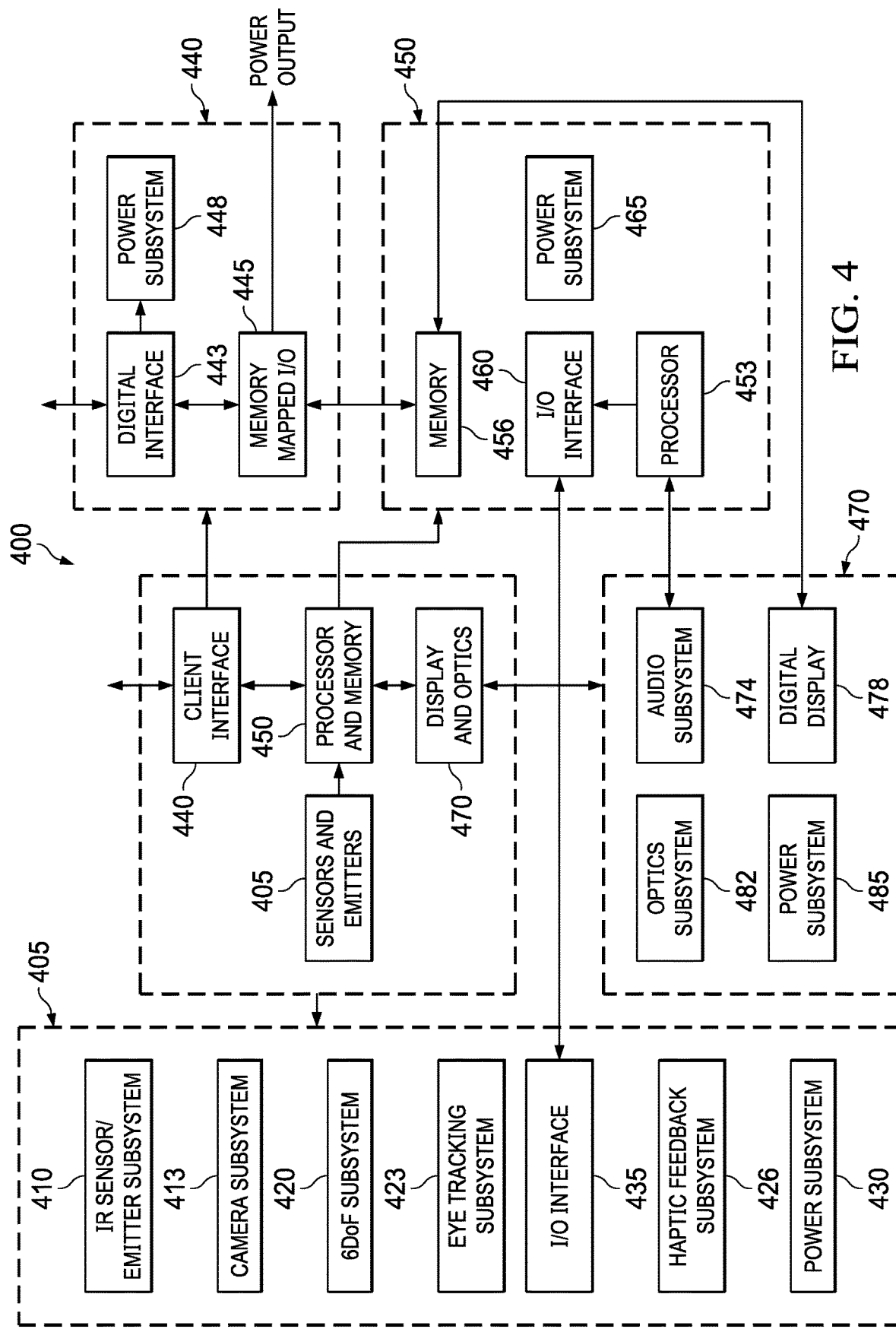
FIGS. 4 to 6 illustrate block diagrams of embodiments of coupler agents.
Figure 5:
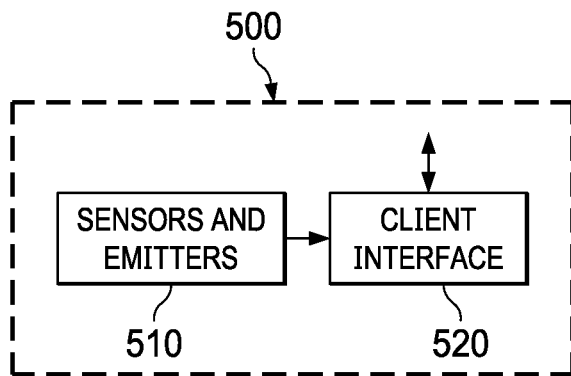
Figure 6:
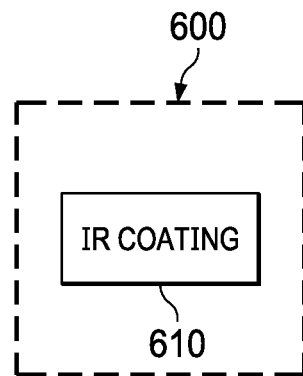

Turning now to FIGS. 4 to 6, illustrated are block diagrams of embodiments of coupler agents. The coupler agents facilitate a base-line feeling of immersion. The coupler agents may include a head mounted display ("HMD") that provides a stereoscopic display to a participant (an entity) with high rendering rates (e.g., 90 frames per second ("fps")) to avoid motion effects that cause nausea. The HMD tracks the head movement, wherein the head tracking may not exceed a latency of more than 25 milliseconds ("ms"). The HMD provides voice capturing via, for instance, a microphone and spatial audio for the participant. The HMD may also track hand movements with analogous latency requirements to the head movement. The coupler agents may include a collaborative desk that matches up in the virtual world with a physical desk at which the participants are seated in terms of locality and spatiality In addition to base-line requirements, there are elements between virtual world and real world that when implemented properly increase the immersion experience. The elements include a physical board shape (vBoard) that shapes functions as a flat surface in physical reality, but in virtual reality is context sensitive (i.e., at times it appears as a keyboard, a menu selector, etc.). Optionally, the vBoard includes infrared ("IR") absorption and potentially IR transmitters to be better recognized by the sensors and to interoperate well with hands of an entity. The elements also include a haptic feedback glove (vGlove), a collaborative pen (vPen) and VR spot couplers (vSpots).

Figure 7:
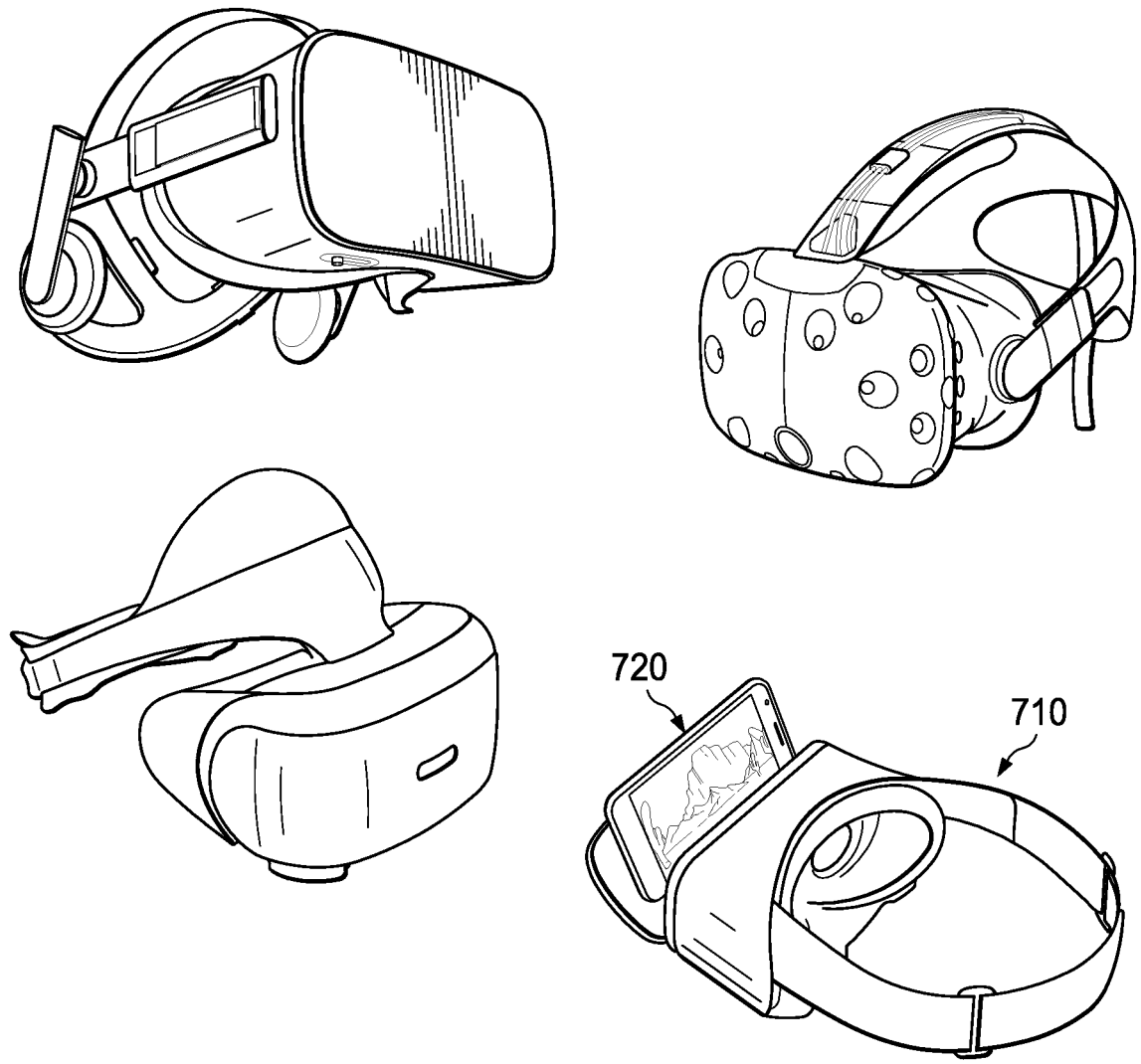
FIG. 7 illustrates perspective views of exemplary head mounted displays.

An objective of the coupler agents is to bridge between the physical and virtual worlds. The coupler agents include smart couplers 400 (e.g., HMDs) as illustrated in FIG. 4. The smart couplers include head-mounted displays, smart gloves (haptic), VR Internet of Things ("IoT") devices, etc. The coupler agents also include active couplers 500 (e.g., sensors, gloves) as illustrated in FIG. 5. The active couplers include HMD sensors/emitters, gloves (haptic and non-haptic), pens, board surfaces, etc. The coupler agents also include passive couplers 600 (e.g., input/output ("I/O") boards, passive board surfaces, VR identification ("ID") dots, etc.). The smart and active coupler agents are connected to the corresponding client over a wireless or wired communication path. The wireless connectivity depends on, without limitation, the battery power consumption, the bandwidth capacity requirements and latency. The passive coupler agents typically can operate without power requirements and are tracked through recognizable patterns and/or IR reflective surfaces. FIG. 7 illustrates perspective views of exemplary head mounted displays ("HMDs"). The HMDs typically enable an immersive experience and the HMD designated 710 employs a smartphone 720 in addition to other components to perform the functions thereof.

Referring to FIG. 4, the smart coupler 400 includes sensors and emitters 405, a client interface 440, a processor and memory 450, and display and optics 470. The sensors and emitters 405 include external sensing subsystems such as an IR sensor/emitter subsystem 410 and a camera subsystem 413, and internal sensing subsystems such as six degrees of freedom ("6DoF") subsystem 420, an eye tracking subsystem 423 and a haptic feedback subsystem 426. The improvements in the eye tracking subsystem 423 may leverage the benefits of foveated rendering. The improvements in the camera subsystem 413 with respect to the recognition of hands, the surroundings and objects may blur the differences between virtual and augmented reality. The sensors and emitters 405 also include a power subsystem 430 and an input/output ("I/O") interface ("I/F") 435.

The client interface 440 includes a digital interface 443, a memory mapped I/O 445 and a power subsystem 448. The processor and memory 450 includes a processor 453, a memory 456, an input/output ("I/O") interface ("I/F") 460 and a power subsystem 465. The display and optics 470 includes an audio subsystem 474, a digital display 478, an optics subsystem 482 and a power subsystem 485. The I/O interface 435 of the sensors and emitters 405 is coupled to the I/O interface 460 of the processor and memory 450. The memory mapped I/O 445 provides a power output and is coupled to the memory 456. The processor 453 and the memory 456 are coupled to the audio subsystem 474 and a digital display 478, respectively, of the display and optics 470.

The density of the digital display 478 is trending to 800 to 1600 pixels per inch ("PPI"). In general, the sensors and emitters 405 provide sensory input of information to the processor and memory 450 (for internal processing). The processor and memory 450 processes the information and provides the same to the client interface 440 (for further processing by a client into a virtual room) and the display and optics 470 for presentation to a participant (an entity).

Turning now to FIG. 5, the active coupler 500 includes sensors and emitters 510, and a client interface 520. The aforementioned subsystems are analogous to the sensors and emitters 405 and the client interface 440 of the smart coupler 400 of FIG. 4. Referring to FIG. 6, the passive coupler 600 includes an IR coating 610 such as an absorbing or reflecting IR coating. The passive coupler 600 is sensed by one of the other smart or active couplers. It is recognized because of specific IR coating and/or specific patterns. An example of a passive coupler is a VR sensitive table mat that can be sensed by the smart coupler and thus enhance the virtual and real world matching of table location.

Figure 8:
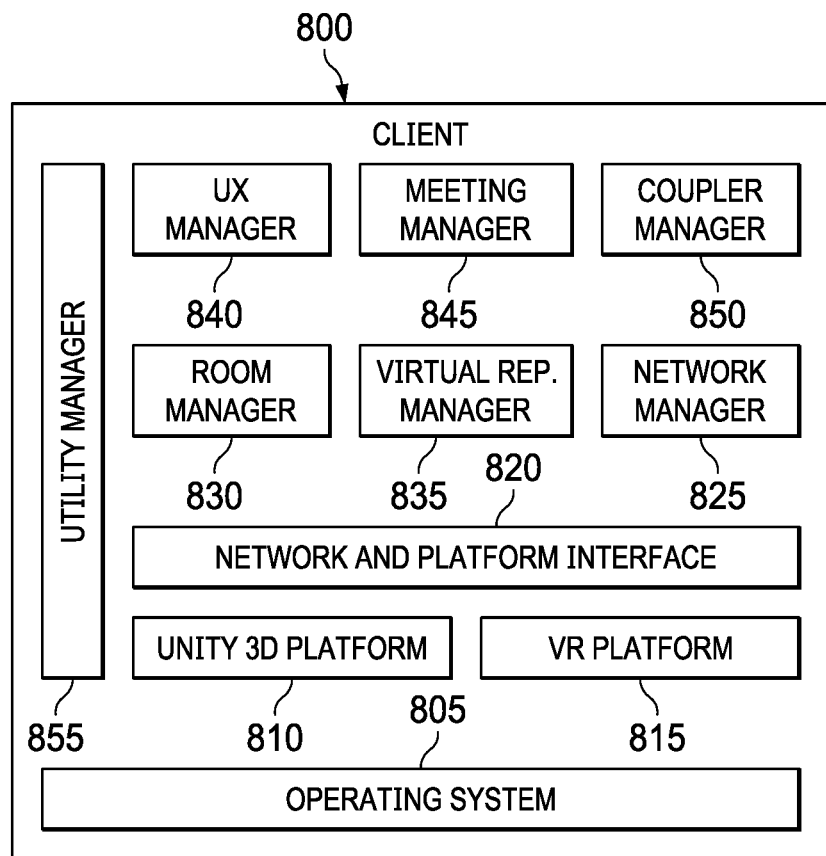
FIG. 8 illustrates a block diagram of an embodiment of a client.

Turning now to FIG. 8, illustrated is a block diagram of an embodiment of a client 800. The client 800 may be in several forms such as a mobile, desktop or datacenter resource. It provides the logic, algorithms and rendering as experienced by the participant (or entity). This distribution of processing (client/server) places the resource intensive and privacy related participant functions either in close proximity thereto or within a high-bandwidth, private network. The functions of authentication, meeting and room management are located at operator and regional sites across a communications network that is usually public such as the internet. Architecturally, this also insures that high-bandwidth functions are not distributed across the communication network, but are rendered locally to their respective functional areas.

The client 800 includes an operating system 805 such as, without limitation, Microsoft® Windows®, Mac® operating system ("O/S"), browsers, Mobile Android™ and Apple® iOS. The experience may differ across the platforms, mainly based upon the compute and general processing unit ("GPU") resources of the respective hardware platforms. The client 800 may include a Unity 3D® platform 810 that provides a development platform with associated component software upon which most of the VR system is developed. The Unity 3D® platform 810 provides user interface ("UI") functionality including VR, 3D and 2D graphic engines, a physics engine (for component interaction), an animation engine, a lighting system, and a scripting functionality (C # language based). The Unity 3D® platform 810 also provides an add-on component structure including state machines, materials, object construction, avatar systems, etc. The Unity 3D® platform 810 also provides cross-platform development and targeting (Windows®, Mac®, Web, Android™, IOS).

The client 800 includes a VR platform 815 that communicates with the Unity 3D® platform 810 via a software application programming interface ("API"). The VR platform 815 provides, without limitation, document conversion, client specific hardware interaction beyond the Unity 3D® platform 810, and selected network functions (e.g., authentication, authorization, and accounting ("AAA") security functionality).

The client 800 includes a network and platform interface 820 that provides an interface to the Unity 3D® platform 810 and the VR platform 815, and APIs that isolate other subsystems therefrom. The communication with a server occurs through the network and platform interface 820. The network and platform interface 820 performs authentication, authorization and accounting in cooperation with a network manager 825. The network and platform interface 820 also performs, without limitation, encryption/decryption (including voice, metadata and control information) and network buffering (inbound and outbound).

The client 800 includes the network manager 825 that interacts with the network and platform interface 820 to manage the AAA functionality as well as the real-time streaming adjustments to accommodate different types of network conditions including latency and jitter. The authentication includes identifying and authenticating a device and participant (an entity) with AAA cloud services. On the client side, this is typically done with information such as a password, passcode, fingerprint, and other types of systems provided by the client hardware. For the coupler agent, the authentication occurs when the participant accepts the currently accepted coupler agent as authentic. This is a soft authentication.

Authentication of the participant initially involves a registration function. This registration function can establish the components necessary for subsequent logins and authentication of the participant. The authentication information may include something you know (email, password, passcode, metadata), something you are (voice, fingerprint, face recognition), and something you have (two-factor authentication with smartphone, client platform, etc.). The information obtained at registration may include personal information (e.g., name, birth year), email address (primary means of login), a password (passwords are stored on the server as hash values and therefore not extractable), a current machine/user account (e.g., a Global User ID ("GUID")) along with a user-defined passcode. This will be used for simple passcode login from the same machine.

The information may further include a voice imprint (sufficient to login to a device that has previously been authenticated), and a face imprint (although fingerprint information is part of the device authentication and need not be collected). The information may further include a smartphone number for two-factor authentication, and user selected metadata (picture identification). Once the participant is authenticated, authorization of the user is performed including obtaining account authorization and then accounting information is collected such as logins, meetings, meeting information, session statistics (audio, metadata, emotive data), etc.

The client 800 includes a room manager 830 that manages a virtual space, room, zone, etc. The room manager 830 manages a personal room configuration (e.g., room type, number of participants, layout, scenery, virtual representation settings) and a multiple room configuration (a participant may have a conference room, a presentation room, and a 1:1 room). The client 800 includes a virtual representation manager 835 that handles functions such as, without limitation, avatar (or virtual representation) selection, avatar customization, idle motions, emotive capture, emotive motions, avatar speech motions (mouth and hands) and attendant artificial intelligence ("AI").

The client 800 includes a UX manager 840 for handling the different interfaces depending upon the platform. The platform experience options include a premier virtual reality experience via a desktop (e.g., Oculus® Vive) or console (e.g., Xbox®), and a standalone augmented reality experience (e.g., Hololens®). The platform experience can take advantage of a mobile virtual reality experience (e.g., Google® Daydream). The platform can also provide a non-virtual reality experience via a desktop (e.g., Windows®, MAC®) or web application (e.g., Safari®), and a mobile non-virtual reality experience (e.g., IOS, Android™).

The virtual reality experiences mainly vary in fidelity and input/output. The non-virtual reality experiences are similar to the virtual reality 3D experience, but rendered in a 2D format. The mobile non-virtual reality experience provides a baseline and is intended to be simple and provide two main visual functions, namely, speaker identity and collaborative object viewing. The UX manager 840 provide different solutions for each type of experience. The APIs from the UX manager 840 are relatively consistent so that most of the other subsystems are consistent across the platform experiences.

The client 800 includes a meeting manager 845 that controls functions related to a virtual meeting (or session) such as, without limitation, meeting start, meeting join, meeting scheduling, participant (entity) entry security, participant identification, participant location, meeting monitor, private/public space management and file navigation. The client 800 includes a coupler agent manager (designated "coupler manager") 850 that monitors and manages the different coupler agents. The coupler agents include, without limitation, head mounted displays and auxiliary input/output agents (e.g. hand controllers, desk pads). The client 800 includes a utility manager 855 that provides a platform independent of APIs between the operating system 805 and the VR platform 815. This allows these subsystems to be relatively unchanged across different platforms.

Turning now to FIGS. 9 to 11, illustrated are block diagrams of embodiments of servers. The server functions can be separated into three categories, namely, an operator located server 900 (FIG. 9), a provider located server 1000 (FIG. 10) and a region located server 1100 (FIG. 11).

As illustrated in FIG. 9, the operator located server 900 is generally located at a central site and is used to administer security and meeting manager functions. The operator located server 900 includes a subscriber manager 910 having an AAA security manager, a participant (or entity) identity manager and participant preferences manager. The subscriber manager 910 can provide participant registration, authentication, preferences and metadata. The operator located server 900 includes a meeting manager 920 having a region resource manager, a virtual room resource manager and a virtual log (vLog) manager. The meeting manager 920 can provide virtual meeting (or session) validation, meeting participant management, virtual room (vRoom) resource management and virtual record (vRecord) management. The operator located server 900 also includes a server operating system ("O/S") 930.

The provider located server 1000 is typically a data repository of replicated databases with a local repository appearing at each operator location and a primary data repository 1010 located and operated by a provider of the communication service. The database architecture may be based on PostgreSQL® and may include a participant table (name, email, hashed password, etc.), participant profiles, virtual meeting (or session) table, virtual meeting profiles, virtual records (vRecords) of the virtual sessions and resource table (e.g., operator and region located servers and services).

The region located server 1100 includes hypervisor servers with virtual machines that dynamically create virtual rooms and virtual room functions. Since the region located server 1100 includes synchronization functions (i.e., voice), the region located server 1100 is located regionally to achieve lower latency. The region located server 1100 includes a virtual room (vRoom) manager 1110 that manages the participants, voice and synchronization thereof. The region located server 1100 also includes a hypervisor operating system ("O/S") 1120. The vRoom manager 1110 provides voice management including voice stream forwarding, voice bridging (for large participant meetings), speech-to-text services, translation services and voice vRecord metadata management. The vRoom manager 1110 provides participant management including emotive data services, non-virtual reality participant services (e.g., virtual representation management for connected smartphone participants), and virtual representation vRecord metadata management. The vRoom manager 1110 provides data object management including file conversion services (e.g., Microsoft® Powerpoint® to jpg image conversion), data object session storage (in conjunction with a data repository), data object transfer via URL, data object vRecord metadata management, and overall vRecord management (e.g., collection from other components, storage with data repository). The vRoom manager 1110 provides synchronization management including synchronization services between the clients (e.g., positions, metadata updates) and synchronization component vRecord metadata management.

The virtual rooms provide an immersive and collaborative experience for the participants (entities). There are several categories of rooms. The collaborative virtual rooms are virtual spaces that participants can interact with other participants or with data in a many-to-many or one-to-one format. The one-to-one format is especially useful for work-at-home. The collaborative virtual rooms include public zones that provide a venue for the interaction between the participants and private zones that provide limited access for a participant. Thus, in the private zones, the participant interacts with the VR system and/or artificial intelligence. Classrooms are venues where the format is generally one-to-many, but the capability is provided for the presenter to select other participants who can then function in an inquirer role. The classrooms can turn off the inquirer role. The classroom, therefore, can act like a collaborative virtual room. Of course, each of these categories can have many variations of the look-and-feel of the virtual room.

Figure 12:
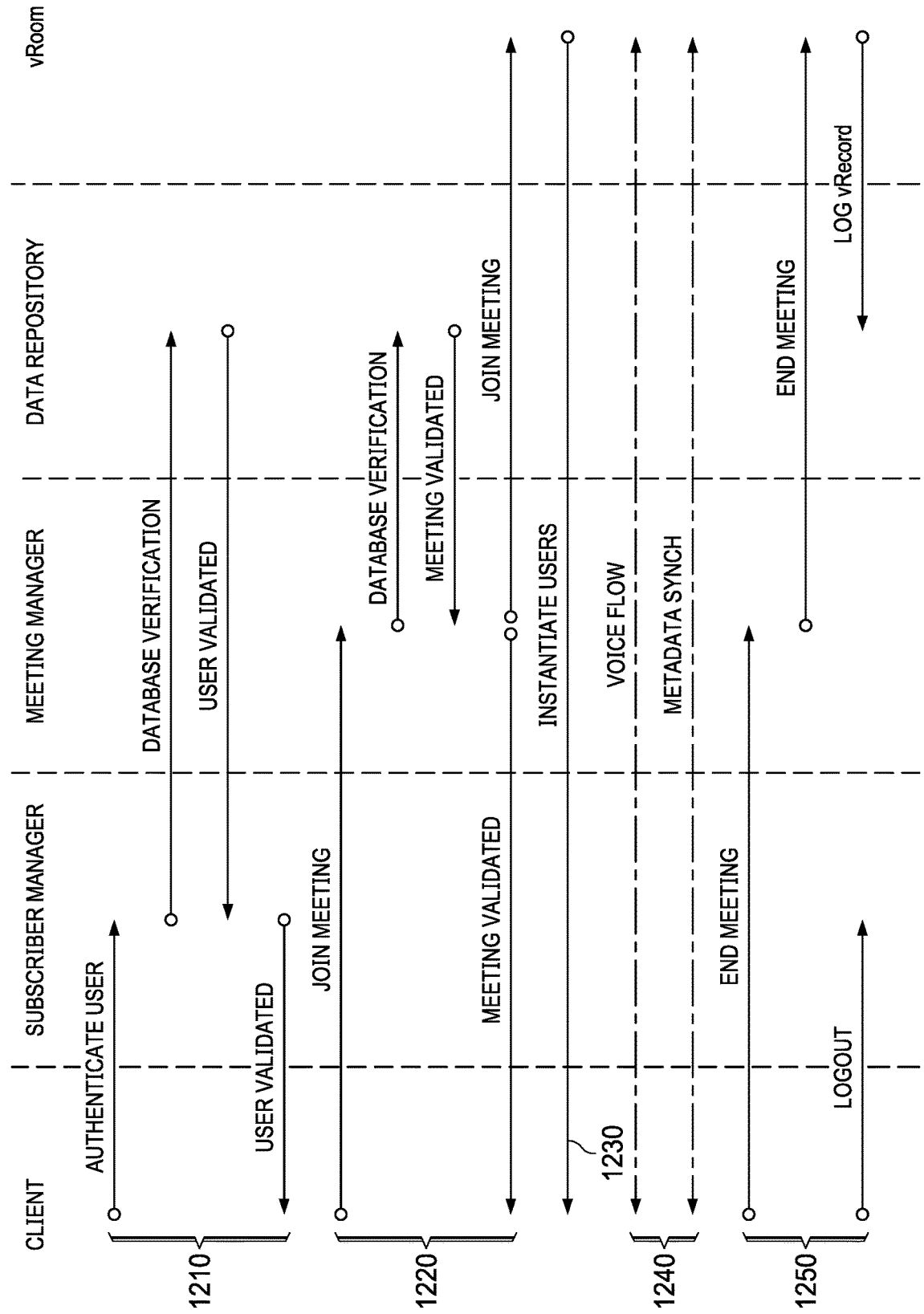
FIG. 12 illustrates a signaling diagram an embodiment of a virtual meeting.

Turning now to FIG. 12, illustrated is a signaling diagram an embodiment of a virtual meeting (session) demonstrating interactions between a client and selected subsystems of a server. The client authenticates an entity (associated with the client) at an authentication procedure 1210. The client thereafter joins a meeting and the meeting is validated during a join meeting procedure 1220. The entities are then instantiated as virtual representations during an instantiate procedure 1230. The meeting is in session 1240 as represented by voice flow and metadata synchronization. The meeting ends 1250 as represented by an end meeting and logout signals.

Figure 13:
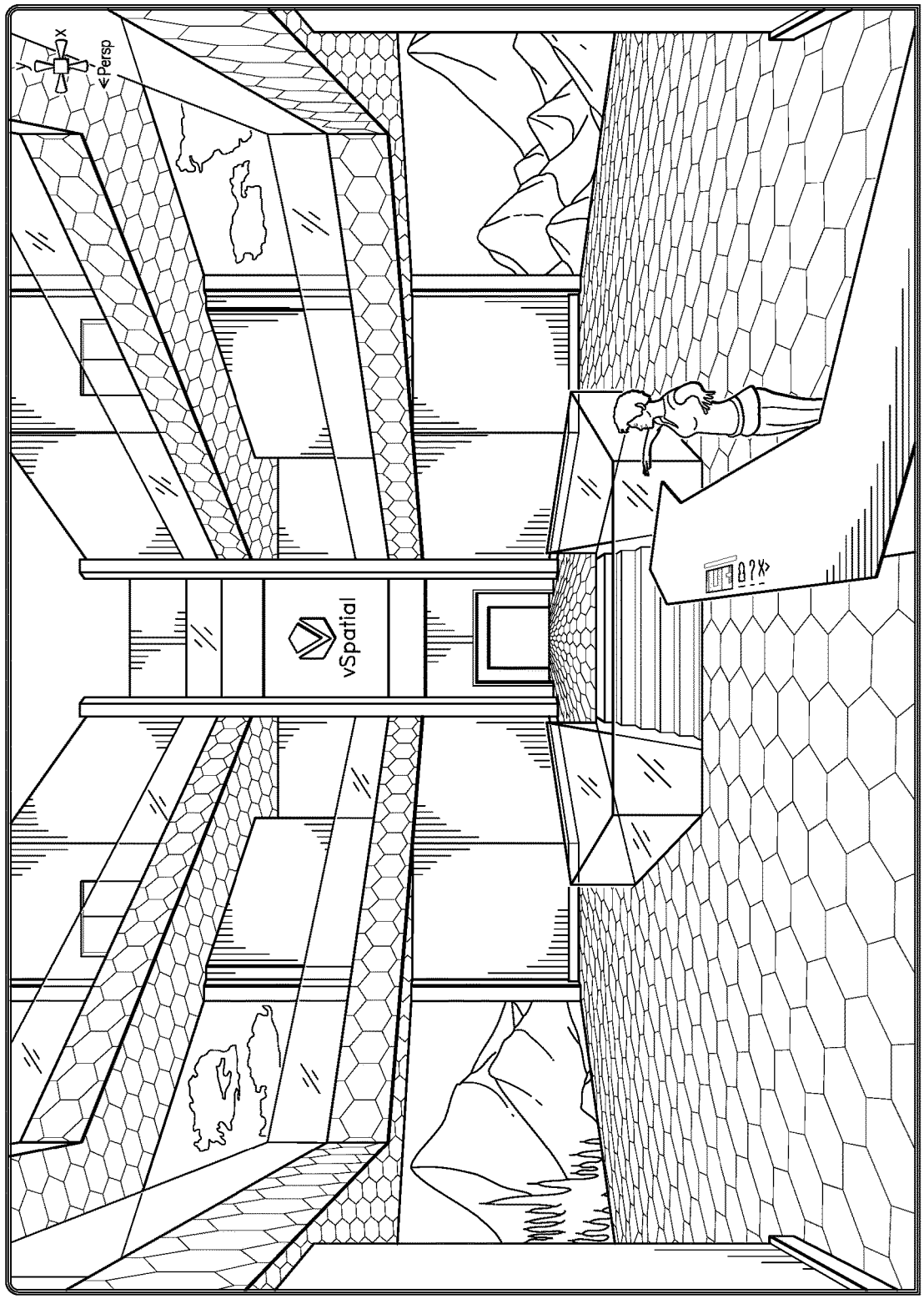
FIG. 13 illustrates a pictorial view of an embodiment of a virtual room.

Turning now to FIG. 13, illustrated is a pictorial view of an embodiment of a virtual room. The illustrated virtual room is a private zone referred to as a virtual access room. The virtual access room can provide several functions such as a security function to authenticate and authorize a participant (entity) for access to a virtual session. The virtual access room provides a meeting transport function to allow a participant to join or host a meeting. An advertising function can be facilitated by the virtual access room to allow a participant to engage in virtual reality advertisements. The virtual access room can provide an artificial intelligence ("AI") attendant (a virtual attendant, vAttendant) function to navigate the participant through the virtual space as well as provide help. The virtual access room can also provide a virtual representation (avatar) configuration function to configure an avatar for the virtual sessions.

The virtual attendant may be used in the virtual access room and the meeting rooms (collaborative virtual rooms). Each participant interacts with their own virtual attendant. In the simple case, the virtual attendant is a simple speech command oriented attendant with a fixed keyword and phrase list. The more sophisticated AI attendant interprets natural language and responds in a natural language manner. The AI functions include, without limitation, a response to virtual access room directions (login, virtual representation commands, join meeting commands, etc.), a response to meeting room directions (allow participants, pass token, change room parameters, etc.), a response to navigation (vNavigate) directions (upload file, transform file, share file, copy to private space, etc.), a response to help requests, perform setting functions, act as interpreter, act as a proxy for non-meeting notifications (answer external calls, texts, etc.), and analyze and summarize meeting metrics.

Figure 14:
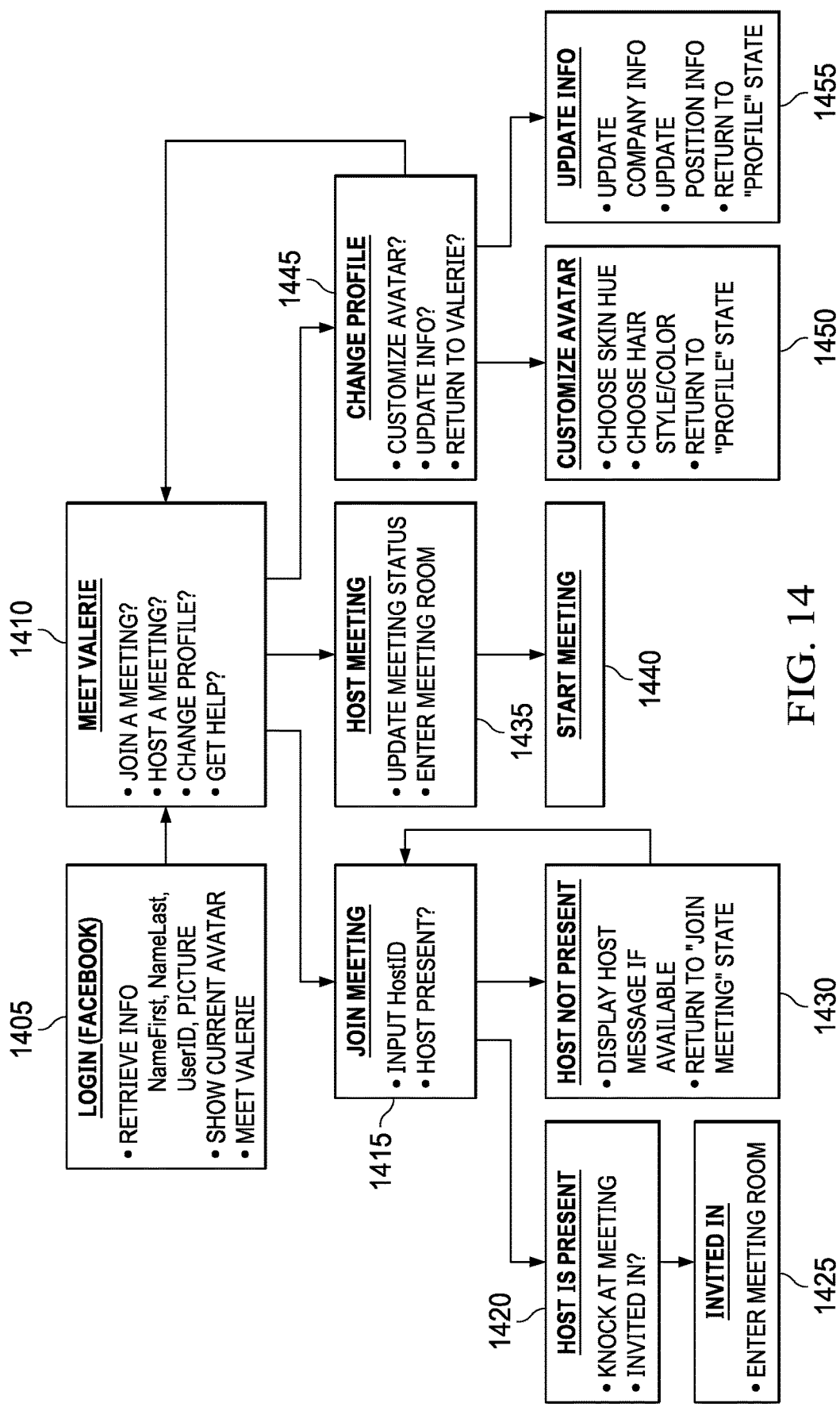
FIG. 14 illustrates a state machine diagram of an embodiment of a method associated with a virtual access room.

Turning now to FIG. 14, illustrated is a state machine diagram of an embodiment of a method associated with a virtual access room. At a login state 1405 (via, for instance, Facebook®), the participant (an entity) via an avatar (a virtual representation) logs into the virtual access room. The VR system retrieves information about the participant such as a name, participant identification (userID), picture of the participant and a current avatar. The participant via the avatar is also introduced to a virtual attendant (e.g., Valerie). At a meeting Valerie (virtual attendant) state 1410, the VR system ascertains if the participant via the avatar is attempting to join or host a virtual meeting (or session), change a profile associated therewith and/or receive help.

If the participant is joining a virtual meeting, the VR system requests a HostID and determines if the host is present at a join meeting state 1415. If the host is present, the participant via the avatar is instructed to knock at a collaborative virtual room and the VR system ascertains if the participant is invited to the virtual meeting at a host is present state 1420. At an invited in state 1425, the participant via the avatar is instructed to enter the collaborative virtual room. If the host is not present at a host not present state 1430, the VR system displays a host message (e.g., host available?) and then returns the join meeting state 1415.

If the participant is hosting a virtual meeting, the participant via the avatar is instructed to update the virtual meeting status and enter a collaborative virtual room at a host meeting state 1435. Thereafter, the participant via the avatar may begin the virtual meeting at a start meeting state 1440.

If the participant desires to change a profile at a change profile state 1445, the participant via the avatar may, without limitation, change a configuration of the avatar, update information and thereafter return to the meet Valerie (virtual attendant) state 1410. If the participant is changing the configuration of the avatar at a customize avatar state 1450, the participant via the avatar may, without limitation, choose the skin hue, hair color and style and then return the change profile state 1445. If the participant is updating the information about the participant at an update information state 1455, the participant via the avatar may, without limitation, update company and/or position information about the participant and then return the change profile state 1445.

Figure 15:
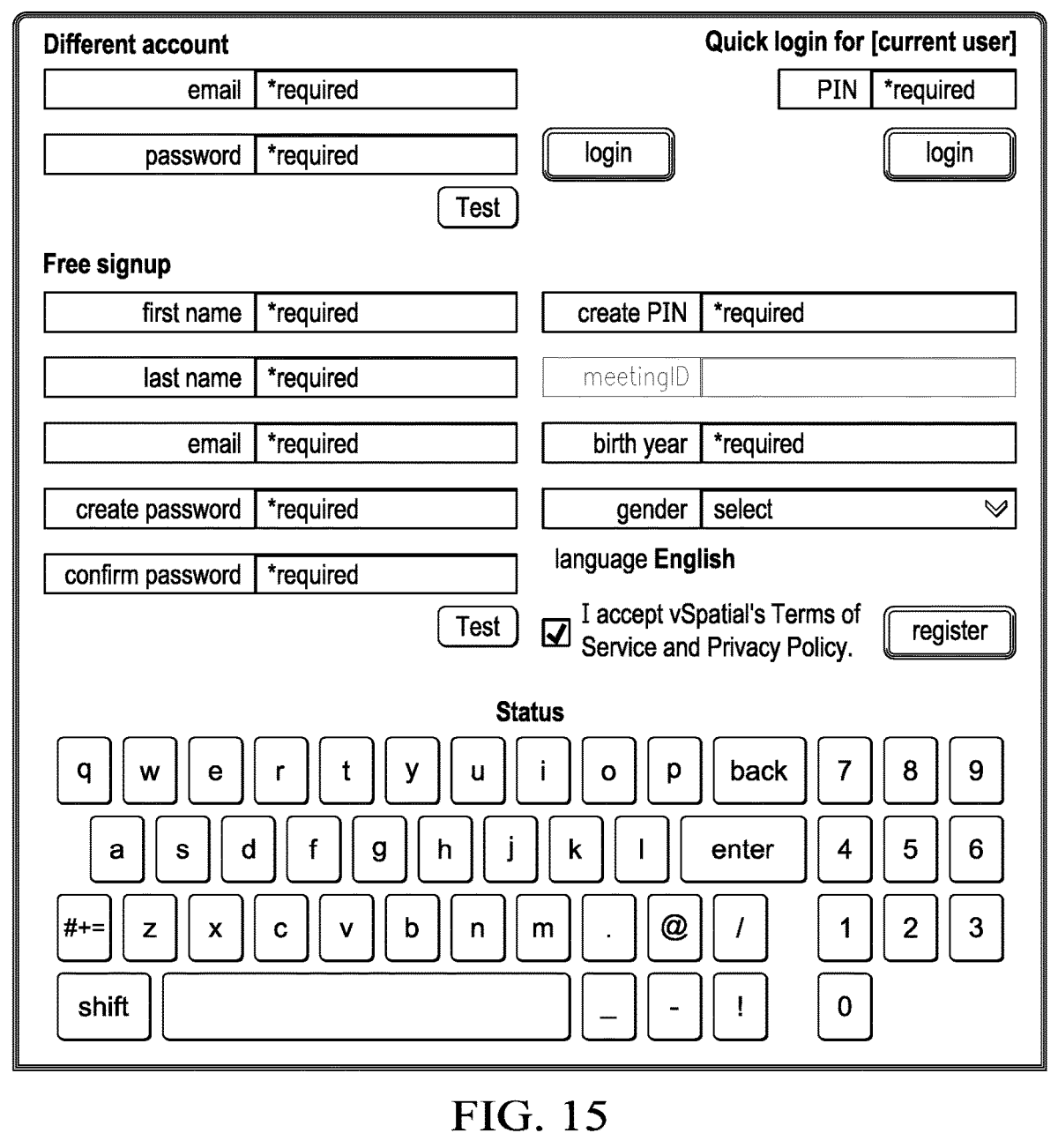

Turning now to FIGS. 15 and 16, illustrated are screen shots of embodiments of registration/login screens associated with a virtual access room. There are three components to registration and login, namely, something the participant has (e.g., a personal computer ("PC"), HMD, smartphone), something about the participant (e.g., voice, fingerprint, eye/face scan), and something the participant knows. At registration time, all three of these components are obtained and validated. As a default, the VR system presumes that the device being used to register is something the participant has. The combination of the three pieces of information satisfy the security requirements at registration.

Figure 17:
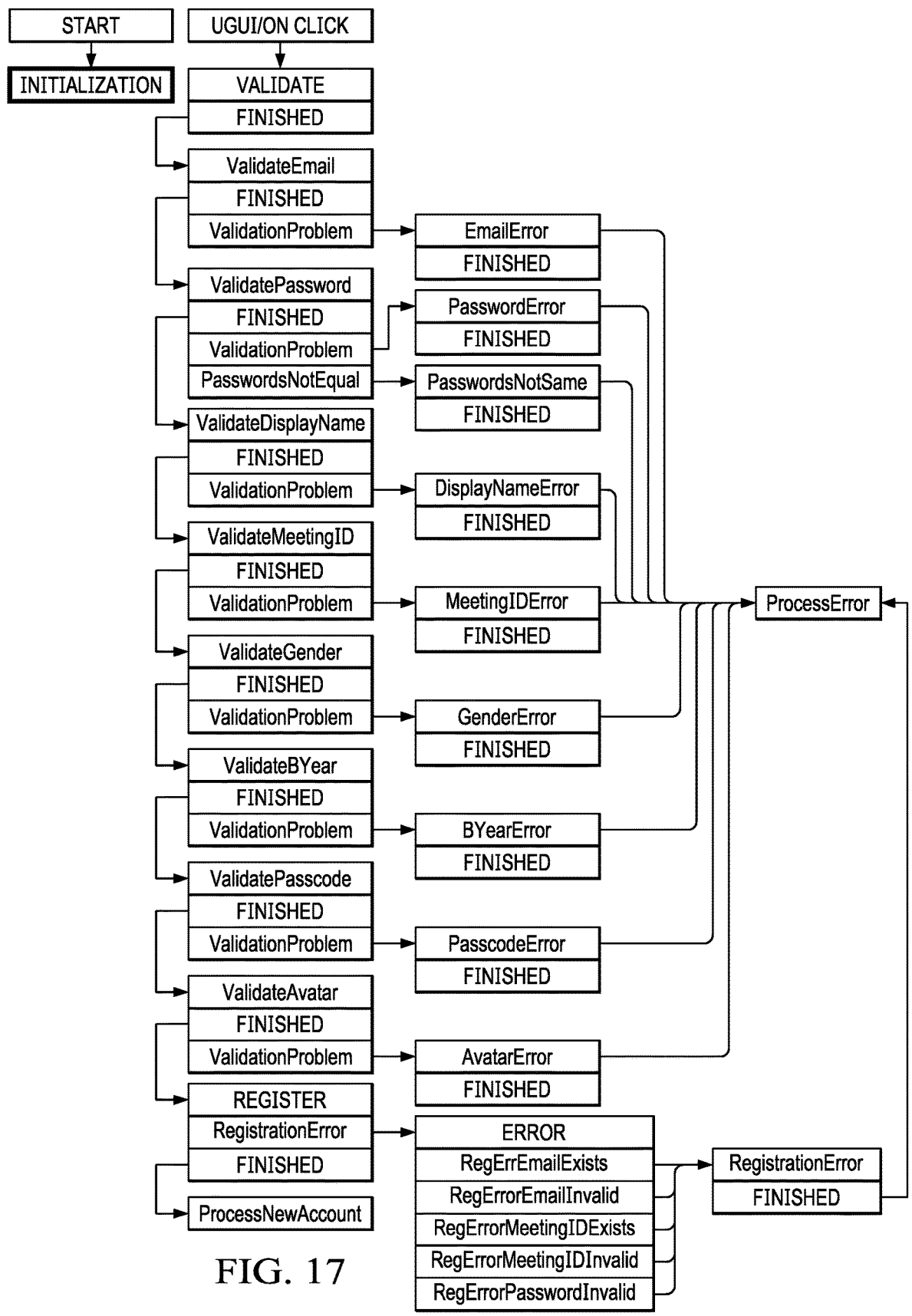
FIG. 17 illustrates a state machine diagram of an embodiment of a registration/login function associated with a virtual access room.

Regarding something the participant has, the VR system can obtain a unique Global User ID ("GUID") derived from a user account of a machine the participant is using. The VR system can obtain a voice print that is subsequently used to uniquely identify the participant to satisfy something about the participant. Regarding something the participant knows, the VR system can obtain an email address, a participant password (preferably not saved locally and saved as a hash in the cloud), and a passcode (preferably not saved locally), which is concatenated with the GUID before saving in the cloud as a hash entry. In support thereof, FIG. 17 illustrates a state machine diagram of an embodiment of a registration/login function associated with the virtual access room. Once a participant has registered, the subsequent login becomes much simpler. When the device has previously been approved, the VR system infers "something the user has", and then can quickly transition to ask for "something the user knows" (passcode), and finally the VR system authenticates "something about the user", such as a voice print.

Figure 18:
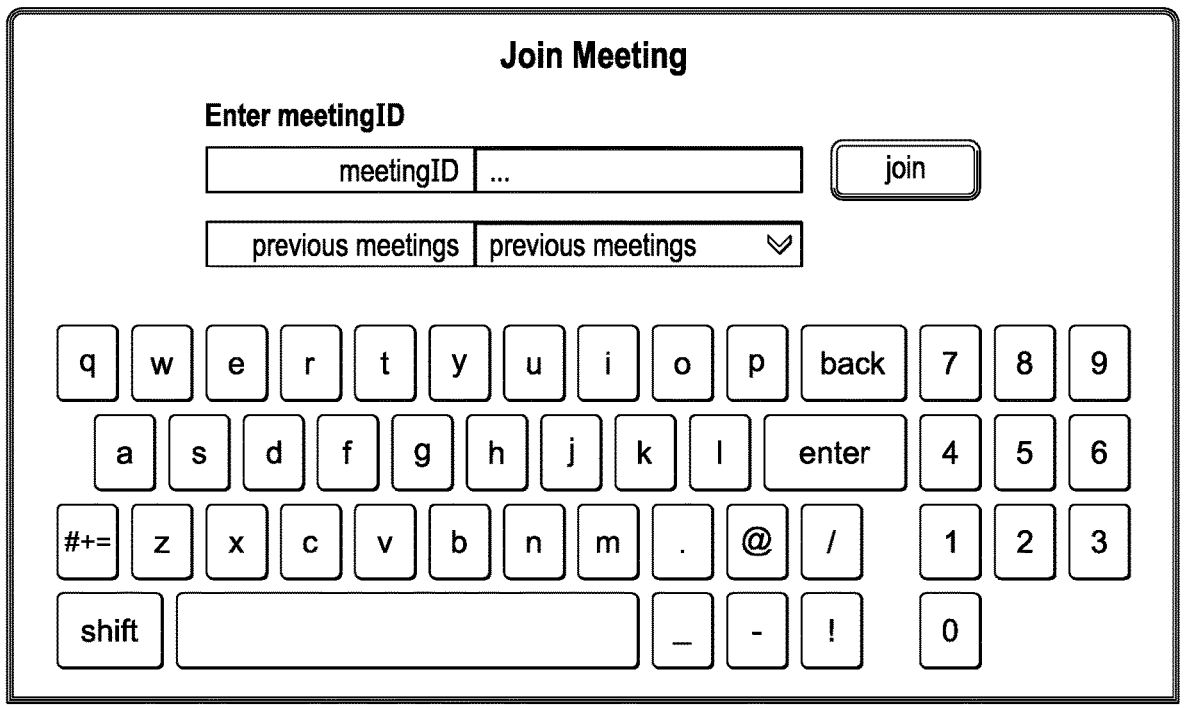
FIG. 18 illustrates a screen shot of an embodiment of joining a virtual meeting associated with a virtual access room.

Turning now to FIG. 18, illustrated is a screen shot of an embodiment of joining a virtual meeting associated with a virtual access room. A "previous meetings" tab includes the participant's meeting name as well as meeting names of other virtual meetings that the participant has previously joined. If the meeting host has not started the virtual meeting, then the meeting participants are returned to their respective virtual access rooms (where the participants can explore while waiting) and are transported to and once the virtual meeting starts.

Figure 19:
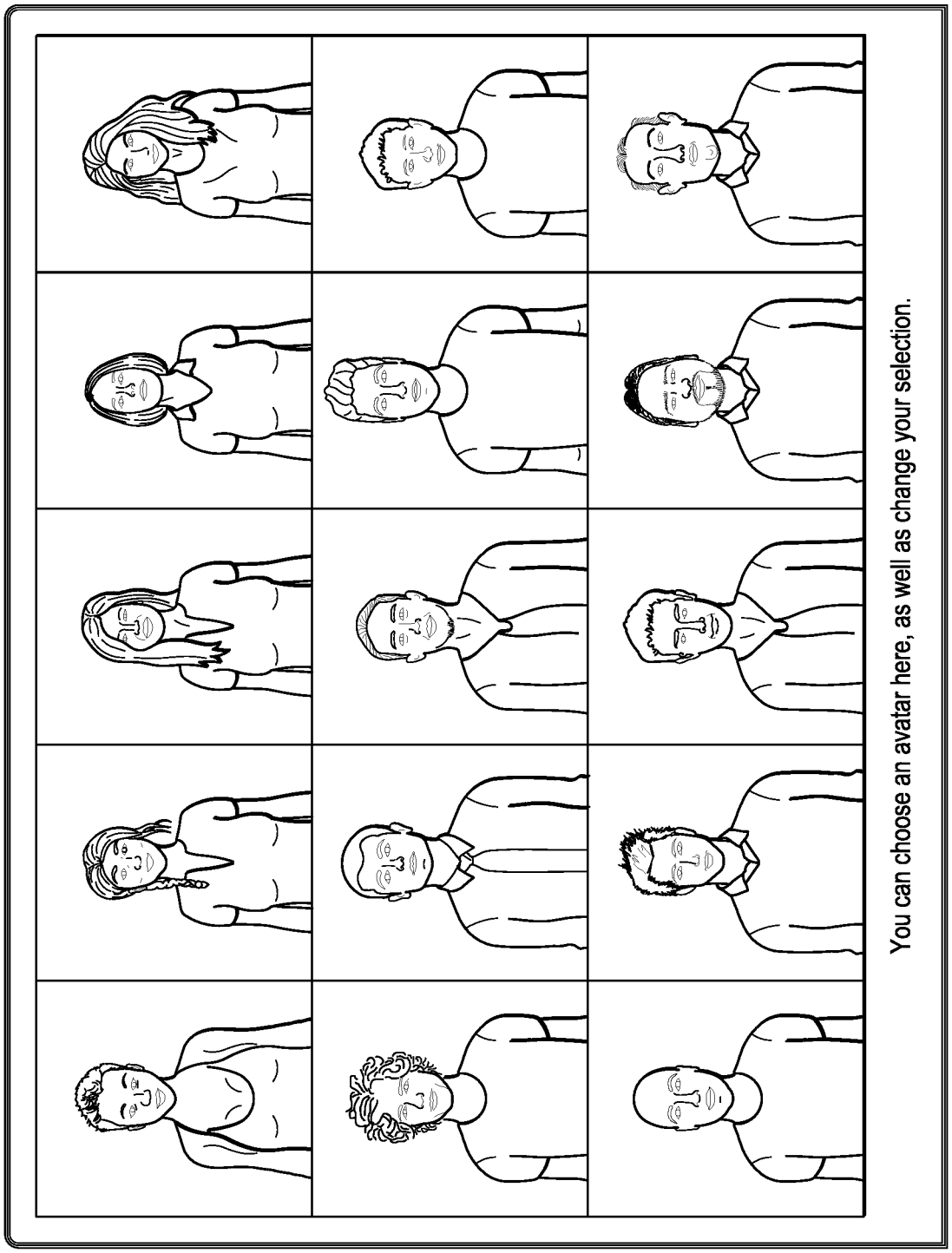
FIG. 19 illustrates a screen shot of an embodiment of selecting a virtual representation for a virtual meeting associated with a virtual access room.

Turning now to FIG. 19, illustrated is a screen shot of an embodiment of selecting a virtual representation (e.g., an avatar) for a virtual meeting associated with a virtual access room. The avatar function includes the selection and customization of the participant's avatar. A first-time participant may have a default avatar, which can then (as previously stated) be changed/customized within the user interface ("UI") of this function. The virtual representation may also include face mapping for participants that allows the avatar to be customized to the participant's photos.

Thus, the virtual representations of each of the participants may not be exact hologram images of the participants, but rather an avatar image that resembles the participant in a sufficient manner that provides identification to others, while at the same time giving each individual opportunity to choose the personification of how they desire to appear. In addition to the avatar representation, the relationship between the virtual representation and the virtual space includes the concept of positional optimization. This concept provides each participant an "optimum view" in a collaborative virtual room with respect to the shared data (it is directly in front of each participant's position) as well as to the other participants' avatars (they can be placed according to a preference, e.g., a sales person can place the buyer directly in front of his view).

Figure 20:
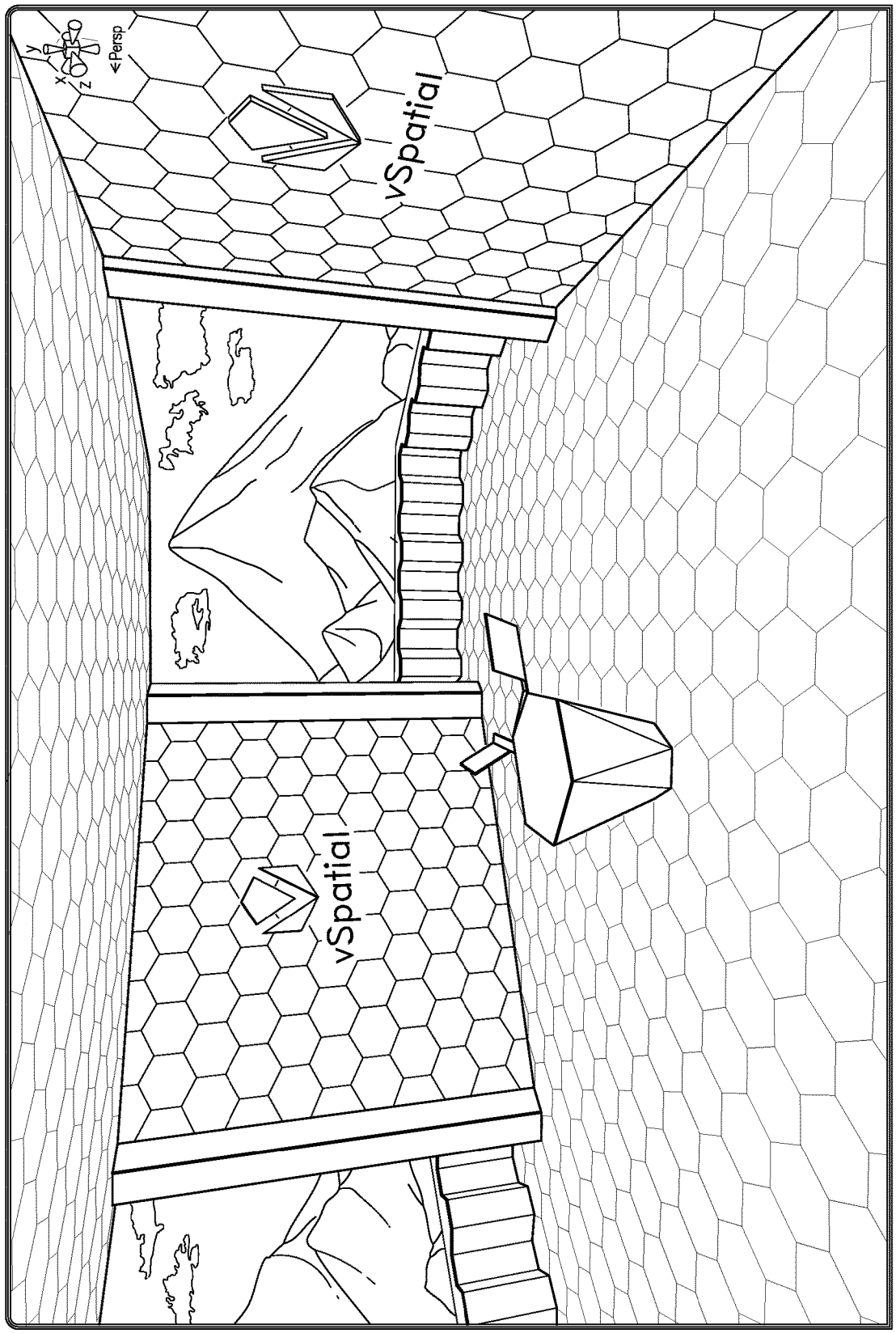
FIG. 20 illustrates a pictorial view of an embodiment of a collaborative virtual room.

Turning now to FIG. 20, illustrated is a pictorial view of an embodiment of a collaborative virtual room. A public zone of the collaborative virtual room can support a many-to-many virtual meeting (session). The public zone can also serve as a one-to-one virtual room and a virtual record (vRecord) can serve as an interactive training log for a receiving participant. As a general rule, the public zone can facilitate a multi-participant (entity) virtual meeting with high fidelity audio communication as well as speaker identification. The public zone is for entities that are synchronized across the network for purposes of collaboration. It is possible to transfer or copy digital objects between the public zone and a private zone of the collaborative virtual room as, for instance, an image with metadata. The private zone is for data objects that are local to the participant and not seen by other participants. A navigation zone is part of the private zone and is used to navigate data objects that belong to the participant whether contained locally in the client or remotely in cloud storage belonging to the participant. As part of the private zone, access to the navigation zone and its operations is limited to the respective participant.

One of the advantages of the VR system is the ability to scale meetings (even many-to-many) to large scale. This is accomplished by combining smaller meetings together and removing the walls therebetween. This is an advantage of a hexagon shape, conceptually, as will be described with reference to FIG. 21. Additionally, because of the capability of each participant having "the best seat in the house," each participant can have the sense that they are the center of the conversation with each speaker directed towards them.

Turning now to FIG. 21, illustrated is a top view of a conceptual embodiment of a collaborative virtual room demonstrating the scalability of a virtual meeting (session). According to the conceptual embodiment, each collaborative virtual room has six participants $A_x$, $B_x$, $C_x$, $D_x$, $E_x$, and $F_x$, where X denotes the room number; one participant is virtually situated proximate each wall of a hexagonal room. When at least a seventh person is added, at least a second collaborative virtual room is instantiated, and the participant in the first collaborative virtual room proximate the wall between the first room and the new room (e.g., Bi) moves into the new room with the new person(s) (e.g., $C_2$); up to three more participants (e.g., $D_2$, $E_2$ and $F_2$) can then be added to the new room before needing to instantiate an additional room for further participants. For example, the addition of third and fourth rooms would be necessary to accommodate a total of 18 participants (i.e., $A_1$-$F_1$, $C_2$-$F_2$, $A_3$, $B_3$, $E_3$, $D_3$, $A_4$-$C_4$ and $F_4$). A participant continues to appear in their original virtual room until one of the other participants in the second room begins talking, at which point that participant moves to the spot reserved for a second virtual room participant in the first collaborative virtual room. The aforementioned discussion is from a perspective of participant $A_1$ and all participants will have that same experience (i.e., "best-seat-in-the-house"). Note that in FIG. 21, collaborative virtual rooms 5, 6 and 7 are not yet instantiated. The scaling process can continue indefinitely to expand the virtual room. Also, note that other than the first collaborative virtual room, the participants in the other rooms (from participant $A_1$'s perspective) can be rendered as avatar sprites verses full-fledged avatars; e.g., as background images from participant $A_1$'s perspective, thus saving substantial rendering horsepower.

A derivative of the many-to-many collaborative virtual room is the special case of one-to-one and one-to-data. In these cases, the participant is either interacting with only one other person or is solely interacting with data objects. These two cases begin with a participant joining a collaborative virtual room by himself. At that point, the interaction with data (creation, modification, observation) proceeds normally (the one-to-data case). The public zone does not synchronize, but can be used for purposes of recording. The private zones continue to be accessible by the participant. This form of meeting is typically used for lecture preparation and the participant proceeds as if other participants such as students are present and the meeting is recorded as a vRecord. This meeting form can be used for data object design and creation (the participant uses creation tools including databases to create visual representations, and data visualization (the participant uses visualization tools to analyze data). A virtual record (vRecord) interaction (the participant can search and analyze previous meetings) can also be used in this form.

A participant may proceed from this point into a one-to-one mode. This is different from the many-to-many type meeting in that instead of other participants joining a meeting, the originator has tools to "tap" other individuals to immediately enter into the meeting. This form of meeting is typically used for work-at-home (the originator inside of his meeting space "taps" other co-workers to join him in an ad-hoc meeting), and field interaction (e.g., one individual might be in the "field" probably using augmented reality to see actual surroundings, while the invited expert might be at headquarters). Additionally, classrooms are one-to-many with the ability for the presenter to enable enquirers to be heard by all other participants.

One of the advantages of a virtual meeting (session) in which all components including voice, content and emotion can be reduced to sets of metadata is that the metadata can be assembled into a record or log that is both analyzable and searchable. A virtual record (vRecord) can be constructed by cloud services.

Figure 22:
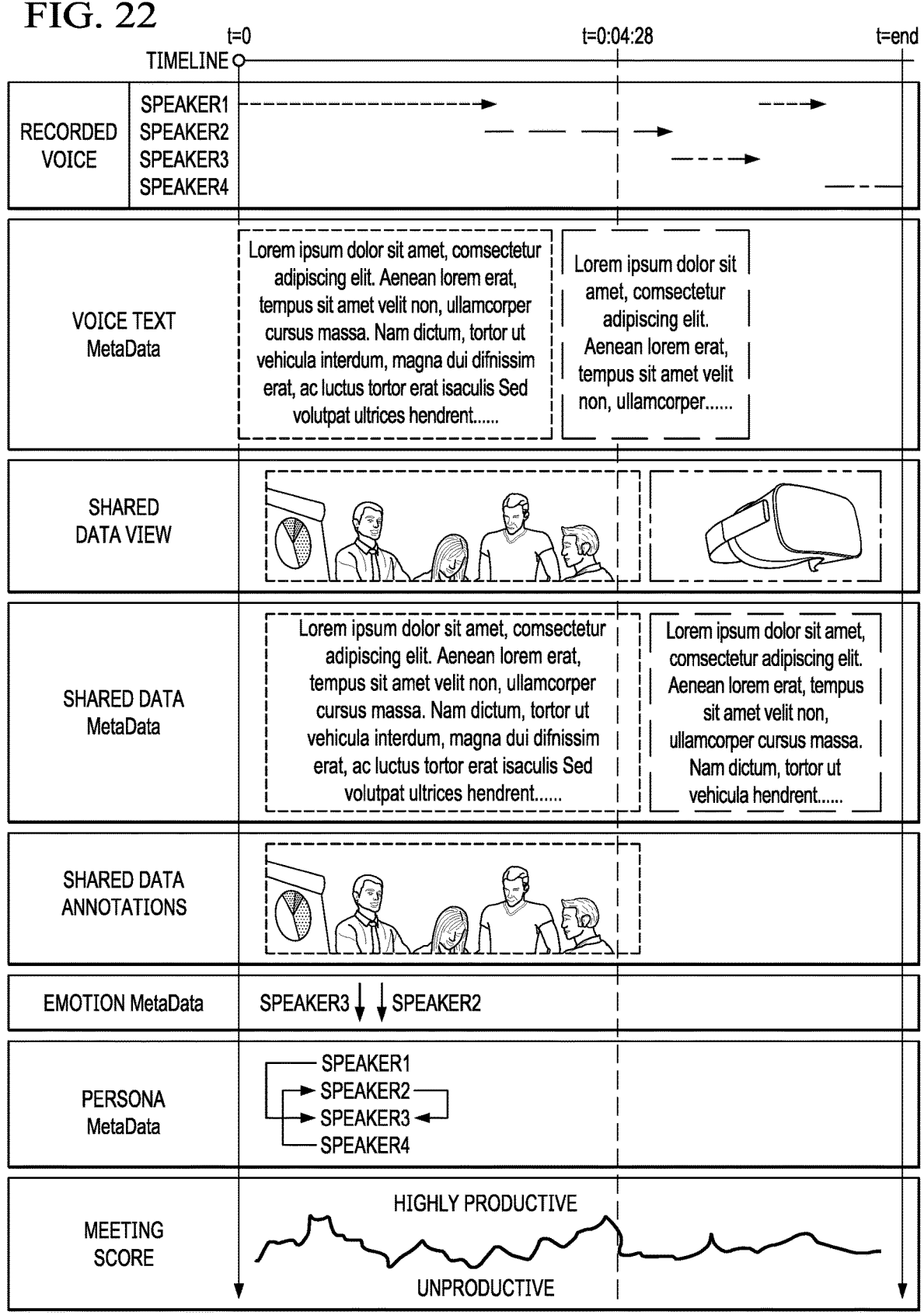
FIG. 22 illustrates a pictorial representation of an embodiment of a virtual record.

Turning now to FIG. 22, illustrated is a pictorial representation of an embodiment of a virtual record (vRecord). When a virtual meeting (session) begins (the trigger is when the organizer starts the meeting), a synchronized log of the meeting begins. All of the different metadata logs are synchronized to a timeline log and are tagged at the 100 millisecond ("ms") boundaries. In the database, the metadata has a timetag index.

The virtual record contains sufficient information to replay a virtual meeting in its entirety with no loss of voice recording or metadata that was synchronized across the network during the virtual meeting. Only operations performed privately are not preserved in the virtual record. The virtual record pertains to almost all aspects of the VR system inasmuch as it is a record of each element of the collaboration including voice, voice metadata (speech-to-text, keywords, emphasis, etc.), shared data objects, metadata associated with the shared data (original file, participant sharing, duration of share, etc.), data annotations (drawing, speech, pointers, etc.), user emotions (assentive and dissentive nods, smiles, etc.), and virtual representation metadata (looks a participant receives from others, mentions, etc.). Each of the elements has a time component. The virtual record in its entirety is sufficient to recreate the virtual meeting as if it were a recording, but with the advantage that it is searchable as well as analyzable. The amalgamation of the metadata results in an algorithmic "meeting score" over time as indicated in the last row of FIG. 22. The "meeting score" ranges from a low of "Unproductive" to a high of "Highly productive", and as indicated is a combination of objective and subjective data acquired during the course of the virtual meeting in conjunction with anonymous large datasets collected from virtual meetings of similar teams.

Each of the voice streams are captured as files. Because the voice transmission is voice activated, the voice files will tend to be sequential. A metadata entry is created for each file including, without limitation, timetag index, participant speaker index, meeting index, file information, duration, speech-to-text metadata, common language translation metadata (if necessary), and quality score.

Shared data will typically be one of the following categories, namely, pictures (e.g., jpg, png, tiff), videos (2D or 3D) and 3D objects. Additionally, each category may include annotation layers (e.g., a picture may have drawing layers from several of the participants). Both the original shared data and any annotation layers can be saved as files. The annotation layers may be saved as gif sequences to include animation metadata. Similar to the voice blocks, these will tend to be sequential and are named accordingly. A metadata entry is created for each shared data object and includes the following information, without limitation, time-tag index, originating participant index, layers participant indices, meeting index, original file information, layers file information, duration (time that it remains in the shared space), type of metadata (e.g., jpg, size, resolution, aspect ratio), layers count, and layers order.

Emotion, motion and virtual representation (e.g., avatar) metadata may create files, but more readily be captured as database entries. The following emotions and virtual representation gestures are captured by means of movement and camera capture (via a coupler agent) such as, without limitation, assentive and/or dissentive nod (motion capture detects head movement up and down for a duration), smile (camera captures a smile relative to idle mouth position), frown (camera captures a frown relative to idle mouth position), motion gestures while speaking (camera and software interpolate hand and arm gestures relative to idle position), relative voice volume (indicating emotion change), and attention turns (motion capture detects head and eye turns towards either another participant or towards the shared data space). The following metadata is created for these emotive and virtual representation related motions including, without limitation, timetag index, participant index, emotive or virtual representation motion, and motion interpretation.

Figure 23:
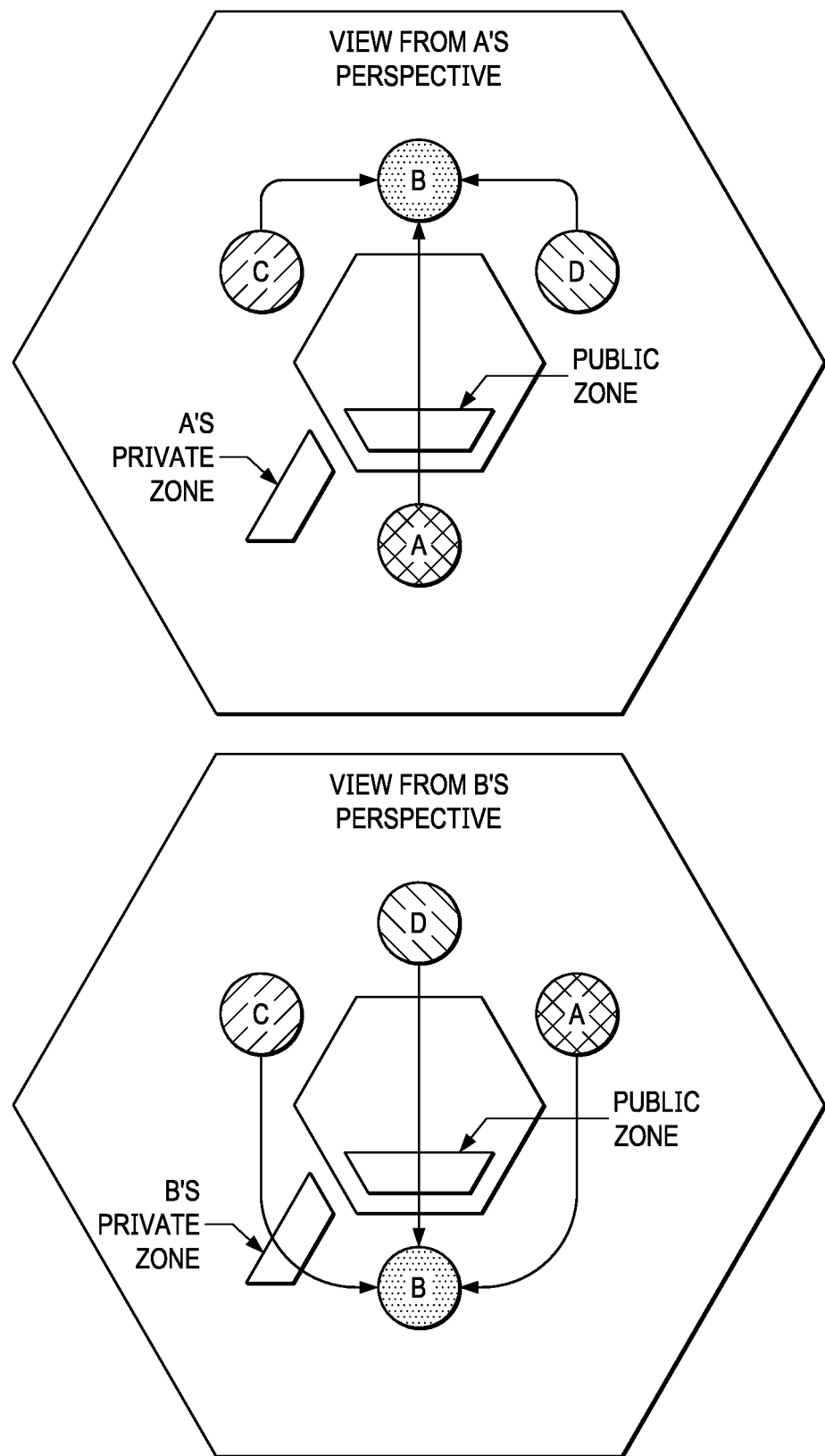
FIGS. 23 to 25 illustrate a top view and pictorial views of embodiments of collaborative virtual rooms demonstrating positional information for participants represented by virtual representations therein.

Turning now to FIG. 23, illustrated is a top view of an embodiment of a collaborative virtual room demonstrating positional information for participants (entities) represented by virtual representations therein. From entity A's perspective, a virtual representation B is directly across from a virtual representation A, and a shared space of a public zone is directly in front of the virtual representation A and oriented toward the virtual representation A. A private zone is to the left of the virtual representation A. The virtual representation B is speaking so that the virtual representation A observes that a virtual representation C is turned towards and looking at the virtual representation B, which is to the virtual representation C's left. The virtual representation A also observes that a virtual representation D is turned towards and looking at the virtual representation B, which is to the virtual representation D's right.

Figure 24:
Figure 25:

From entity B's perspective, the virtual representation D is directly across from the virtual representation B, and the shared space of the public zone is directly in front of the virtual representation B and oriented toward the virtual representation B. A private space is to the left of the virtual representation B. The virtual representation B is speaking and observes that all other virtual representations are facing towards and looking at him (the virtual representation B). The virtual representations C and D are turned in a different direction from the perspective of the virtual representation B in comparison to the virtual representation A. In fact the virtual representation D's position is different between the two views. However, in both views the correct behavior will be observed, namely, that the virtual representations are looking at the virtual representation B. In fact, a default position may be that the non-speaking virtual representations direct their respective attention to the speaking virtual representation. In support of the positioning information, FIGS. 24 and 25 illustrate pictorial views of collaborative virtual rooms for participants (entities) represented by virtual representations therein.

Figure 26:
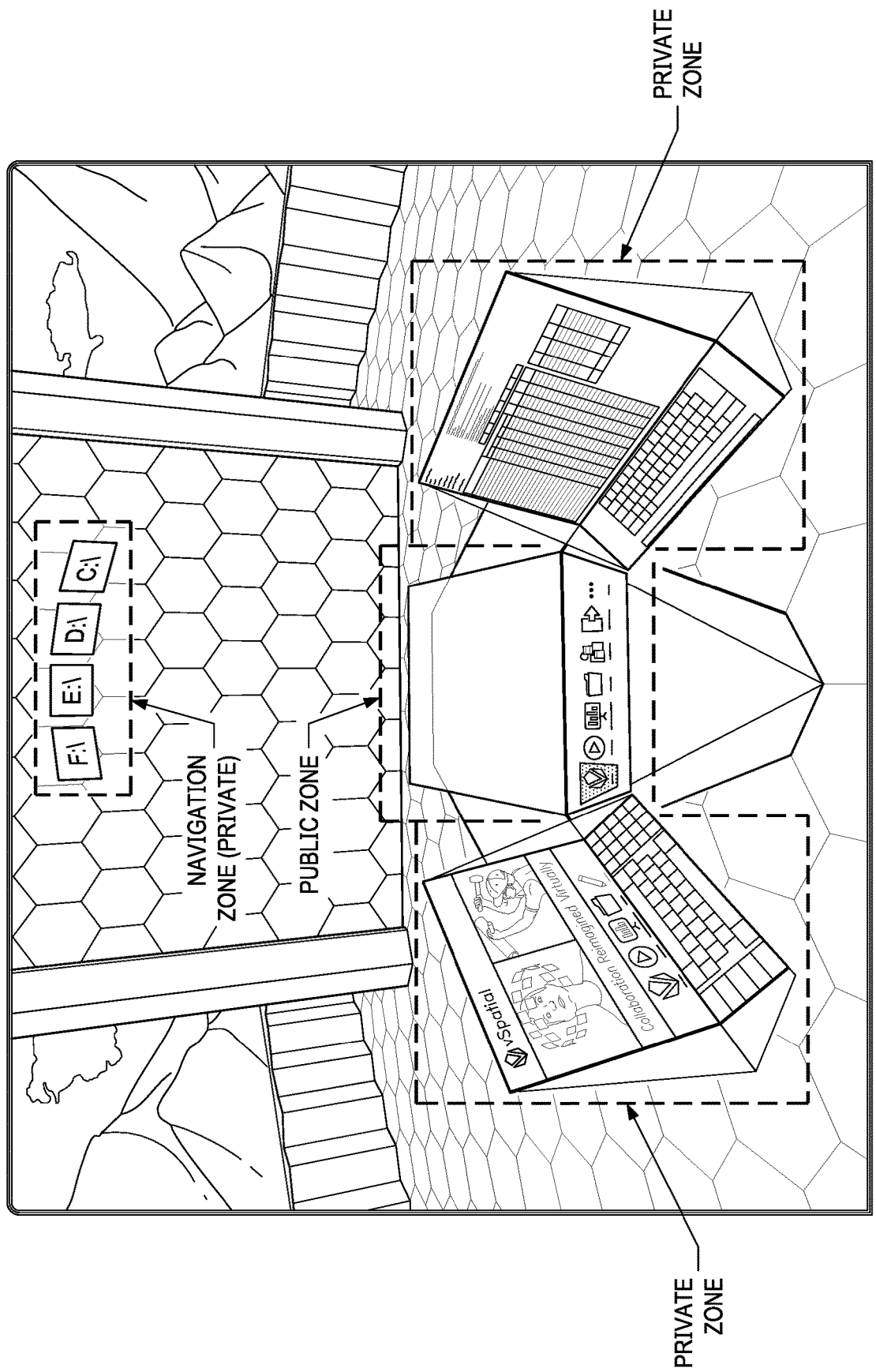
FIG. 26 illustrates a pictorial view of an embodiment of a collaborative virtual room.

Turning now to FIG. 26, illustrated is a pictorial view of an embodiment of a collaborative virtual room. The collaborative virtual room is segmented into a public zone that is synchronized to accommodate a virtual session, and a private zone that is viewable locally. The private zone also includes a navigation zone used for navigation of desktop or cloud data.

The public zone is a shared space. The participants (entities) via virtual representations see and hear everything that is located in the public zone. The VR system synchronizes audio and the view. There are options for managing the public zone including token managed or free-for-all. With the first option enabled (token managed), each participant requests a collaboration token from the current owner before being allowed to add something to the shared space. With the second option enabled (free-for-all), any participant may place data into the shared space, which will replace the previous owners shared data. Annotative layers are added onto the original document (in the event of a digital object being a document) and can be done by any participant. Any layer may be removed and layers may be ordered differently.

The private zone is similar to the public zone in capability, except for the fact that the operations are only done by and visible to the owner participant. One of the options in the private zone is the ability to create a "cone of silence." This is useful when it is necessary to take an outside call, wherein the other meeting participants and the caller cannot hear or speak to one another. It is possible to add the caller into the meeting at which point a default virtual representation is instantiated for that caller.

Figure 27:
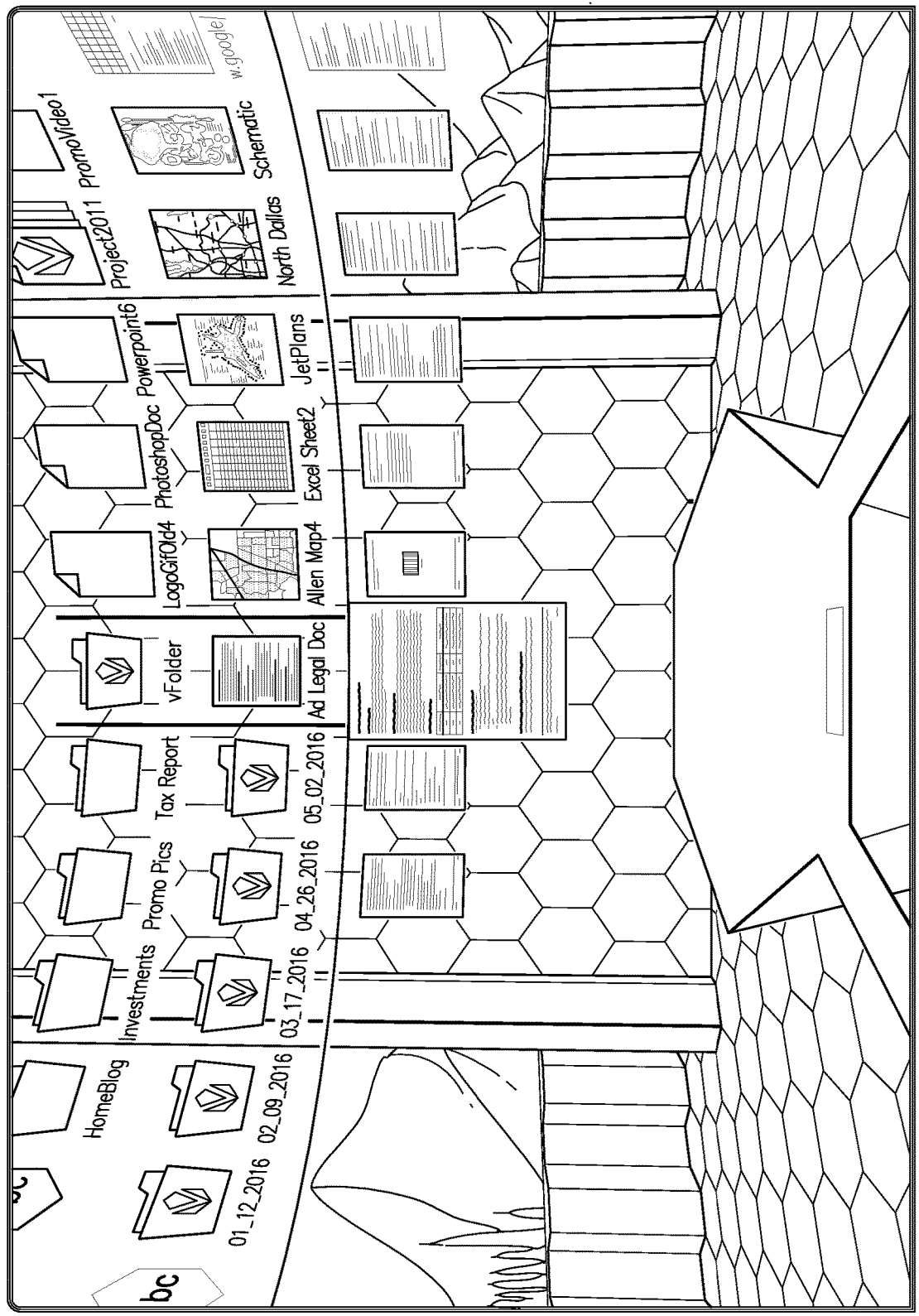
FIG. 27 illustrates a pictorial view of an embodiment of a navigation zone.

Turning now to FIG. 27, illustrated is a pictorial view of an embodiment of a navigation zone. The navigation zone is a private zone for interacting with one's own datasets, whether located on the desktop, mobile or cloud devices. The navigation zone may include several tiers including, without limitation, a device tier (e.g., cloud, desktop drive, mobile), folder tier (e.g., folders within the device tier that may be several levels) and document tier (e.g., data objects including pictures, videos, web sites, 3D objects).

Figure 28:
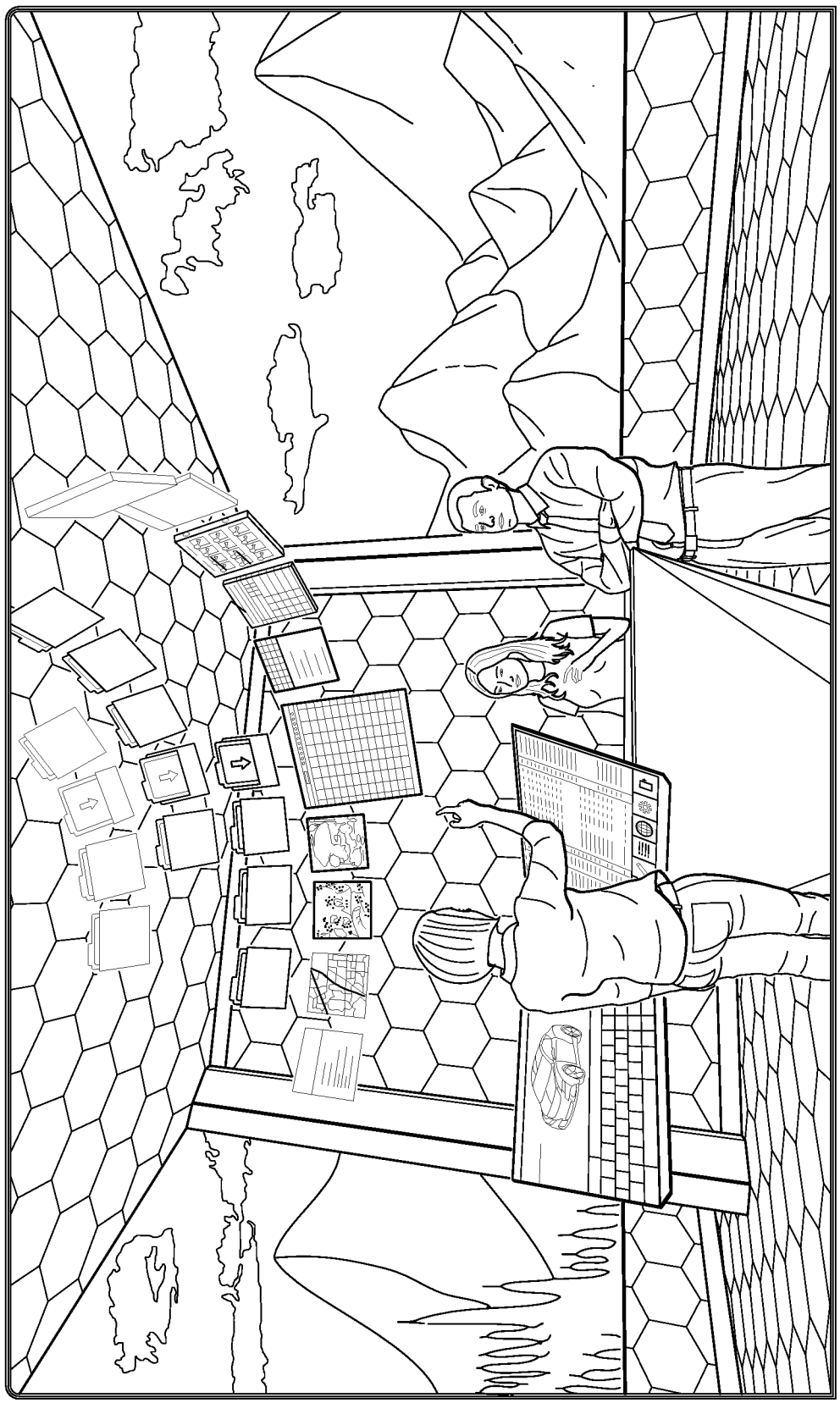
FIGS. 28 and 29 illustrate pictorial views of embodiments of collaborative virtual rooms including navigation zones.
Figure 29:
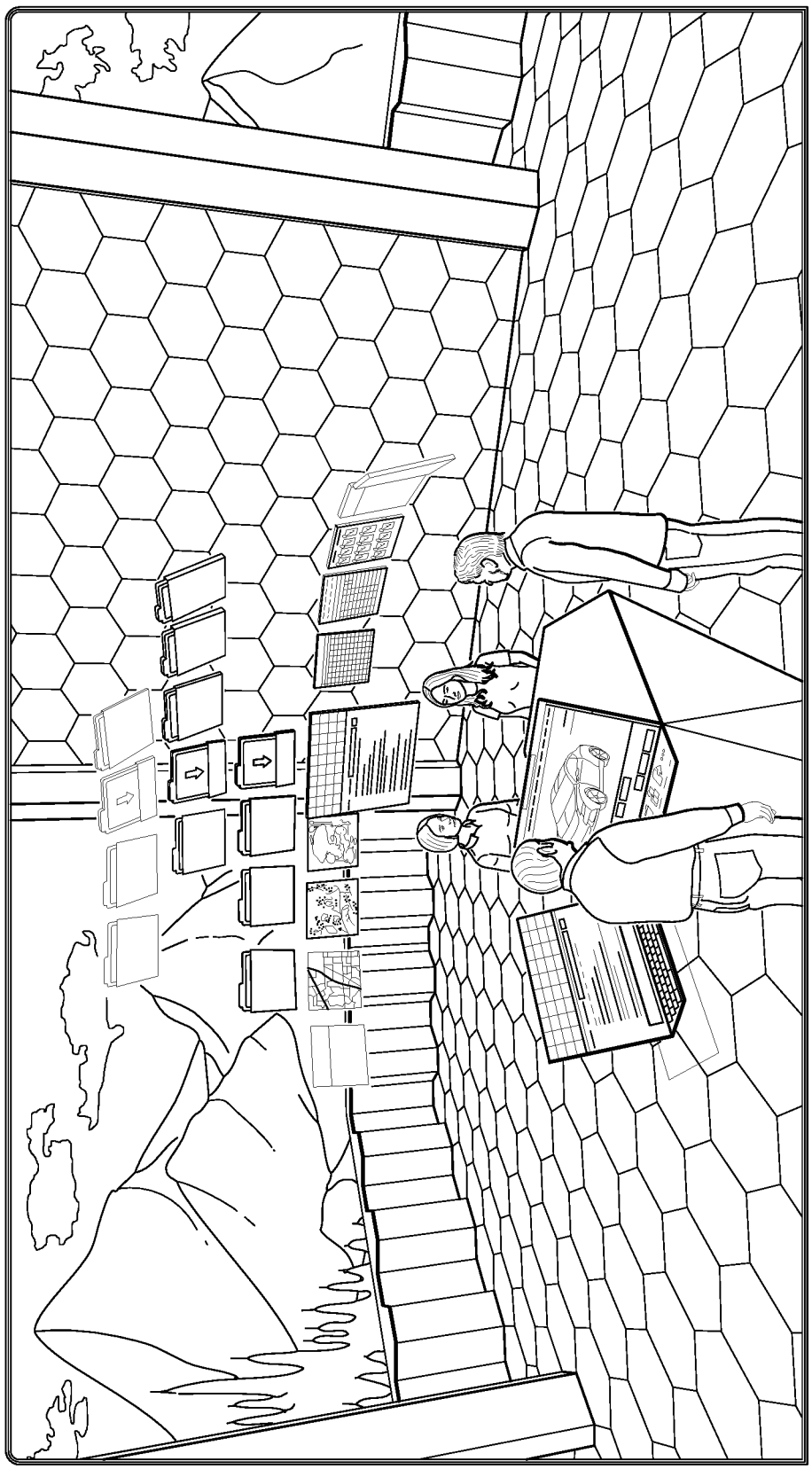

When a document is selected, the third tier becomes the pages of the document. These can then be pulled into either the navigation or private zones. Once in these zones, the page has the following navigation functions, without limitation, zoom in/out, pan left/right/up/down (active after the first zoom in and inactive when the document is completely zoomed out), page left/right (moves to previous/next page on the third tier), scroll up/down (moves the image up/down or in the case of a web page scrolls up/down). FIGS. 28 and 29 illustrate further pictorial views of embodiments of collaborative virtual rooms including navigation zones.

Turning now to FIGS. 30 to 35, illustrated are flow diagrams of an embodiment of a method 3000 of operating a communication system (200) such as a virtual reality ("VR") system. In addition to the method steps, the discussion of the method 3000 that follows will identify example elements (in parentheses) from preceding FIGUREs. Beginning with FIG. 30, the method 3000 begins at a start step or module 3005. At a step or module 3010, the communication system (200) creates a first access virtual room (247) with a first client (230) coupled to a first coupler agent (220)

physically connectable to a first entity (215), and a second access virtual room (267) with a second client (270) coupled to a second coupler agent (280) physically connectable to a second entity (295). The first client (230) may be embodied in the first coupler agent (220, 310) (or be discrete components), and the second client (270) may be embodied in the second coupler agent (280, 320) (or be discrete components). The first client (230) and second client (270) register the first entity (215) and the second entity (295), respectively, by providing information about the first entity (215) and the second entity (295), and metadata representing a first virtual representation (243) (e.g., an avatar) of the first entity (215) and a second virtual representation (263) (e.g., an avatar) of the second entity (295) to a server (255) via the first access virtual room (247) and the second access virtual room (267), respectively, at a step or module 3015. The first access virtual room (247) is only accessible by the first entity (215), and the second access virtual room (267) is only accessible by the second entity (295).

At a step or module 3020, the communication system (200) creates a first private zone (246) within a first collaborative virtual room (241) with the first client (230), and a second private zone (266) within a second collaborative virtual room (261) with the second client (270). The first private zone (246) is only accessible by the first entity (215), and the second private zone (266) is only accessible by the second entity (295). The first and second private zones (246, 266) may include a navigation zone.

At a step or module 3025, the first client (230) accesses (e.g., initiates) a virtual session with the server (255), and the second client (270) responds by accessing (e.g., joining) the virtual session with the server (255) at a step or module 3030. The first client (230) then receives an instruction from the server (255) to instantiate the first virtual representation (243) of the first entity (215) in a first public zone (242) of the first collaborative virtual room (241) at a step or module 3035. Likewise, the second client (270) then receives an instruction from the server (255) to instantiate the second virtual representation (263) of the second entity (295) in a second public zone (262) of the second collaborative virtual room (261) at a step or module 3040.

At a step or module 3045, the first client (230) receives a response from the server (255) including metadata representing the second virtual representation (263) of the second entity (295). Likewise, the second client (270) receives a response from the server (255) including metadata representing the first virtual representation (243) of the first entity (215) at a step or module 3050. The communication system (200) thereafter instantiates the second virtual representation (263) in the first public zone (242) of the first collaborative virtual room (241) rendered from a perspective of the first entity (215) at a step or module 3055. Likewise, the communication system (200) instantiates the first virtual representation (243) in the second public zone (262) of the second collaborative virtual room (261) rendered from a perspective of the second entity (295) at a step or module 3060.

At a step or module 3065, the first client (230) selects a position of the second virtual representation (263) in the first public zone (242) of the first collaborative virtual room (241). The position of the second virtual representation (263) in the first public zone (242) of the first collaborative virtual room (241) may be based on a role of the second entity (295). Likewise, the second client (270) selects a position of the first virtual representation (243) in the second public zone (262) of the second collaborative virtual room (261) at a step or module 3070. The position of the first virtual representation (243) in the second public zone (262) of the second collaborative virtual room (261) may be based on a role of the first entity (215).

At a decisional step or module 3075, the communication system (200) determines if a digital object (218) will be introduced into the virtual session. If a digital object (218) will be introduced into the virtual session then the method 3000 continues to a step or module 3105 of FIG. 31, otherwise the method 3000 continues to a decisional step or module 3080.

Figure 31:
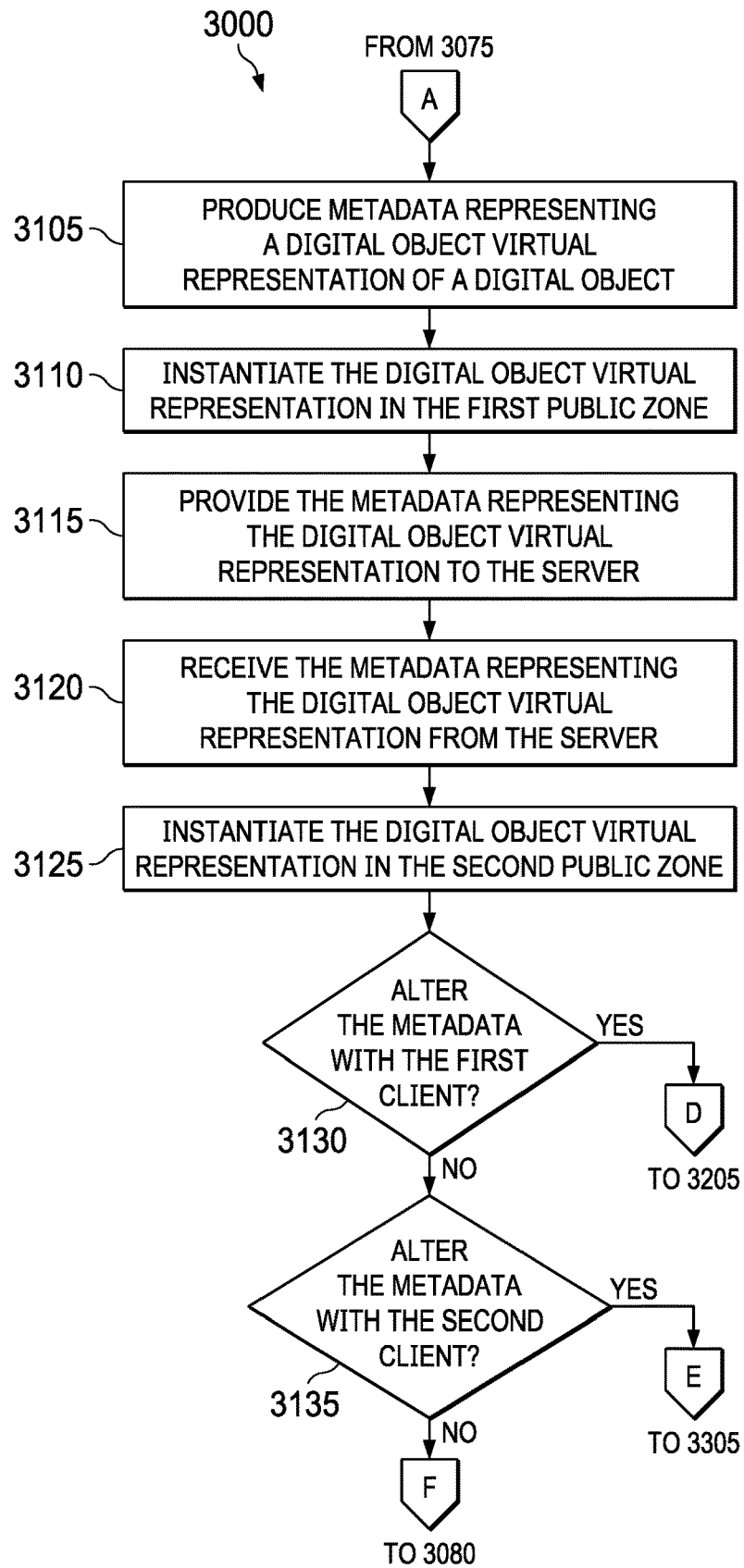

Turning now to FIG. 31 and the step or module 3105, the first client (230) produces metadata representing a digital object virtual representation (245A) of the digital object (218). At a step or module 3110, the first client (230) instantiates the digital object virtual representation (245A) in the first public zone (242) of the first collaborative virtual room (241) from a perspective of the first entity (215). The first client (230) then provides the metadata representing the digital object virtual representation (245A) to the server (255) at a step or module 3115. At a step or module 3120, the second client (270) receives the metadata representing the digital object virtual representation (245A) from the server (255), and instantiates the digital object virtual representation (245A) in the second public zone (262) of the second collaborative virtual room (261) from the perspective of the second entity (295) at a step or module 3125.

At a decisional step or module 3130, the communication system (200) determines if the first client (230) will alter the metadata representing the digital object virtual representation (245A). If the first client (230) will alter the metadata then the method 3000 continues to a step or module 3205 of FIG. 32, otherwise the method 3000 continues to a decisional step or module 3135.

Figure 32:
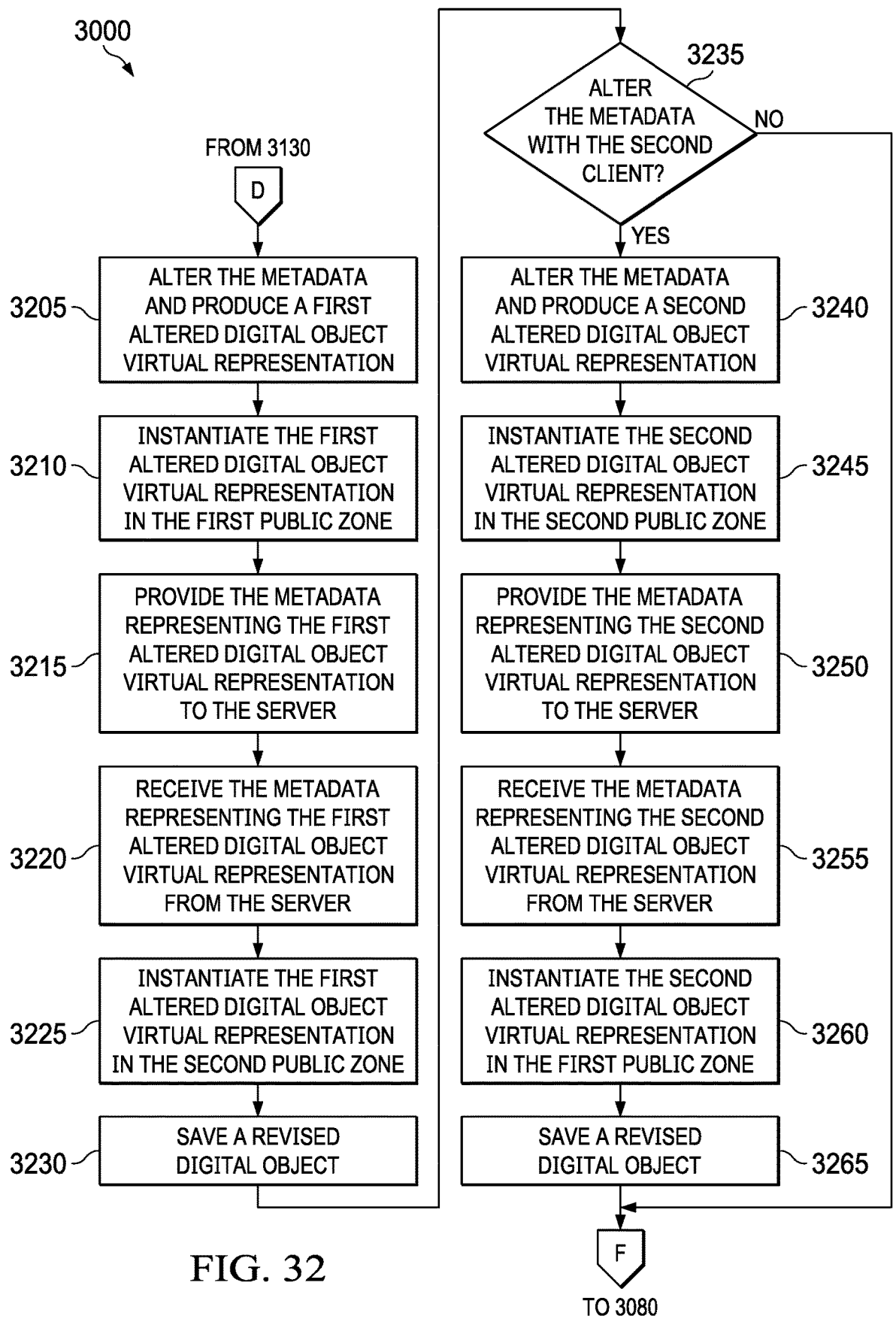

Turning now to FIG. 32 and the step or module 3205, the first client (230) alters the metadata representing the digital object virtual representation (245A), and produces a first altered digital object virtual representation (245B) of the digital object (218). At a step or module 3210, the first client (230) instantiates the first altered digital object virtual representation (245B) in the first public zone (242) of the first collaborative virtual room (241) from a perspective of the first entity (215). The first client (230) then provides the metadata representing the first altered digital object virtual representation (245B) to the server (255) at a step or module 3215. At a step or module 3220, the second client (270) receives the metadata representing the first altered digital object virtual representation (245B) from the server (255), and instantiates the first altered digital object virtual representation (245B) in the second public zone (262) of the second collaborative virtual room (261) from the perspective of the second entity (295) at a step or module 3225. At a step or module 3230, the communication system (200) then saves a revised digital object (218A) representing the first altered digital object virtual representation (245B) of the digital object (218) with, for example, the first client (230) or the second client (270). The first client (230) (an originating client) may save the revised digital object (218A) representing the first altered digital object virtual representation (245B) of the digital object (218) in a native format. Of course, the revised digital object (218A) may be saved, without limitation, in memory (217, 297) associated with the first and second entities (215, 295), respectively, and/or memory (235, 275) of the first and second clients (230, 270) associated with the first and second entities (215, 295), respectively, and/or memory (257) of the server (255).

At a decisional step or module 3235, the communication system (200) determines if the second client (270) will alter the metadata representing the first altered digital object virtual representation (245B). If the second client (270) will not alter the metadata, the communication system (200) transitions to a step or module 3080 of FIG. 30. If the second client (270) will alter the metadata, the second client (270) alters the metadata representing the first altered digital object virtual representation (245B), and produces a second altered digital object virtual representation (245C) of the digital object (218) at a step or module 3240. At a step or module 3245, the second client (270) instantiates the second altered digital object virtual representation (245C) in the second public zone (262) of the second collaborative virtual room (261) from a perspective of the second entity (295). The second client (270) then provides the metadata representing the second altered digital object virtual representation (245C) to the server (255) at a step or module 3250. At a step or module 3255, the first client (230) receives the metadata representing the second altered digital object virtual representation (245C) from the server (255), and instantiates the second altered digital object virtual representation (245C) in the first public zone (242) of the first collaborative virtual room (241) from the perspective of the first entity (215) at a step or module 3260. At a step or module 3265, the communication system (200) then saves a revised digital object (218B) representing the second altered digital object virtual representation (245C) of the digital object (218) with, for example, the first client (230) or the second client (270). The first client (230) (an originating client) may save the revised digital object (218B) representing the second altered digital object virtual representation (245C) of the digital object (218) in a native format. Again, the revised digital object (218B) may be saved, without limitation, in memory (217, 297) associated with the first and second entities (215, 295), respectively, and/or memory (235, 275) of the first and second clients (230, 270) associated with the first and second entities (215, 295), respectively, and/or memory (257) of the server (255). The communication system (200) thereafter transitions to the step or module 3080 of FIG. 30.

Returning to the decisional step or module 3130 of FIG. 31, if the first client (230) will not alter the metadata, the method 3000 continues to a decisional step or module 3135 wherein the communication system (200) determines if the second client (270) will alter the metadata representing the digital object virtual representation (245A). If the second client (270) will not alter the metadata, the communication system (200) transitions to the step or module 3080 of FIG. 30, otherwise the method 3000 continues to a step or module 3305 of FIG. 33.

Figure 33:
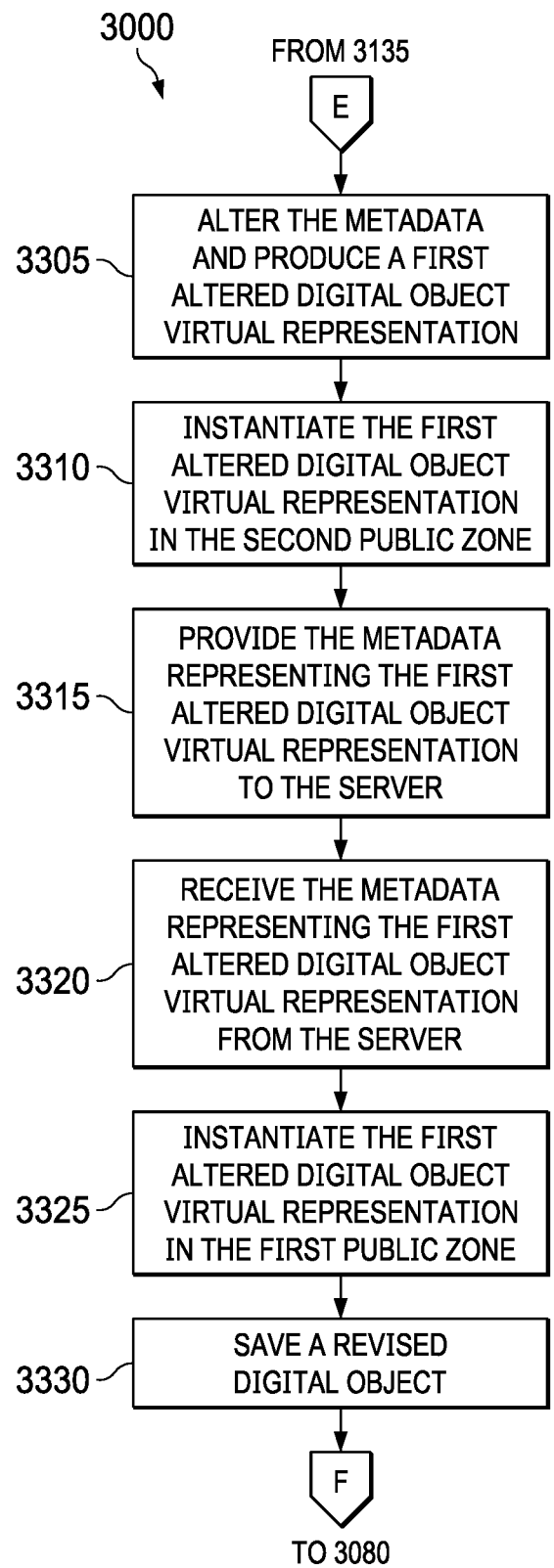

Turning now to FIG. 33 and the step or module 3305, the second client (270) alters the metadata representing the digital object virtual representation (245A), and produces a first altered digital object virtual representation (245B) of the digital object (218) at a step or module 3305. At a step or module 3310, the second client (270) instantiates the first altered digital object virtual representation (245B) in the second public zone (262) of the second collaborative virtual room (261) from a perspective of the second entity (295). The second client (270) then provides the metadata representing the first altered digital object virtual representation (245B) to the server (255) at a step or module 3315. At a step or module 3320, the first client (230) receives the metadata representing the first altered digital object virtual representation (245B) from the server (255), and instantiates the first altered digital object virtual representation (245B) in the first public zone (242) of the first collaborative virtual room (241) from the perspective of the first entity (215) at a step or module 3325. At a step or module 3330, the communication system (200) then saves a revised digital object (218A) representing the first altered digital object virtual representation (245B) of the digital object (218) with, for example, the first client (230) or the second client (270). The first client (270) (an originating client) may save the revised digital object (218A) representing the first altered digital object virtual representation (245B) of the digital object (218) in a native format. Again, the revised digital object (218A) may be saved, without limitation, in memory (217, 297) associated with the first and second entities (215, 295), respectively, and/or memory (235, 275) of the first and second clients (230, 270) associated with the first and second entities (215, 295), respectively, and/or memory (257) of the server (255). Of course, revisions of the digital object (218) may take on several iterations between the first and second entities (215, 295) and other entities as well. The communication system (200) thereafter transitions to the step or module 3080 of FIG. 30.

Figure 30:
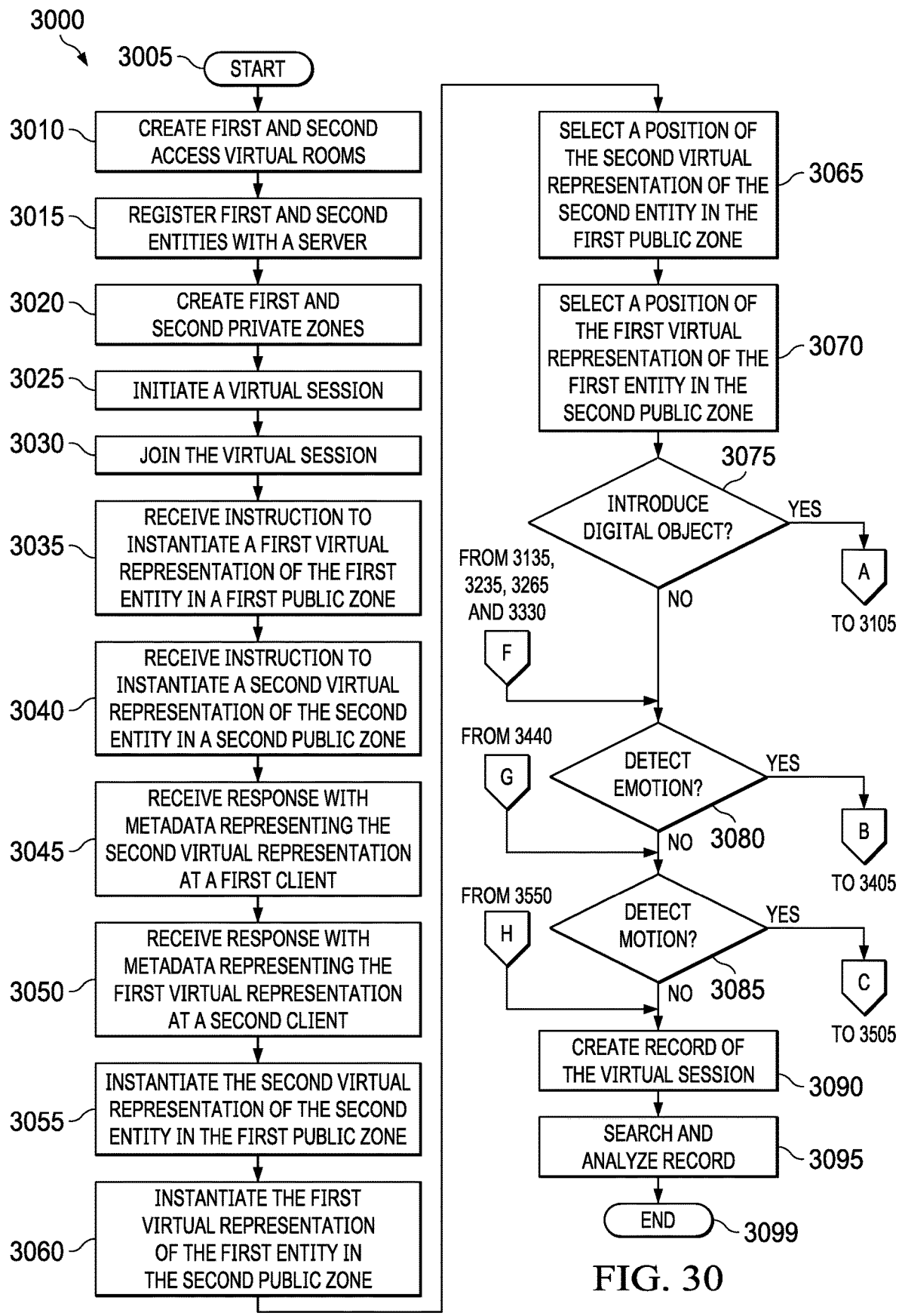
FIGS. 30 to 35 illustrate flow diagrams of an embodiment of a method of operating a communication system.

At the decisional step or module 3080 of FIG. 30, the communication system (200) determines if an emotion (and/or emotions) is detected with respect to an entity such as the first entity (215). If an emotion is detected with respect to the first entity (215) then the method 3000 continues to a step or module 3405 of FIG. 34, otherwise the method 3000 continues to a decisional step or module 3085.

Figure 34:
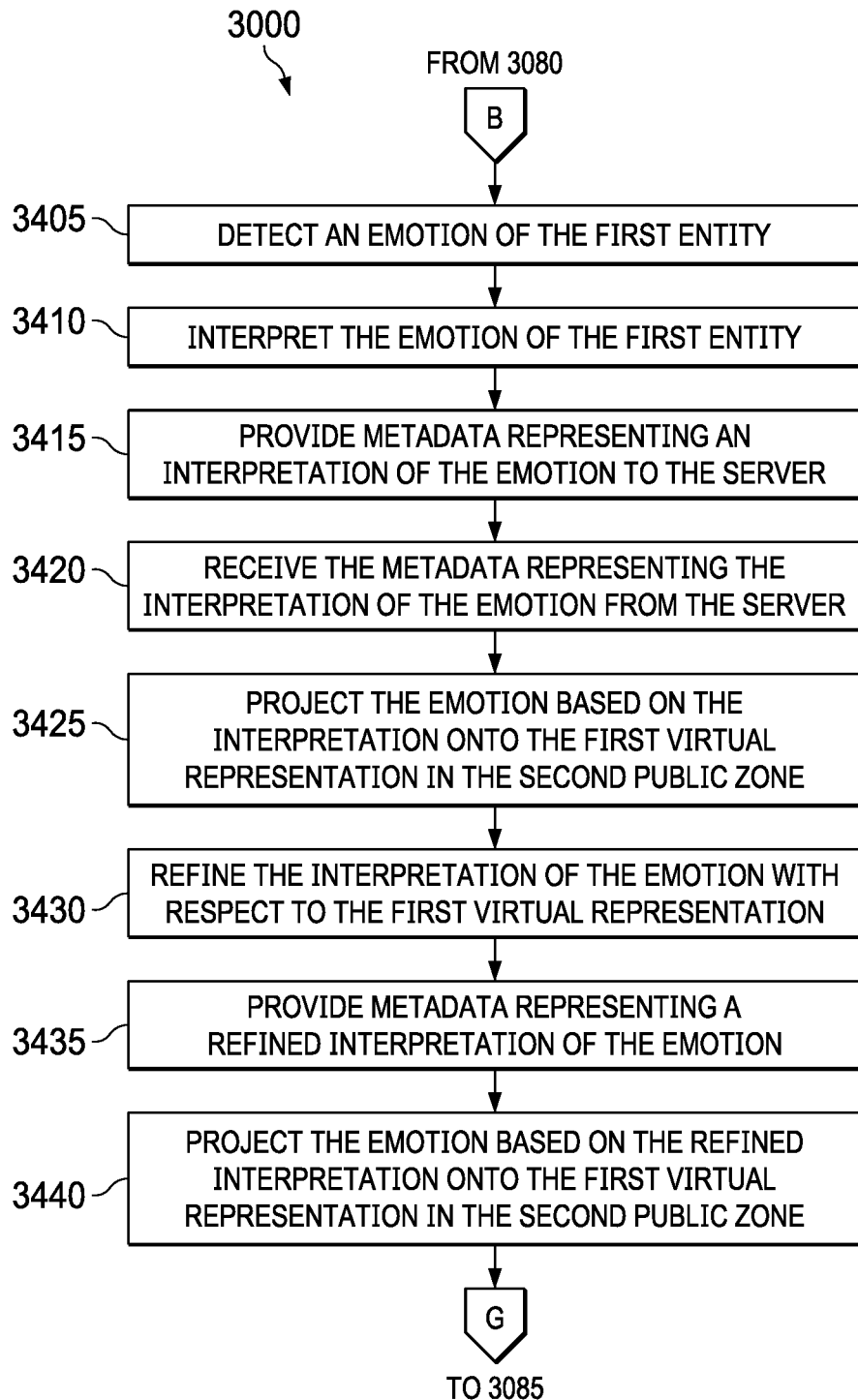

Turning now to FIG. 34, the first coupler agent (220) detects an emotion (and/or emotions) of the first entity (215) at the step or module 3405. The first client (230) then interprets the emotion of the first entity (215) at a step or module 3410. At a step or module 3415, the first client (230) provides metadata representing an interpretation of the emotion with respect to the first virtual representation (243) of the first entity (215) to the server (255). The second client (270) receives the metadata representing the interpretation of the emotion with respect to the first virtual representation (243) of the first entity (215) from the server (255) at a step or module 3420. At a step or module 3425, the second client (270) projects the emotion based on the interpretation onto the first virtual representation (243) in the second public zone (262) of the second collaborative virtual room (261) from the perspective of the second entity (295). The emotion may be an assentive emotion or a dissentive emotion.

At a step or module 3430, the second client (270) may refine the interpretation of the emotion with respect to the first virtual representation (243), and provide metadata representing a refined interpretation of the emotion with respect to the first virtual representation (243) of the first entity (215) at a step or module 3435. The second client (270) then projects the emotion based on the refined interpretation onto the first virtual representation (243) in the second public zone (262) of the second collaborative virtual room (261) from the perspective of the second entity (295) at a step or module 3440. Thereafter, the method 3000 returns to the decisional step or module 3085 of FIG. 30.

At the decisional step or module 3085 of FIG. 30, the communication system (200) determines if a motion (and/or gaze) is detected with respect to an entity such as the first entity (215). If a motion is detected with respect to the first entity (215) then the method 3000 continues to a step or module 3505 of FIG. 35, otherwise the method 3000 continues to a step or module 3090.

Figure 35:
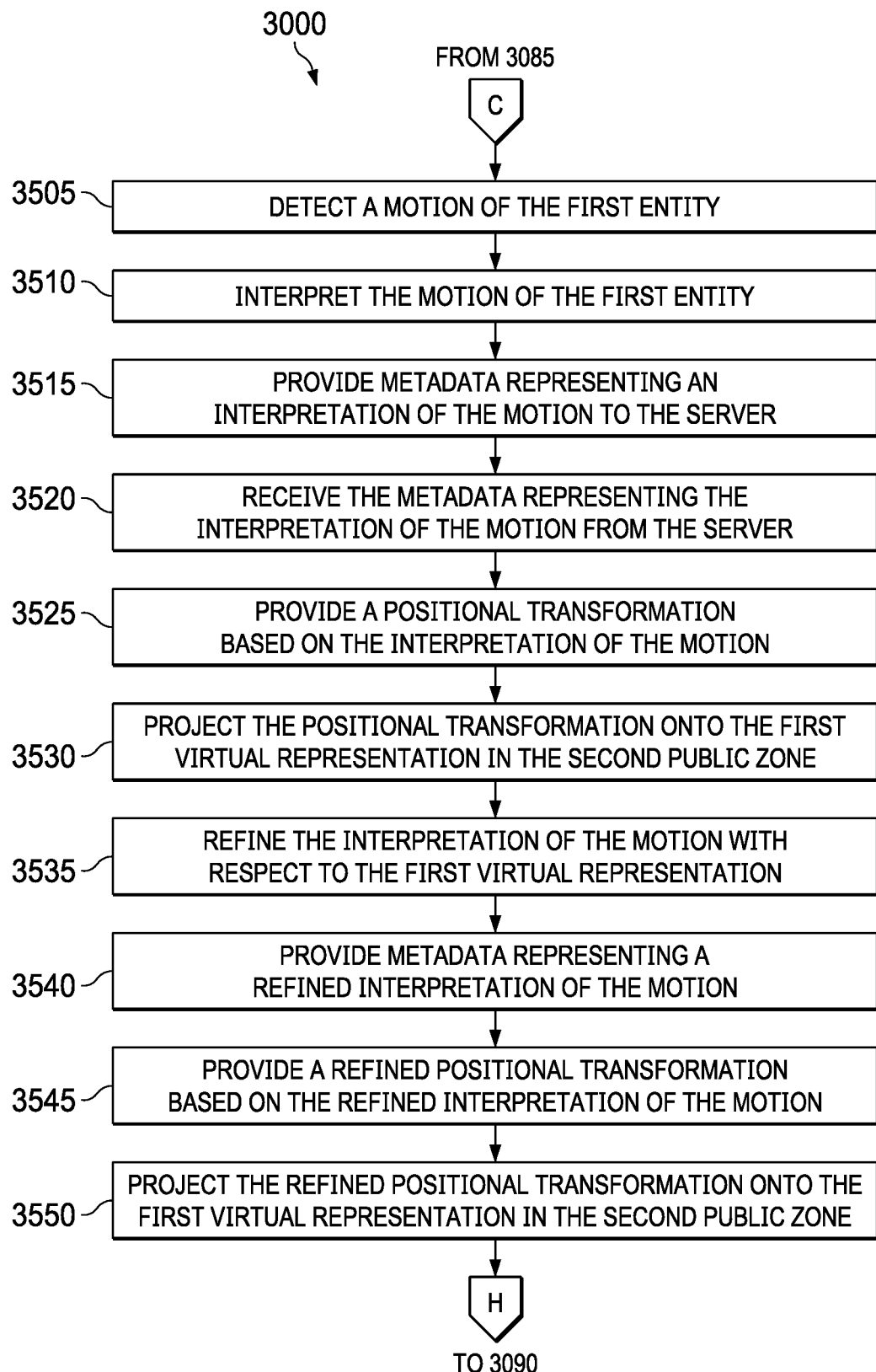

Turning now to FIG. 35, the first coupler agent (220) detects a motion (and/or gaze) of the first entity (215) at the step or module 3505. The first client (230) then interprets the motion of the first entity (215) at a step or module 3510. At a step or module 3515, the first client (230) provides metadata representing an interpretation of the motion with respect to the first virtual representation (243) of the first entity (215) to the server (255). The second client (270) receives the metadata representing the interpretation of the motion with respect to the first virtual representation (243) of the first entity (215) from the server (255) at a step or module 3520. The second client (270) provides a positional transformation (and/or gaze orientation) based on the interpretation of the motion with respect to the first virtual representation (243) at a step or module 3525. At a step or module 3530, the second client (270) projects the positional transformation (and/or gaze orientation) onto the first virtual representation (243) in the second public zone (262) of the second collaborative virtual room (261) from the perspective of the second entity (295).

At a step or module 3535, the second client (270) may refine the interpretation of the motion (and/or gaze) with respect to the first virtual representation (243), and provide metadata representing a refined interpretation of the motion with respect to the first virtual representation (243) of the first entity (215) at a step or module 3540. The second client (270) provides a refined positional transformation (and/or gaze orientation) based on the refined interpretation of the motion with respect to the first virtual representation (243) at a step or module 3545. The second client (270) then projects the refined positional transformation (and/or gaze orientation) onto the first virtual representation (243) in the second public zone (262) of the second collaborative virtual room (261) from the perspective of the second entity (295) at a step or module 3550. Thereafter, the method 3000 returns to the step or module 3090 of FIG. 30.

At the step or module 3090 of FIG. 30, the communication system (200) creates a record (vRecord) of the virtual session between the first entity (215) and the second entity (295) with the server (255). The record may include all of the branches of the method 3000 as set forth above. It should be understood that the creation of the record is ongoing throughout the virtual session and at this point the term "create" includes finalizing, logging and/or storing the record of the virtual session. The method 3000 may further allow the first or second client (230, 270) to search for and analyze information in the record at a step or module 3095. The method 3000 ends at a step or module 3099. While the steps, modules and branches of operating the communication system (200) have been described in the environment of a single method 3000, it should be understood that a method of operating the communication system (200) can be performed in separate methods performing only portions of the steps or modules (and/or re-ordered) as set forth above. Additionally, the metadata representing the objects, actions, etc. allow the expansion of the virtual session to many participants. For a better understanding of business meetings and collaboration, see "Business Meetings: The Case for Face-To-Face," Forbes|Insights. (2009), and "Collaboration 2.0—Death of the Web Conference (As We Know It)," Ovum. (2014), which are incorporated herein by reference. Additionally, the processes of capturing emotions and motions, and other processes herein, may begin with different entities and, of course, continue throughout the virtual session.

Thus, a communication system and method for creating a collaborative virtual session have been introduced herein. In one embodiment, the communication system (200) includes a first coupler agent (220) physically connectable to a first entity (215) at a first location (210), a second coupler agent (280) physically connectable to a second entity (295) at a second location (290), and a first client (230) coupled to the first coupler agent (220) and a server (255) via a network (250). The first client (230) is configured to initiate (3025) a virtual session with the server (255), receive (3035) an instruction from the server (255) to instantiate a first virtual representation (243, e.g., an avatar) of the first entity (215) in a first public zone (242) of a first collaborative virtual room (241), receive (3045) a response from the server (255) including metadata representing a second virtual representation (263, e.g., an avatar) of the second entity (295), and instantiate (3055) the second virtual representation (263) in the first public zone (242) of the first collaborative virtual room (241) rendered from a perspective of the first entity (215). The communication system (200) also includes a second client (270), coupled to the second coupler agent (280) and the server (255) via the network (250), configured to join (3030) the virtual session with the server (255), receive (3040) an instruction from the server (255) to instantiate the second virtual representation (263) in a second public zone (262) of a second collaborative virtual room (261), receive (3050) a response from the server (255) including metadata representing the first virtual representation (243) of the first entity (215), and instantiate (3060) the first virtual representation (243) in the second public zone (262) of the second collaborative virtual room (261) rendered from a perspective of the second entity (295).

The first client (230) is configured to create (3020) a first private zone (246) within the first collaborative virtual room (241), which is only accessible by the first entity (215). The first client (230) is configured to create (3010) a first access virtual room (247). The first client (230) is configured to register (3015) the first entity (215) by providing information about the first entity (215) and the metadata representing the first virtual representation (243) of the first entity (215) to the server (255) via the first access virtual room (247). The first access virtual room (247) is only accessible by the first entity (215).

The first client (230) is configured to select (3065) a position of the second virtual representation (263) in the first public zone (242) of the first collaborative virtual room (241). The position of the second virtual representation (263) in the first public zone (242) of the first collaborative virtual room (241) is based on a role of the second entity (295).

The first client (230) is configured to produce (3105) metadata representing a digital object virtual representation (245A) of a digital object (218), instantiate (3110) the digital object virtual representation (245A) in the first public zone (242) of the first collaborative virtual room (241) from the perspective of the first entity (215), and provide (3115) the metadata representing the digital object virtual representation (245A) to the server (255). The second client (270) is configured to receive (3120) the metadata representing the digital object virtual representation (245A) from the server (255), and instantiate (3125) the digital object virtual representation (245A) in the second public zone (262) of the second collaborative virtual room (261) from the perspective of the second entity (295).

The first client (230) is configured to alter (3205) the metadata representing the digital object virtual representation (245A) and produce a first altered digital object virtual representation (245B) of the digital object (218), instantiate (3210) the first altered digital object virtual representation (245B) in the first public zone (242) of the first collaborative virtual room (241) from the perspective of the first entity (215), and provide (3215) metadata representing the first altered digital object virtual representation (245B) to the server (255). The second client (270) is configured to receive (3220) the metadata representing the first altered digital object virtual representation (245B) from the server (255), and instantiate (3225) the first altered digital object virtual representation (245B) in the second public zone (262) of the second collaborative virtual room (261) from the perspective of the second entity (295). The first client (230) or the second client (270) is configured to save (3230) a revised digital object (218A) representing the first altered digital object virtual representation (245B) of the digital object (218) in, for instance, a native format.

The second client (270) is configured to alter (3240) the metadata representing the first altered digital object virtual representation (245B) and produce a second altered digital object virtual representation (245C) of the digital object (218), instantiate (3245) the second altered digital object virtual representation (245C) in the second public zone (262) of the second collaborative virtual room (261) from the perspective of the second entity (295), and provide (3250) metadata representing the second altered digital object virtual representation (245C) to the server (255). The first client (230) is configured to receive (3255) the metadata representing the second altered digital object virtual representation (245C) from the server (255), and instantiate (3260) the second altered digital object virtual representation (245C) in the first public zone (242) of the first collaborative virtual room (241) from the perspective of the second entity (215). The first client (230) or the second client (270) is configured to save (3265) a revised digital object (218B) representing the second altered digital object virtual representation (245C) of the digital object (218) in, for instance, a native format.

The second client (270) is also configured to alter (3305) the metadata representing the digital object virtual representation (245A) and produce a first altered digital object virtual representation (245B) of the digital object (218), instantiate (3310) the first altered digital object virtual representation (245B) in the second public zone (262) of the second collaborative virtual room (261) from the perspective of the second entity (295), and provide (3315) metadata representing the first altered digital object virtual representation (245B) to the server (255). The first client (230) is configured to receive (3320) the metadata representing the first altered digital object virtual representation (245B) from the server (255), and instantiate (3325) the first altered digital object virtual representation (245B) in the first public zone (242) of the first collaborative virtual room (241) from the perspective of the first entity (215). The first client (230) or the second client (270) is configured to save (3330) a revised digital object (218A) representing the first altered digital object virtual representation (245B) of the digital object (218) in, for instance, a native format.

The server (255) is configured to create (3090) a record of the virtual session between the first entity (215) and the second entity (295). The first client (230) or the second client (270) is configured to search for and analyze (3095) information in the record. The first client (230) may be embodied in the first coupler agent (220, 310) and the second client (270) may be embodied in the second coupler agent (280, 320).

The first coupler agent (220) is configured to detect (3405) an emotion (e.g., an assentive emotion or a dissentive emotion) of the first entity (215), and the first client (230) is configured to interpret (3410) the emotion of the first entity (215), and provide (3415) metadata representing an interpretation of the emotion with respect to the first virtual representation (243) of the first entity (215) to the server (255). The second client (270) is configured to receive (3420) the metadata representing the interpretation of the emotion with respect to the first virtual representation (243) of the first entity (215) from the server (255), and project (3425) the emotion based on the interpretation onto the first virtual representation (243) in the second public zone (262) of the second collaborative virtual room (261) from the perspective of the second entity (295). The second client (270) is configured to refine (3430) the interpretation of the emotion with respect to the first virtual representation (243), provide (3435) metadata representing a refined interpretation of the emotion with respect to the first virtual representation (243) of the first entity (215), and project (3440) the emotion based on the refined interpretation onto the first virtual representation (243) in the second public zone (262) of the second collaborative virtual room (261) from the perspective of the second entity (295).

The first coupler agent (220) is configured to detect (3505) a motion of the first entity (215), and the first client (230) is configured to interpret (3510) the motion of the first entity (215), and provide (3515) metadata representing an interpretation of the motion with respect to the first virtual representation (243) of the first entity (215) to the server (255). The second client (270) is configured to receive (3520) the metadata representing the interpretation of the motion with respect to the first virtual representation (243) of the first entity (215) from the server (255), provide (3525) a positional transformation based on the interpretation of the motion with respect to the first virtual representation (243), and project (3530) the positional transformation onto the first virtual representation (243) in the second public zone (262) of the second collaborative virtual room (261) from the perspective of the second entity (295). The second client (270) is configured to refine (3535) the interpretation of the motion with respect to the first virtual representation (243), provide (3540) metadata representing a refined interpretation of the motion with respect to the first virtual representation (243) of the first entity (215), provide (3545) a refined positional transformation based on the refined interpretation of the motion with respect to the first virtual representation (243), and project (3550) the refined positional transformation onto the first virtual representation (243) in the second public zone (262) of the second collaborative virtual room (261) from the perspective of the second entity (295). Of course, the aforementioned actions may be performed by any client, server, etc. within a collaborative virtual session.

Turning now to FIGS. 36 to 40, illustrated are flow diagrams of an embodiment of a method 3600 of operating a communication system (200) such as a virtual reality ("VR") system. In addition to the method steps, the discussion of the method 3600 that follows will identify example elements (in parentheses) from preceding FIGUREs. The method 3600 will be described from a perspective of a client such as a first client (230) of the communication system (200) and thus many actions performed by a second client (270) of the communication system (200) will hereinafter be summarily described. Of course, analogous actions can be performed by the second client (270) or any number of clients in the communication system (200). The first client (230) is coupled to a first coupler agent (220) physically connectable to a first entity (215) and in communication with a server (255). The server (255) is in communication with the second client (270) coupled to a second coupler agent (280) physically connectable to a second entity (295). The first client (230) may be embodied in the first coupler agent (220, 310) (or be discrete components), and the second client (270) may be embodied in the second coupler agent (280, 320) (or be discrete components).

Figure 36:
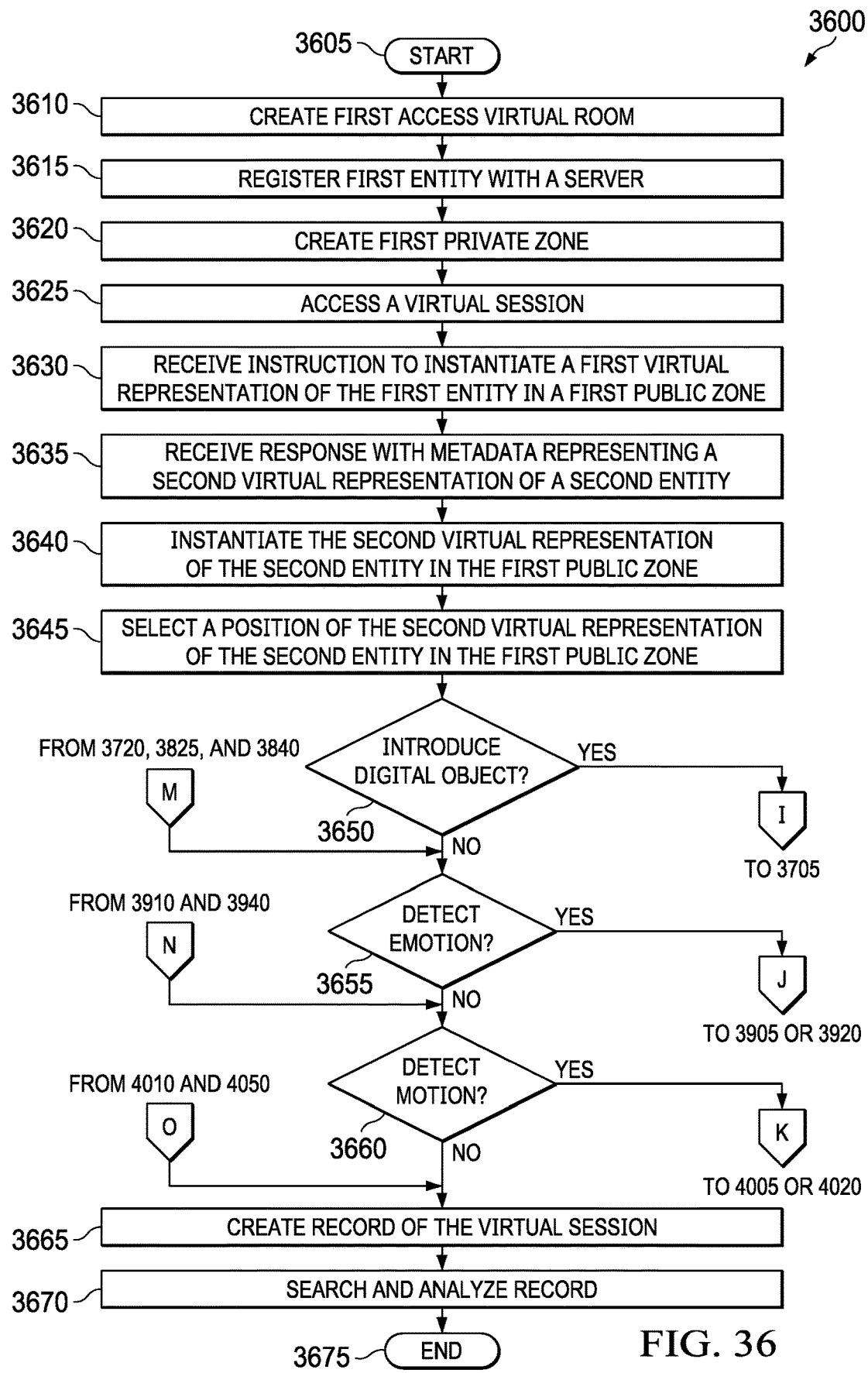
FIGS. 36 to 40 illustrate flow diagrams of an embodiment of a method of operating a communication system; and, FIGS. 41 to 46 illustrate flow diagrams of an embodiment of a method of operating a communication system.

Beginning with FIG. 36, the method 3600 begins at a start step or module 3605. At a step or module 3610, the first client (230) creates a first access virtual room (247), and registers the first entity (215) by providing information about the first entity (215) and metadata representing a first virtual representation (243) (e.g., an avatar) of the first entity (215) to the server (255) via the first access virtual room (247) at a step or module 3615. The second client (270) also registers the second entity (295) with the server (255) via a second access virtual room (267). The first access virtual room (247) is only accessible by the first entity (215), and the second access virtual room (267) is only accessible by the second entity (295). At a step or module 3620, the first client (230) creates a first private zone (246) within the first collaborative virtual room (241), which is only accessible by the first entity (215). The first private zone (246) may include a navigation zone. The second client (270) also creates a second private zone (266) within a second collaborative virtual room (261), which is only accessible by the second entity (295).

At a step or module 3625, the first client (230) accesses (e.g., initiates) a virtual session with the server (255), to which the second client (270) responds by joining the virtual session with the server (255). Of course, the first client (230) may access a virtual session by joining an existing virtual session, or in response to an invitation to join a new virtual session. The first client (230) then receives an instruction from the server (255) to instantiate the first virtual representation (243) of the first entity (215) in a first public zone (242) of the first collaborative virtual room (241) at a step or module 3630. Likewise, the second client (270) may receive an instruction from the server (255) to instantiate a second virtual representation (263) (e.g., an avatar) of the second entity (295) in a second public zone (262) of the second collaborative virtual room (261).

At a step or module 3635, the first client (230) receives a response from the server (255) including metadata representing the second virtual representation (263) of the second entity (295). Likewise, the second client (270) may receive a response from the server (255) including metadata representing the first virtual representation (243) of the first entity (215). The first client (230) thereafter instantiates the second virtual representation (263) in the first public zone (242) of the first collaborative virtual room (241) rendered from a perspective of the first entity (215) at a step or module 3640. Likewise, the second client (270) may instantiate the first virtual representation (243) in the second public zone (262) of the second collaborative virtual room (261) rendered from a perspective of the second entity (295).

At a step or module 3645, the first client (230) selects a position of the second virtual representation (263) in the first public zone (242) of the first collaborative virtual room (241). The position of the second virtual representation (263) in the first public zone (242) of the first collaborative virtual room (241) may be based on a role of the second entity (295). At a decisional step or module 3650, the communication system (200) determines if a digital object (218) will be introduced into the virtual session. If a digital object (218) will be introduced into the virtual session then the method 3600 continues to a step or module 3705 of FIG. 37, otherwise the method 3600 continues to a decisional step or module 3655.

Figure 37:
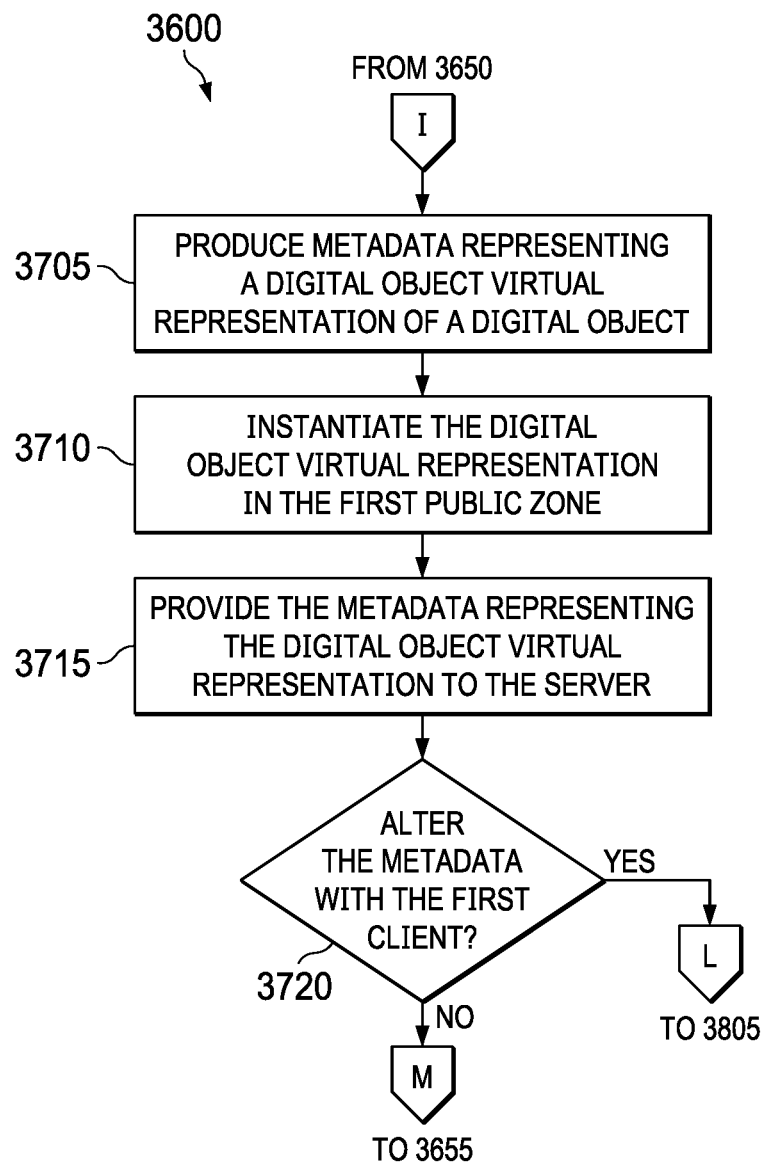

Turning now to FIG. 37 and the step or module 3705, the first client (230) produces metadata representing a digital object virtual representation (245A) of the digital object (218). At a step or module 3710, the first client (230) instantiates the digital object virtual representation (245A) in the first public zone (242) of the first collaborative virtual room (241) from a perspective of the first entity (215). The first client (230) then provides the metadata representing the digital object virtual representation (245A) to the server (255) at a step or module 3715. After receiving the metadata representing the digital object virtual representation (245A) from the server (255), the second client (270) may also instantiate the digital object virtual representation (245A) in the second public zone (262) of the second collaborative virtual room (261) from the perspective of the second entity (295).

At a decisional step or module 3720, the communication system (200) determines if the first client (230) will alter the metadata representing the digital object virtual representation (245A). If the first client (230) will alter the metadata then the method 3600 continues to a step or module 3805 of FIG. 38, otherwise the method 3600 transitions to the decisional step or module 3655 of FIG. 36.

Figure 38:
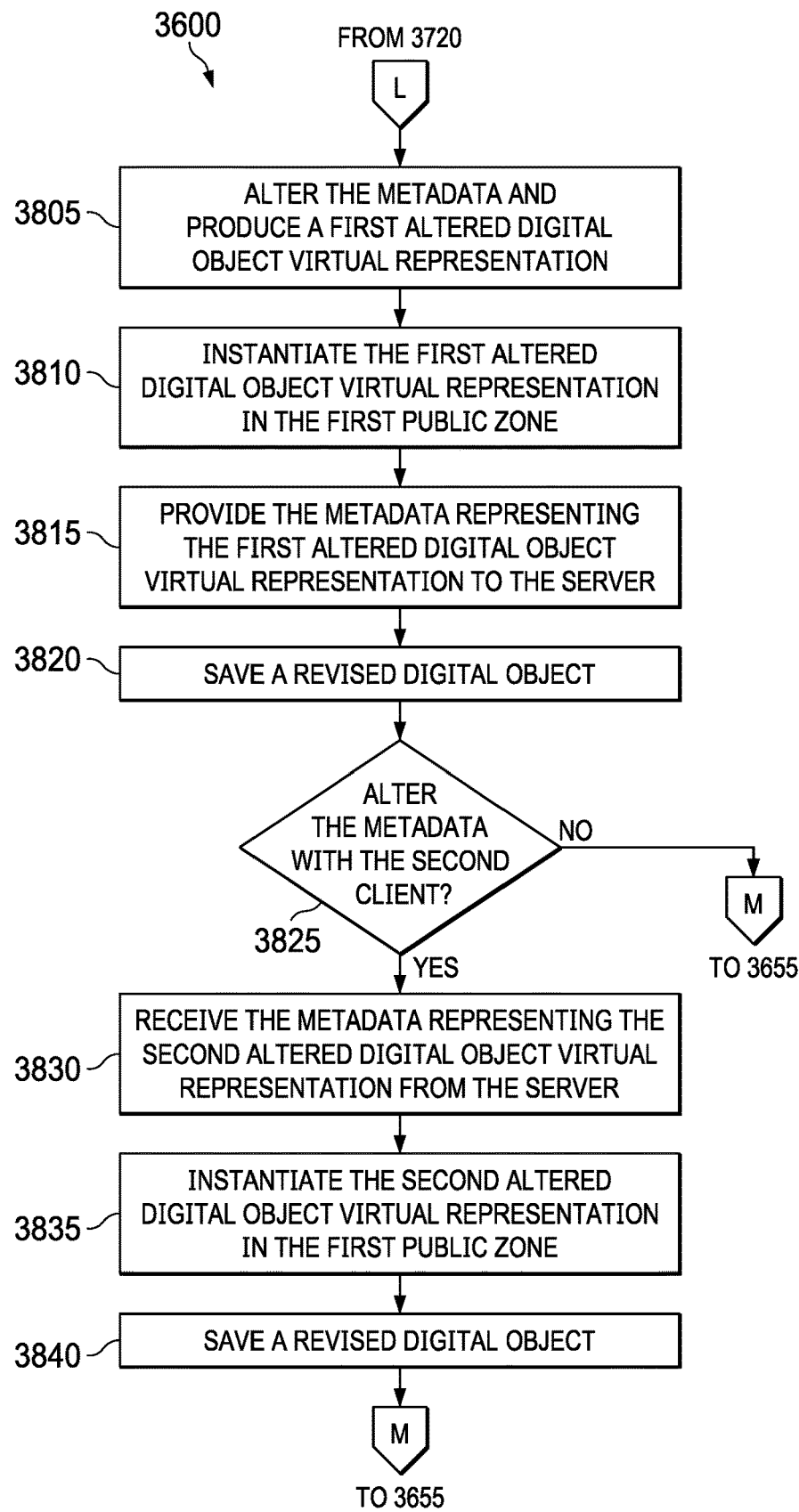

Turning now to FIG. 38 and the step or module 3805, the first client (230) alters the metadata representing the digital object virtual representation (245A), and produces a first altered digital object virtual representation (245B) of the digital object (218). At a step or module 3810, the first client (230) instantiates the first altered digital object virtual representation (245B) in the first public zone (242) of the first collaborative virtual room (241) from a perspective of the first entity (215). The first client (230) then provides the metadata representing the first altered digital object virtual representation (245B) to the server (255) at a step or module 3815. After receiving the metadata representing the first altered digital object virtual representation (245B) from the server (255), the second client (270) may also instantiate the first altered digital object virtual representation (245B) in the second public zone (262) of the second collaborative virtual room (261) from the perspective of the second entity (295). At a step or module 3820, the first client (230) then saves a revised digital object (218A) representing the first altered digital object virtual representation (245B) of the digital object (218) in, for instance, a native format. Of course, the revised digital object (218A) may be saved, without limitation, in memory (217, 297) associated with the first and second entities (215, 295), respectively, and/or memory (235, 275) of the first and second clients (230, 270) associated with the first and second entities (215, 295), respectively, and/or memory (257) of the server (255).

At a decisional step or module 3825, the communication system (200) determines if the second client (270) will alter the metadata representing the first altered digital object virtual representation (245B). If the second client (270) will not alter the metadata, the communication system (200) transitions to the step or module 3655 of FIG. 36. If the second client (270) will alter the metadata, the second client (270) alters the metadata representing the first altered digital object virtual representation (245B), and produces a second altered digital object virtual representation (245C) of the digital object (218). The second client (270) instantiates the second altered digital object virtual representation (245C) in the second public zone (262) of the second collaborative virtual room (261) from a perspective of the second entity (295). The second client (270) then provides the metadata representing the second altered digital object virtual representation (245C) to the server (255). At a step or module 3830, the first client (230) receives the metadata representing the second altered digital object virtual representation (245C) from the server (255), and instantiates the second altered digital object virtual representation (245C) in the first public zone (242) of the first collaborative virtual room (241) from the perspective of the first entity (215) at a step or module 3835. At a step or module 3840, the first client (230) then saves a revised digital object (218B) representing the second altered digital object virtual representation (245C) of the digital object (218) in, for instance, in a native format. Again, the revised digital object (218B) may be saved, without limitation, in memory (217) associated with the first entity (215), and/or memory (235) of the first client (230) associated with the first entity (215), and/or memory (257) of the server (255). Of course, revisions of the digital object (218) may take on several iterations between the first and second entities (215, 295) and other entities as well. The communication system (200) thereafter transitions to the step or module 3655 of FIG. 36.

At the decisional step or module 3655 of FIG. 36, the communication system (200) determines if an emotion (and/or emotions) is detected with respect to an entity such as the first entity (215) or the second entity (295). If an emotion is detected with respect to the first entity (215) then the method 3600 continues to a step or module 3905 of FIG. 39; if an emotion is detected with respect to the second entity (295) then the method 3600 continues to a step or module 3915 of FIG. 39; otherwise, the method 3600 continues to a decisional step or module 3660.

Figure 39:
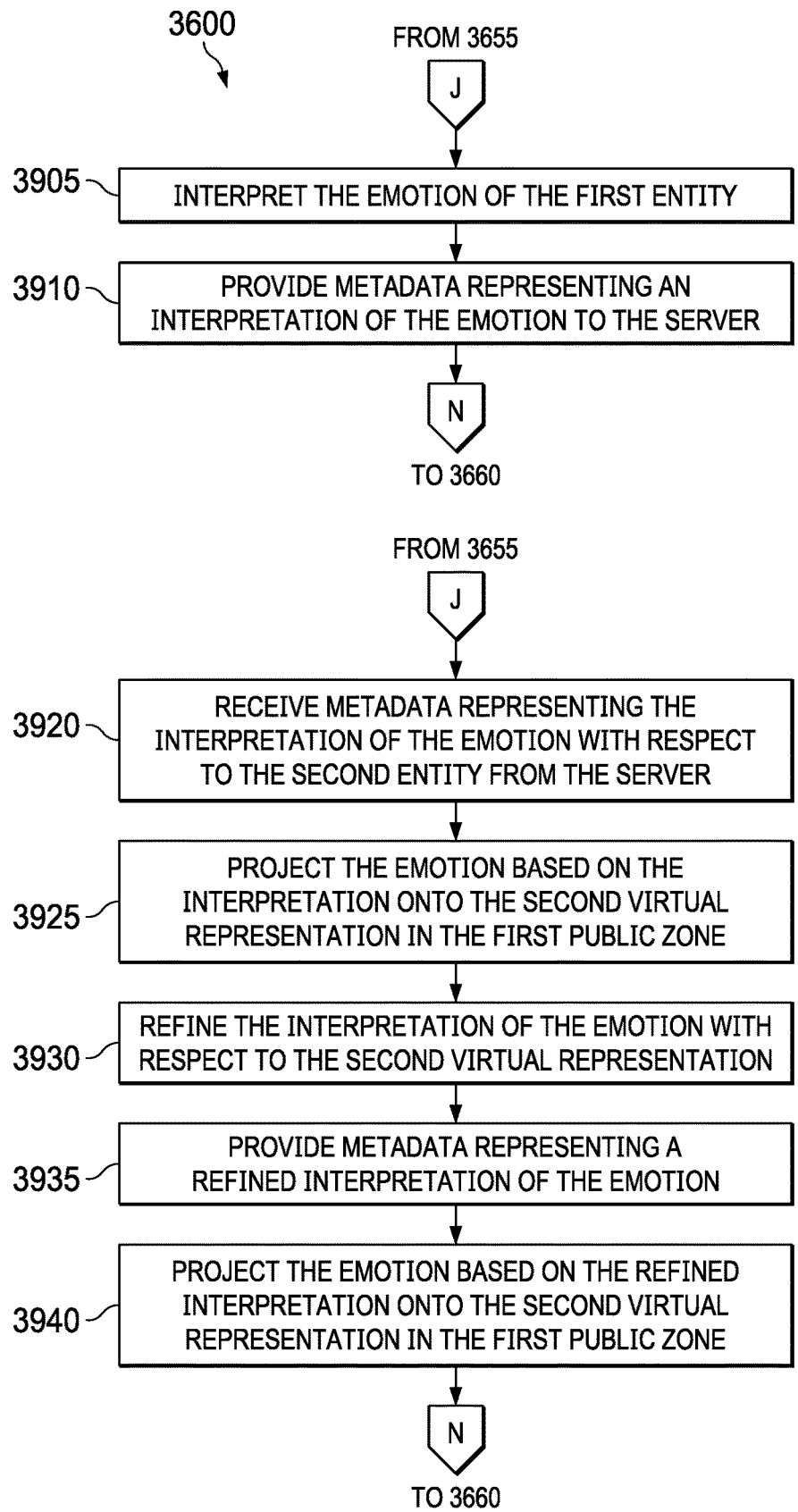

Turning now to FIG. 39, in response to the first coupler agent (220) detecting an emotion (and/or emotions) of the first entity (215), the first client (230) then interprets the emotion of the first entity (215) at the step or module 3905. At a step or module 3910, the first client (230) provides metadata representing an interpretation of the emotion with respect to the first virtual representation (243) of the first entity (215) to the server (255). The emotion may be an assentive emotion or a dissentive emotion. Thereafter, the method 3600 transitions to the decisional step or module 3660 of FIG. 36.

After the second client (270) interprets an emotion of the second entity (295) (detected by the second coupler agent (280)), the second client (270) provides metadata representing an interpretation of the emotion with respect to the second virtual representation (263) of the second entity (295) to the server (255). At a step or module 3920, the first client (230) receives metadata representing the interpretation of the emotion with respect to the second virtual representation (263) of the second entity (295) from the server (255). The first client (230) then projects the emotion based on the interpretation onto the second virtual representation (263) in the first public zone (242) of the first collaborative virtual room (241) rendered from the perspective of the first entity (215) at a step or module 3925.

At a step or module 3930, the first client (230) may refine the interpretation of the emotion with respect to the second virtual representation (263), and provide metadata representing a refined interpretation of the emotion with respect to the second virtual representation (263) of the second entity (295) at a step or module 3935. The first client (230) then projects the emotion based on the refined interpretation onto the second virtual representation (263) in the first public zone (242) of the first collaborative virtual room (241) rendered from the perspective of the first entity (215) at a step or module 3940. The emotion may be an assentive emotion or a dissentive emotion. Thereafter, the method 3600 returns to the decisional step or module 3660 of FIG. 36.

At the decisional step or module 3660 of FIG. 36, the communication system (200) determines if a motion (and/or gaze) is detected with respect to an entity such as the first entity (215) or the second entity (295). If a motion is detected with respect to the first entity (215) then the method 3600 continues at a step or module 4005 of FIG. 40; if a motion is detected with respect to the second entity (295) then the method 3600 continues at a step or module 4020 of FIG. 40; otherwise, the method 3600 continues to a step or module 3665.

Figure 40:
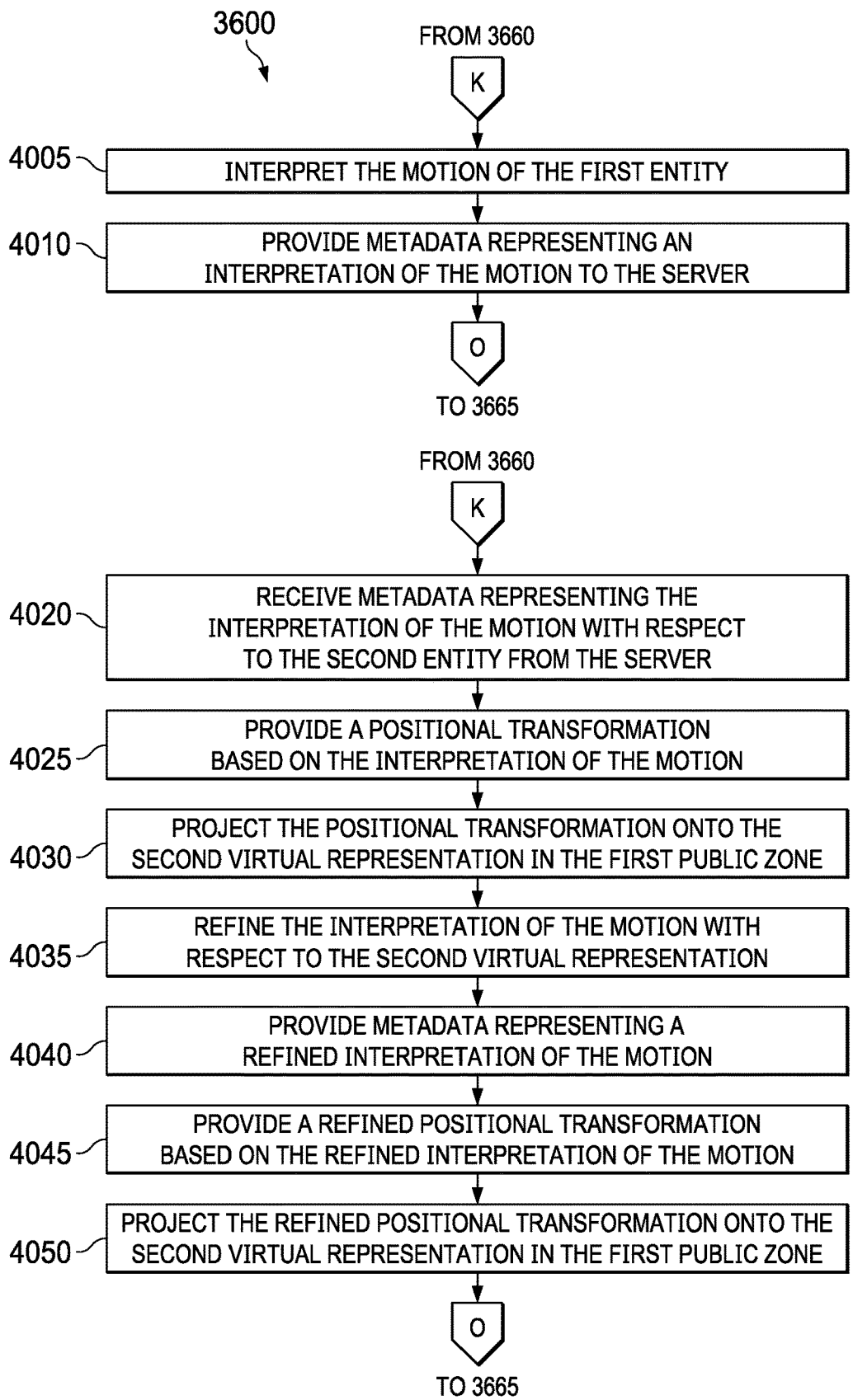

Turning now to FIG. 40, in response to the first coupler agent (220) detecting a motion (and/or gaze) of the first entity (215), the first client (230) interprets the motion of the first entity (215) at a step or module 4005. At a step or module 4010, the first client (230) provides metadata representing an interpretation of the motion with respect to the first virtual representation (243) of the first entity (215) to the server (255), and then transitions to the step or module 3665 of FIG. 36.

After the second client (270) interprets the motion of the second entity (295) (detected by the second coupler agent (280)), the second client (270) provides metadata representing an interpretation of the motion with respect to the second virtual representation (263) of the second entity (295) to the server (255). At a step or module 4020, the first client (230) receives metadata representing the interpretation of the motion with respect to the second virtual representation (263) of the second entity (295) from the server (255). The first client (230) then provides a positional transformation (and/or gaze orientation) based on the interpretation of the motion with respect to the second virtual representation (263) at a step or module 4025. At a step or module 4030, the first client (230) projects the positional transformation (and/or gaze orientation) onto the second virtual representation (263) in the first public zone (242) of the first collaborative virtual room (241) rendered from the perspective of the first entity (215).

At a step or module 4035, the first client (230) may refine the interpretation of the motion (and/or gaze) with respect to the second virtual representation (263), and provide metadata representing a refined interpretation of the motion with respect to the second virtual representation (263) of the second entity (295) at a step or module 4040. The first client (230) then provides a refined positional transformation (and/or gaze orientation) based on the refined interpretation of the motion with respect to the second virtual representation (263) at a step or module 4045. At a step or module 4050, the first client (230) then projects the refined positional transformation (and/or gaze orientation) onto the second virtual representation (263) in the first public zone (242) of the first collaborative virtual room (241) rendered from the perspective of the first entity (215). Thereafter, the method 3600 transitions to the step or module 3665 of FIG. 36.

At the step or module 3665 of FIG. 36, the communication system (200) creates a record (vRecord) of the virtual session between the first entity (215) and the second entity (295) with the server (255). The record may include all of the branches of the method 3600 as set forth above. It should be understood that the creation of the record is ongoing throughout the virtual session and at this point the term "create" includes finalizing, logging and/or storing the record of the virtual session. The method 3600 may further allow the first client (230) to search for and analyze information in the record at a step or module 3670. The method 3600 ends at a step or module 3675. While the steps, modules and branches of operating the communication system (200) have been described in the environment of a single method 3600, it should be understood that a method of operating the communication system (200) can be performed in separate methods performing only portions of the steps or modules (and/or re-ordered) as set forth above.

Additionally, the metadata representing the objects, actions, etc. allow the expansion of the virtual session to many participants.

Thus, a communication system including a client such as a first client (230) and method operating the same have been introduced herein. In one embodiment, the first client (230) is coupled to a first coupler agent (220) physically connectable to a first entity (215) and in communication with a server (255). The server (255) is in communication with a second client (270) coupled to a second coupler agent (280) physically connectable to a second entity (295). The first client (230) includes a processor (232), and a memory (235) including computer program code. The first client (230) is operable (or configured) to access (3025, 3625, e.g., initiate or join) a virtual session with the server (255), receive (3035, 3630) an instruction from the server (255) to instantiate a first virtual representation (243) of the first entity (215) in a first public zone (242) of a first collaborative virtual room (241), receive (3045, 3635) a response from the server (255) including metadata representing a second virtual representation (263) of the second entity (295), and instantiate (3055, 3640) the second virtual representation (263) in the first public zone (242) of the first collaborative virtual room (241) rendered from a perspective of the first entity (215).

The first client (230) is configured to create (3020, 3620) a first private zone (246) within the first collaborative virtual room (241), which is only accessible by the first entity (215). The first client (230) is configured to create (3010, 3610) a first access virtual room (247). The first client (230) is configured to register (3015, 3615) the first entity (215) by providing information about the first entity (215) and metadata representing the first virtual representation (243) of the first entity (215) to the server (255) via the first access virtual room (247). The first access virtual room (247) is only accessible by the first entity (215).

The first client (230) is configured to select (3065, 3645) a position of the second virtual representation (263) in the first public zone (242) of the first collaborative virtual room (241). The position of the second virtual representation (263) in the first public zone (242) of the first collaborative virtual room (241) is based on a role of the second entity (295).

The first client (230) is configured to produce (3105, 3705) metadata representing a digital object virtual representation (245A) of a digital object (218), instantiate (3110, 3710) the digital object virtual representation (245A) in the first public zone (242) of the first collaborative virtual room (241) from the perspective of the first entity (215), and provide (3115, 3715) the metadata representing the digital object virtual representation (245A) to the server (255). The first client (230) is configured to alter (3205, 3805) the metadata representing the digital object virtual representation (245A), and produce a first altered digital object virtual representation (245B) of the digital object (218), instantiate (3210, 3810) the first altered digital object virtual representation (245B) in the first public zone (242) of the first collaborative virtual room (241) from the perspective of the first entity (215), and provide (3215, 3815) metadata representing the first altered digital object virtual representation (245B) to the server (255). The first client (230) is configured to save (3230, 3820) a revised digital object (218A) representing the first altered digital object virtual representation (245B) of the digital object (218) in, for instance, a native format.

The first client (230) is configured to receive (3255, 3830) metadata representing a second altered digital object virtual representation (245C) of the digital object (218) from the server (255), and instantiate (3260, 3835) the second altered digital object virtual representation (245C) in the first public zone (242) of the first collaborative virtual room (241) from the perspective of the second entity (215). The first client (230) is configured to save (3265, 3840) a revised digital object (218B) representing the second altered digital object virtual representation (245C) of the digital object (218) in, for instance, a native format.

The first client (230) is configured to interpret (3410, 3905) an emotion of the first entity (215) detected by the first coupler agent (220), and provide (3415, 3910) metadata representing an interpretation of the emotion with respect to the first virtual representation (243) of the first entity (215) to the server (255). The emotion may be an assentive emotion or a dissentive emotion.

The first client (230) is also configured to receive (3420, 3920) metadata representing an interpretation of an emotion with respect to the second virtual representation (263) of the second entity (295) from the server (255), and project (3425, 3925) the emotion based on the interpretation onto the second virtual representation (263) in the first public zone (242) of the first collaborative virtual room (241) rendered from the perspective of the first entity (215). The first client (230) is configured to refine (3430, 3930) the interpretation of the emotion with respect to the second virtual representation (263), provide (3435, 3935) metadata representing a refined interpretation of the emotion with respect to the second virtual representation (263) of the second entity (295), and project (3440, 3940) the emotion based on the refined interpretation onto the second virtual representation (263) in the first public zone (242) of the first collaborative virtual room (241) rendered from the perspective of the first entity (215).

The first client (230) is configured to interpret (3510, 4005) a motion of the first entity (215) detected by the first coupler agent (220). The first client (230) is configured to provide (3515, 4010) metadata representing an interpretation of the motion with respect to the first virtual representation (243) of the first entity (215) to the server (255).

The first client (230) is configured to receive (3520, 4020) metadata representing an interpretation of a motion with respect to the second virtual representation (263) of the second entity (295) from the server (255), provide (3525, 4025) a positional transformation based on the interpretation of the motion with respect to the second virtual representation (263), and project (3530, 4030) the positional transformation onto the second virtual representation (263) in the first public zone (242) of the first collaborative virtual room (241) rendered from the perspective of the first entity (215). The first client (230) is configured to refine (3535, 4035) the interpretation of the motion with respect to the second virtual representation (263), and provide (3540, 4040) metadata representing a refined interpretation of the motion with respect to the second virtual representation (263) of the second entity (295). The first client (230) is configured to provide (3545, 4045) a refined positional transformation based on the refined interpretation of the motion with respect to the second virtual representation (263), and project (3550, 4050) the refined positional transformation onto the second virtual representation (263) in the first public zone (242) of the first collaborative virtual room (241) rendered from the perspective of the first entity (215).

The first client (230) is configured to search for and analyze (3095, 3670) information in a record of the virtual session in the server (255). The first virtual representation (243) and/or the second virtual representation (263) are presented as avatars. The first client (230) may be embodied in the first coupler agent (220, 310) and the second client (270) may be embodied in the second coupler agent (280, 320). Of course, the aforementioned actions may be performed by any client, server, etc. within a collaborative virtual session.

Turning now to FIGS. 41 to 46, illustrated are flow diagrams of an embodiment of a method 4100 of operating a communication system (200) such as a virtual reality ("VR") system. In addition to the method steps, the discussion of the method 4100 that follows will identify example elements (in parentheses) from preceding FIGUREs. The method 4100 will be described from a perspective of a server such as a server (255) of the communication system (200) and thus many actions performed by a first client (230) and a second client (270) of the communication system (200) will hereinafter be summarily described. Of course, analogous actions can be performed by any number of servers in the communication system (200). The first client (230) is coupled to a first coupler agent (220) physically connectable to a first entity (215) and in communication with the server (255). The server (255) is in communication with the second client (270) coupled to a second coupler agent (280) physically connectable to a second entity (295). The first client (230) may be embodied in the first coupler agent (220, 310) (or be discrete components), and the second client (270) may be embodied in the second coupler agent (280, 320) (or be discrete components).

Figure 41:
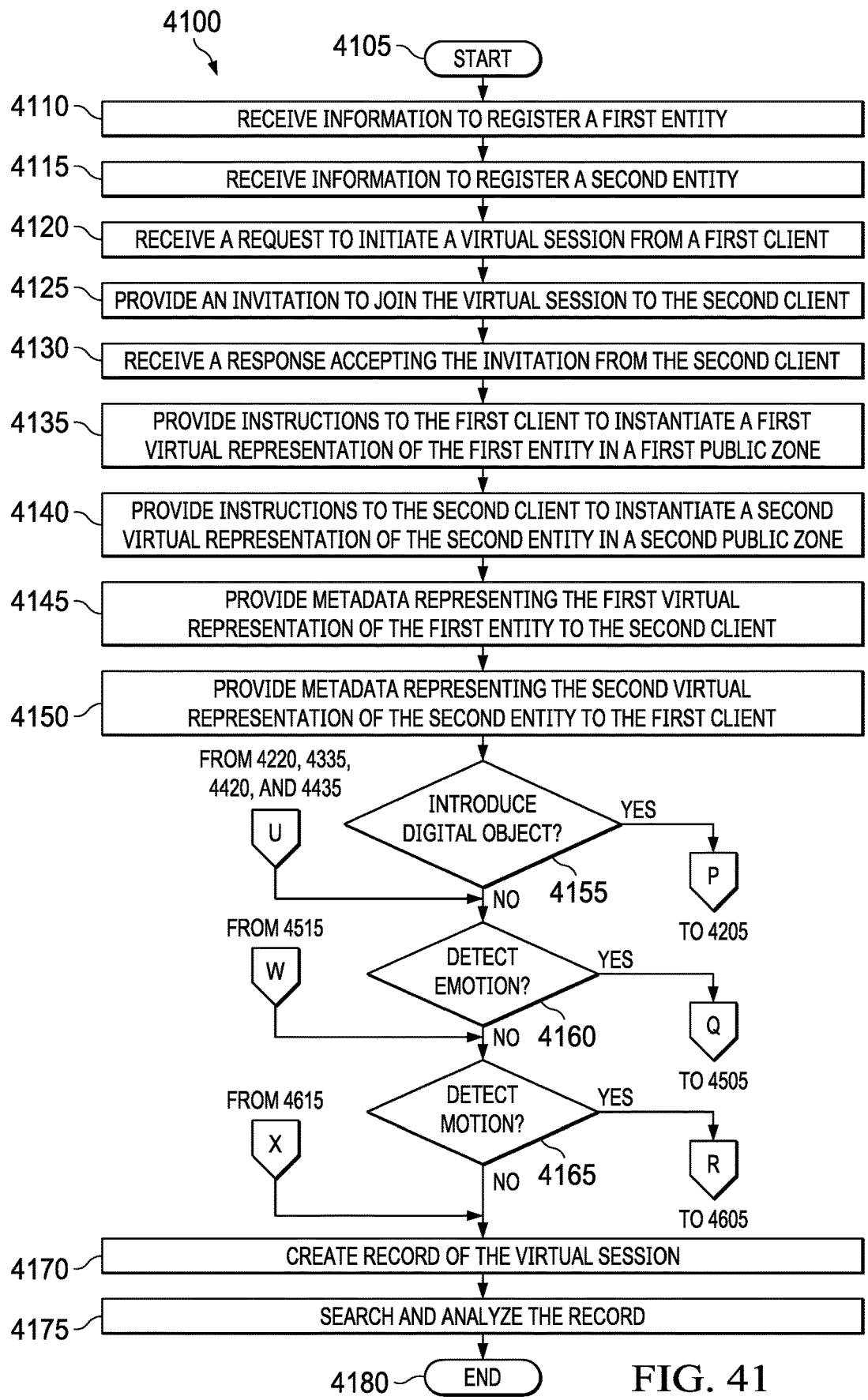

Beginning with FIG. 41, the method 4100 begins at a start step or module 4105. At a step or module 4110, the server (255) receives information about the first entity (215) and metadata representing a first virtual representation (243) (e.g., an avatar) of the first entity (215) to register the first entity (215). Likewise, the server (255) receives information about the second entity (295) and metadata representing a second virtual representation (263) (e.g., an avatar) of the second entity (295) to register the second entity (295) at a step or module 4115. At a step or module 4120, the server (255) receives a request to initiate a virtual session from the first client (230), and provides an invitation to join the virtual session to the second client (270) at a step or module 4125. At a step or module 4130, the server (255) receives a response accepting the invitation to join the virtual session from the second client (270), and provides an instruction to the first client (230) to instantiate the first virtual representation (243) of the first entity (215) in a first public zone (242) of a first collaborative virtual room (241) at a step or module 4135.

At a step or module 4140, the server (255) provides an instruction to the second client (270) to instantiate the second virtual representation (263) of the second entity (295) in a second public zone (262) of a second collaborative virtual room (261). The server (255) provides metadata representing the first virtual representation (243) of the first entity (215) to the second client (270) for instantiation in the second public zone (262) of the second collaborative virtual room (261) rendered from a perspective of the second entity (295) at a step or module 4145. At a step or module 4150, the server (255) provides metadata representing the second virtual representation (263) of the second entity (295) to the first client (230) for instantiation in the first public zone (242) of the first collaborative virtual room (241) rendered from a perspective of the first entity (215).

At a decisional step or module 4155, the communication system (200) determines if a digital object (218) will be introduced into the virtual session. If a digital object (218) will be introduced into the virtual session then the method 4100 continues to a step or module 4205 of FIG. 42, otherwise the method 4100 continues to a decisional step or module 4160.

Figure 42:
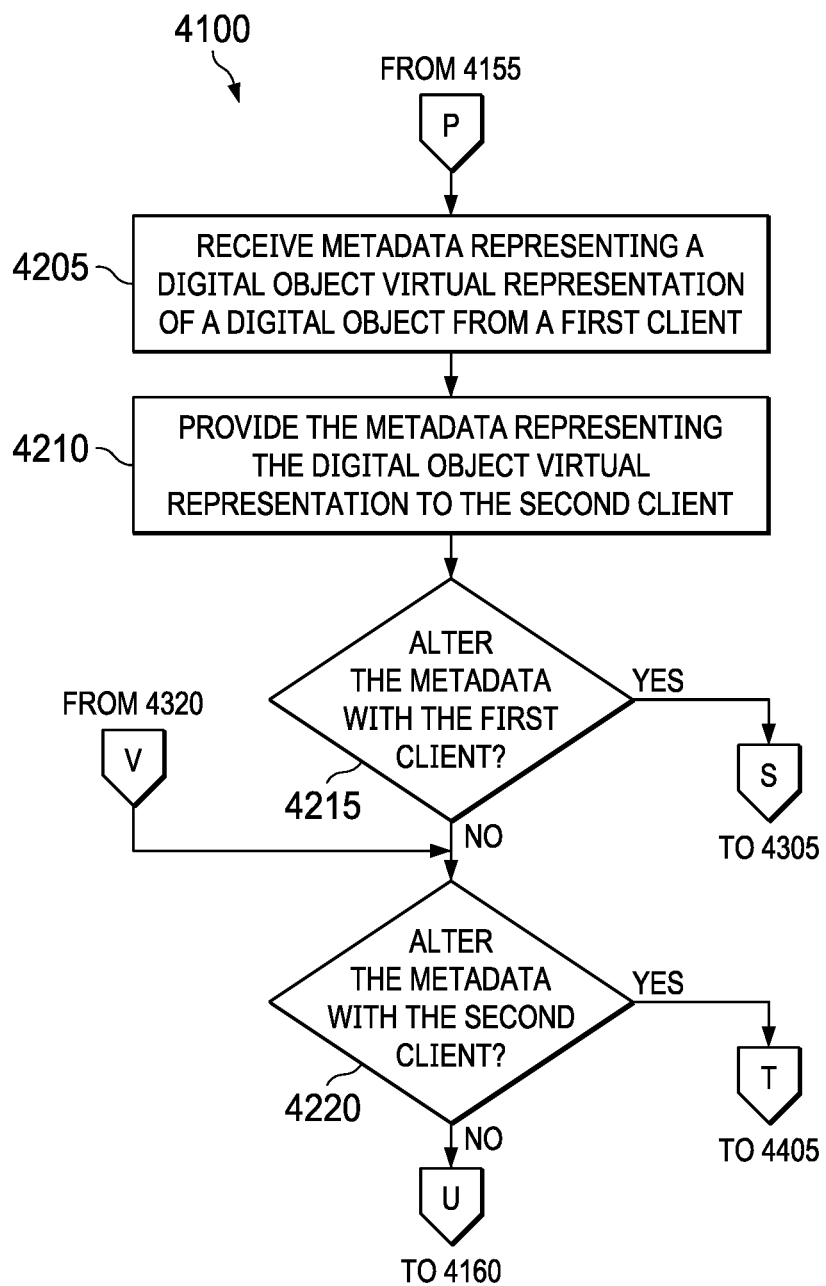

Turning now to FIG. 42 and the step or module 4205, the server (255) receives metadata representing a digital object virtual representation (245A) of a digital object (218) from the first client (230). In accordance therewith, the first client (230) instantiates the digital object virtual representation (245A) in the first public zone (242) of the first collaborative virtual room (241) from the perspective of the first entity (215). The server (255) provides the metadata representing the digital object virtual representation (245A) to the second client (270) for instantiation in the second public zone (262) of the second collaborative virtual room (261) rendered from the perspective of the second entity (295) at a step or module 4210.

At a decisional step or module 4215, the communication system (200) determines if the first client (230) will alter the metadata representing the digital object virtual representation (245A). If the first client (230) will alter the metadata then the method 4100 continues to a step or module 4305 of FIG. 43, otherwise the method 4100 transitions to the decisional step or module 4220.

Figure 43:
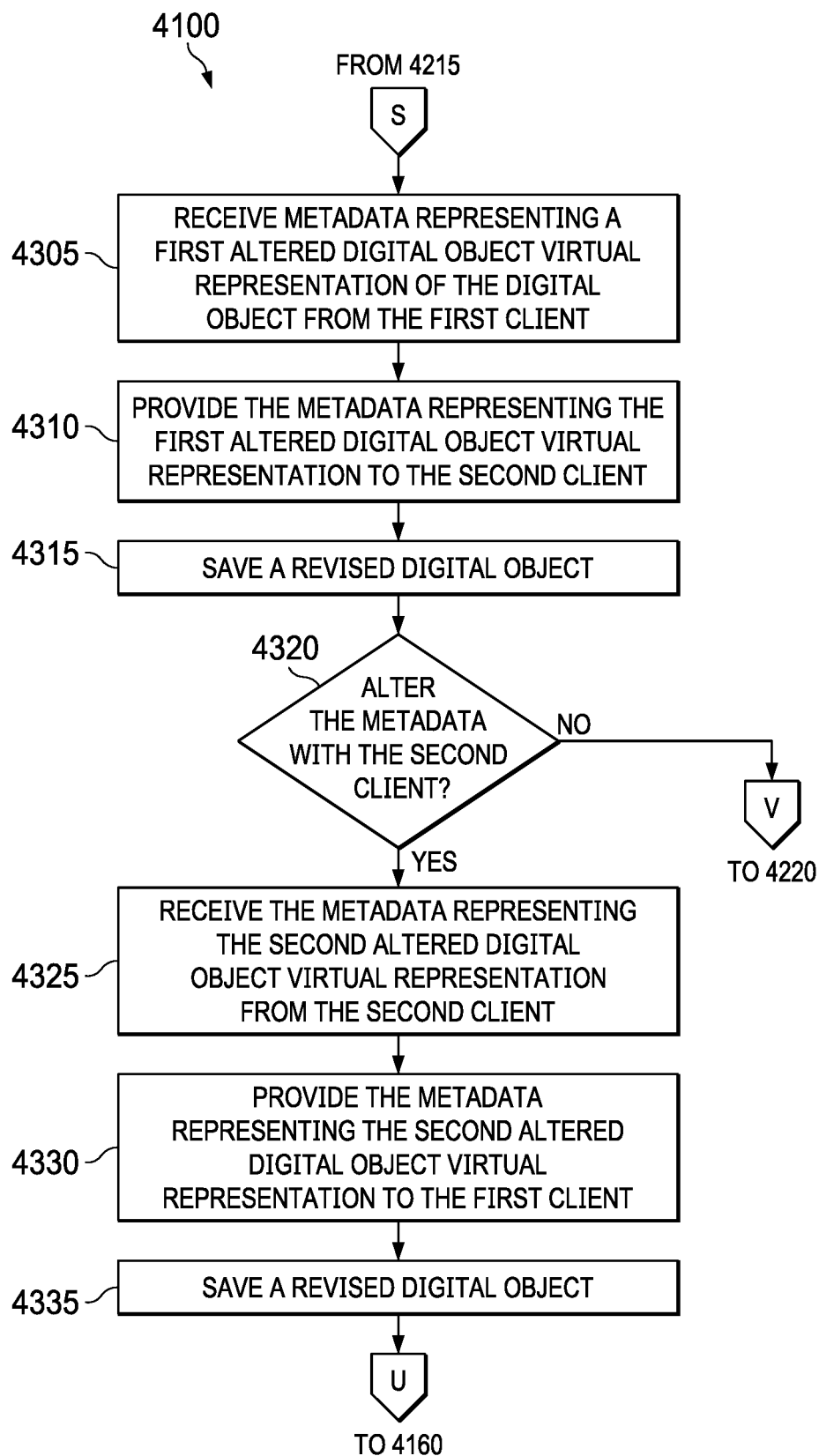

Turning now to FIG. 43 and the step or module 4305, the server (255) receives metadata representing a first altered digital object virtual representation (245B) of the digital object (218) from the first client (230). In accordance therewith, the first client (230) instantiates the first altered digital object virtual representation (245B) in the first public zone (242) of the first collaborative virtual room (241) from the perspective of the first entity (215). At a step or module 4310, the server (255) provides the metadata representing the first altered digital object virtual representation (245B) to the second client (270) for instantiation in the second public zone (262) of the second collaborative virtual room (261) rendered from the perspective of the second entity (295). At a step or module 4315, the server (255) then saves a revised digital object (218A) representing the first altered digital object virtual representation (245B) of the digital object (218) in, for instance, a native format. Of course, the revised digital object (218A) may be saved, without limitation, in memory (217, 297) associated with the first and second entities (215, 295), respectively, and/or memory (235, 275) of the first and second clients (230, 270) associated with the first and second entities (215, 295), respectively, and/or memory (257) of the server (255).

At a decisional step or module 4320, the communication system (200) determines if the second client (270) will alter the metadata representing the first altered digital object virtual representation (245B). If the second client (270) will alter the metadata then the method 4100 continues to a step or module 4325 of FIG. 43, otherwise the method 4100 transitions to the decisional step or module 4220 of FIG. 42.

At the step or module 4325, the server (255) receives metadata representing a second altered digital object virtual representation (245C) of the digital object (218) from the second client (270). In accordance therewith, the second client (270) instantiates the second altered digital object virtual representation (245C) in the second public zone (262) of the second collaborative virtual room (261) from the perspective of the second entity (295). At a step or module 4330, the server (255) provides the metadata representing the second altered digital object virtual representation (245C) to the first client (230) for instantiation in the first public zone (242) of the first collaborative virtual room (241) from the perspective of the first entity (215). At a step or module 4335, the server (255) then saves a revised digital object (218B) representing the second altered digital object virtual representation (245C) of the digital object (218) in, for instance, a native format. Of course, the revised digital object (218B) may be saved, without limitation, in memory (217, 297) associated with the first and second entities (215, 295), respectively, and/or memory (235, 275) of the first and second clients (230, 270) associated with the first and second entities (215, 295), respectively, and/or memory (257) of the server (255). Of course, revisions of the digital object (218) may take on several iterations between the first and second entities (215, 295) and other entities as well. The method 4100 then transitions to the decisional step or module 4160 of FIG. 41.

Returning to FIG. 42 and the decisional step or module 4220, the communication system (200) determines if the second client (270) will alter the metadata representing the digital object virtual representation (245A). If the second client (270) will alter the metadata then the method 4100 continues to a step or module 4405 of FIG. 44, otherwise the method 4100 transitions to the decisional step or module 4160 of FIG. 41.

Figure 44:
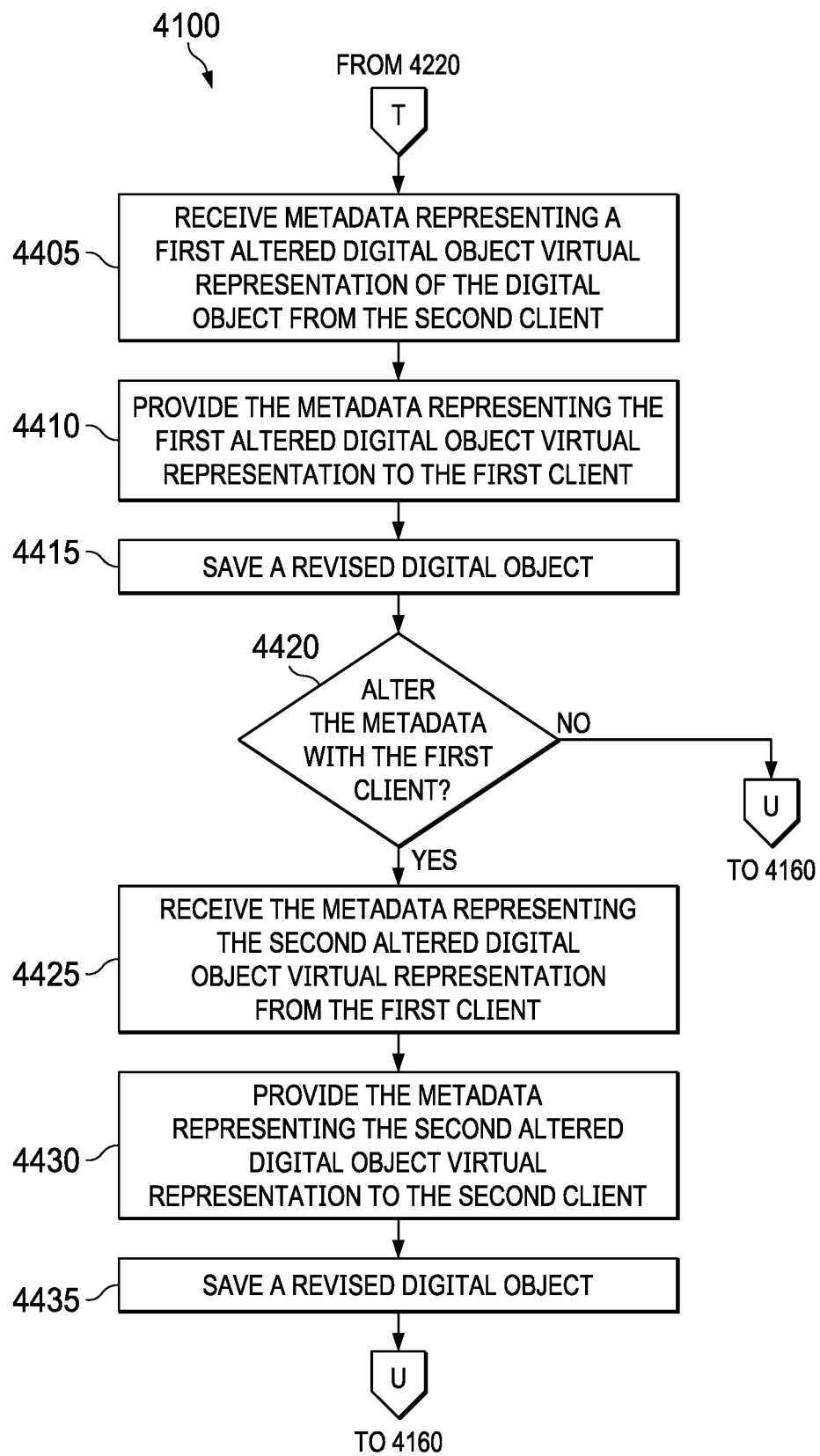

Turning now to FIG. 44 and the step or module 4405, the server (255) receives metadata representing a first altered digital object virtual representation (245B) of the digital object (218) from the second client (270). In accordance therewith, the second client (270) instantiates the first altered digital object virtual representation (245B) in the second public zone (262) of the second collaborative virtual room (261) from the perspective of the second entity (295). At a step or module 4410, the server (255) provides the metadata representing the first altered digital object virtual representation (245B) to the first client (270) for instantiation in the first public zone (242) of the first collaborative virtual room (241) rendered from the perspective of the first entity (215). At a step or module 4415, the server (255) then saves a revised digital object (218A) representing the first altered digital object virtual representation (245B) of the digital object (218) in, for instance, a native format. Of course, the revised digital object (218A) may be saved, without limitation, in memory (217, 297) associated with the first and second entities (215, 295), respectively, and/or memory (235, 275) of the first and second clients (230, 270) associated with the first and second entities (215, 295), respectively, and/or memory (257) of the server (255).

At a decisional step or module 4420, the communication system (200) determines if the first client (230) will alter the metadata representing the first altered digital object virtual representation (245B). If the first client (230) will alter the metadata then the method 4100 continues to a step or module 4425 of FIG. 44, otherwise the method 4100 transitions to the decisional step or module 4160 of FIG. 41.

At the step or module 4425, the server (255) receives metadata representing a second altered digital object virtual representation (245C) of the digital object (218) from the first client (270). In accordance therewith, the first client (270) instantiates the second altered digital object virtual representation (245C) in the first public zone (242) of the first collaborative virtual room (241) from the perspective of the first entity (215). At a step or module 4430, the server (255) provides the metadata representing the second altered digital object virtual representation (245C) to the second client (270) for instantiation in the second public zone (262) of the second collaborative virtual room (261) from the perspective of the second entity (295). At a step or module 4435, the server (255) then saves a revised digital object (218B) representing the second altered digital object virtual representation (245C) of the digital object (218) in, for instance, a native format. Of course, the revised digital object (218B) may be saved, without limitation, in memory (217, 297) associated with the first and second entities (215, 295), respectively, and/or memory (235, 275) of the first and second clients (230, 270) associated with the first and second entities (215, 295), respectively, and/or memory (257) of the server (255). Of course, revisions of the digital object (218) may take on several iterations between the first and second entities (215, 295) and other entities as well. The method 4100 then transitions to the decisional step or module 4160 of FIG. 41.

At the decisional step or module 4160 of FIG. 41, the communication system (200) determines if an emotion (and/or emotions) is detected with respect to an entity such as the first entity (215). If an emotion is detected with respect to the first entity (215) then the method 4100 continues to a step or module 4505 of FIG. 45, otherwise, the method 4100 continues to a decisional step or module 4165.

Figure 45:
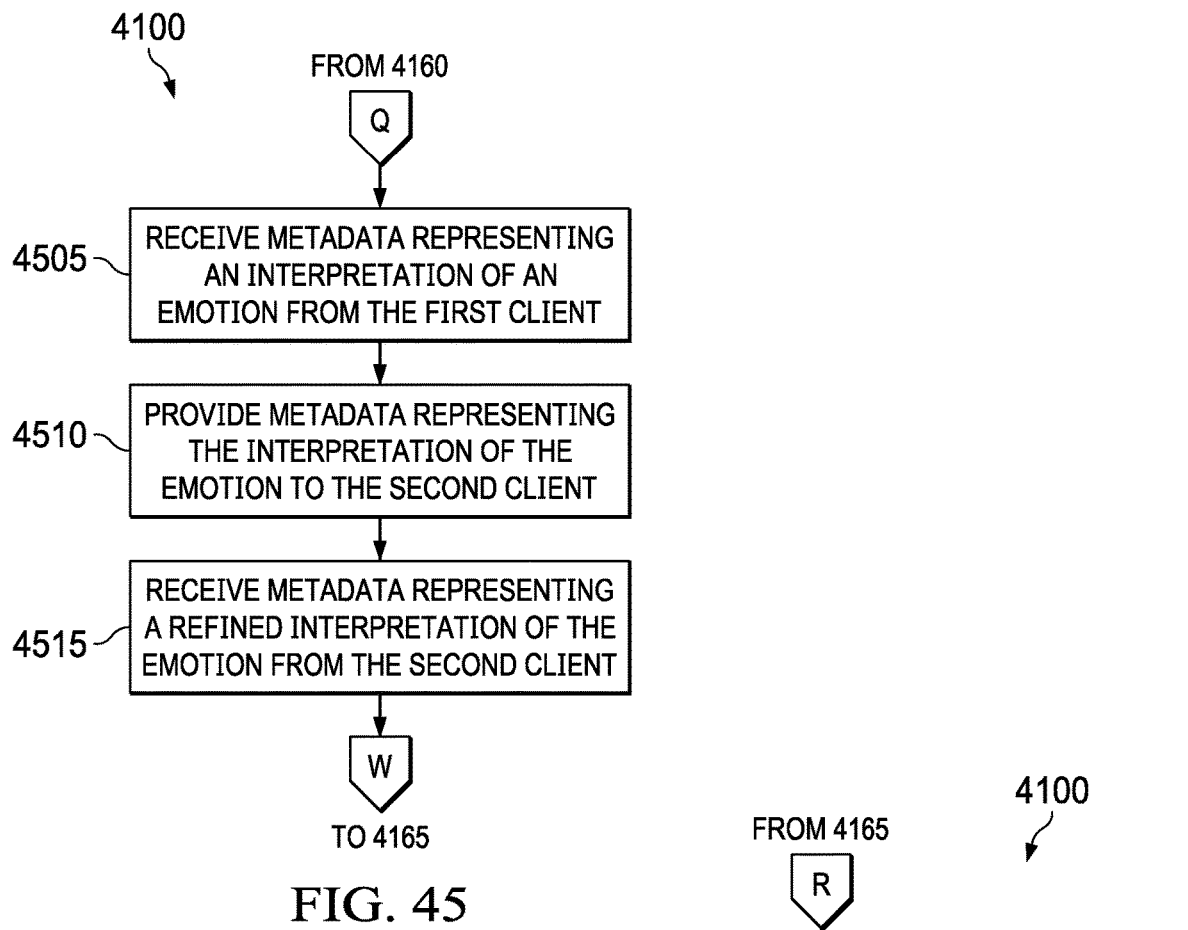

Turning now to FIG. 45 and the step or module 4505, in response to the first coupler agent (220) detecting an emotion (and/or emotions) of the first entity (215), the server (255) receives metadata representing an interpretation of the emotion with respect to the first virtual representation (243) of the first entity (215) from the first client (230). At a step or module 4510, the server (255) provides the metadata representing the interpretation of the emotion with respect to the first virtual representation (243) to the second client (270) to project the emotion based on the interpretation onto the first virtual representation (243) in the second public zone (262) of the second collaborative virtual room (261) from the perspective of the second entity (295). The emotion may be an assentive emotion or a dissentive emotion. At a step or module 4515, the server (255) receives metadata representing a refined interpretation of the emotion with respect to the first virtual representation (243) of the first entity (215) from the second client (270). In accordance therewith, the second client (270) can project the emotion based on the refined interpretation onto the first virtual representation (243) in the second public zone (262) of the second collaborative virtual room (261) rendered from the perspective of the second entity (295). Of course, the projection of emotions applies to other clients and entities as well. The method 4100 then transitions to the decisional step or module 4165 of FIG. 41.

At the decisional step or module 4165 of FIG. 41, the communication system (200) determines if a motion (and/or gaze) is detected with respect to an entity such as the first entity (215). If a motion is detected with respect to the first entity (215) then the method 4100 continues at a step or module 4605 of FIG. 46, otherwise, the method 4100 continues to a step or module 4170.

Figure 46:
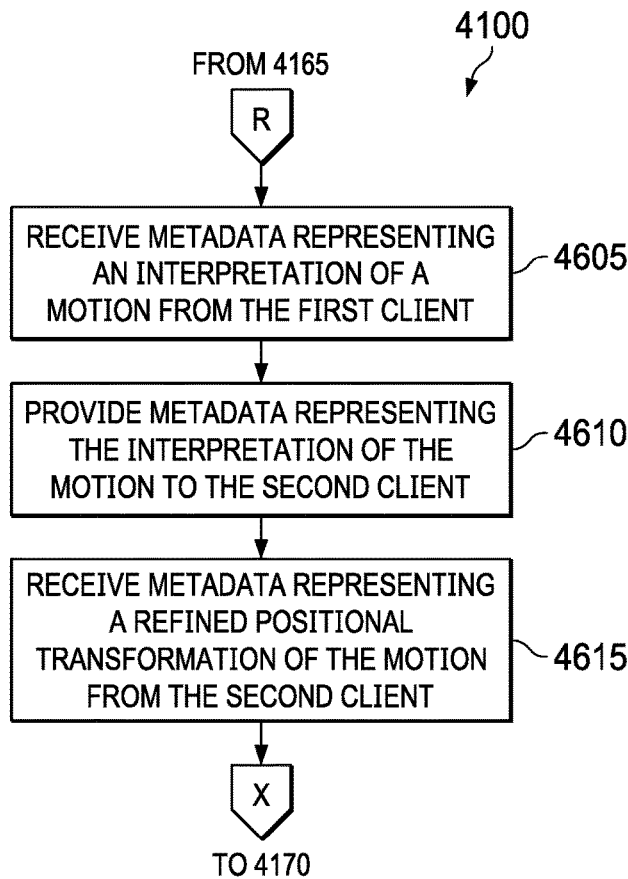

Turning now to FIG. 46 and the step or module 4605, in response to the first coupler agent (220) detecting a motion (and/or gaze) of the first entity (215), the server (255) receives metadata representing an interpretation of the motion with respect to the first virtual representation (243) of the first entity (215) from the first client (230). At a step or module 4610, the server (255) provides the metadata representing the interpretation of the motion with respect to the first virtual representation (243) to the second client (270) to project a positional transformation based on the interpretation of the motion onto the first virtual representation (243) in the second public zone (262) of the second collaborative virtual room (261) from the perspective of the second entity (295). At a step or module 4615, the server (255) receives metadata representing a refined positional transformation based on a refined interpretation of the motion with respect to the first virtual representation (243) from the second client (270). In accordance therewith, the second client (270) can project the refined positional transformation (and/or gaze orientation) onto the first virtual representation (243) in the second public zone (262) of the second collaborative virtual room (261) rendered from the perspective of the second entity (295). Thereafter, the method 4100 transitions to the step or module 4170 of FIG. 41.

At the step or module 4170 of FIG. 41, the server (255) creates a record (vRecord) of the virtual session between the first entity (215) and the second entity (295). The record may include all of the branches of the method 4100 as set forth above. It should be understood that the creation of the record is ongoing throughout the virtual session and at this point the term "create" includes finalizing, logging and/or storing the record of the virtual session. The method 4100 may further allow the server (255) to search for and analyze information in the record via a request from the first client (230) and/or the second client (270) at a step or module 4175. The method 4100 ends at a step or module 4180. While the steps, modules and branches of operating the communication system (200) have been described in the environment of a single method 4100, it should be understood that a method of operating the communication system (200) can be performed in separate methods performing only portions of the steps or modules (and/or re-ordered) as set forth above. Additionally, the metadata representing the objects, actions, etc. allow the expansion of the virtual session to many participants.

Thus, a communication system including a server such as a server (255) and method operating the same have been introduced herein. In one embodiment, the first client (230) is coupled to a first coupler agent (220) physically connectable to a first entity (215) and in communication with a server (255). The server (255) is in communication with a second client (270) coupled to a second coupler agent (280) physically connectable to a second entity (295). The server (255) includes a processor (256), and a memory (257) including computer program code. The server (255) is operable (or configured) to receive (4120) a request to initiate a virtual session from the first client (230), provide (4125) an invitation to join the virtual session to the second client (270), and receive (4130) a response accepting the invitation to join the virtual session from the second client (270). The server (255) is configured to provide (4135) an instruction to the first client (230) to instantiate a first virtual representation (243) of the first entity (215) in a first public zone (242) of a first collaborative virtual room (241), and provide (4140) an instruction to the second client (270) to instantiate a second virtual representation (263) of the second entity (295) in a second public zone (262) of a second collaborative virtual room (261). The server (255) is configured to provide (4145) metadata representing the first virtual representation (243) of the first entity (215) to the second client (270) for instantiation in the second public zone (262) of the second collaborative virtual room (261) rendered from a perspective of the second entity (295). The server (255) is configured to provide (4150) metadata representing the second virtual representation (263) of the second entity (295) to the first client (230) for instantiation in the first public zone (242) of the first collaborative virtual room (241) rendered from a perspective of the first entity (215).

The first virtual representation (243) and/or the second virtual representation (263) are presented as avatars. The first client (230) may be embodied in the first coupler agent (220, 310) and the second client (270) may be embodied in the second coupler agent (280, 320).

The server (255) is configured to receive (4110) information about the first entity (215) and metadata representing the first virtual representation (243) of the first entity (215) to register the first entity (215) with the server (255). The server (255) is configured to create (4170) a record of the virtual session between the first entity (215) and the second entity (295). The server (255) is configured to perform a search for and analyze (4175) information in the record.

The server (255) is configured to receive (4205) metadata representing a digital object virtual representation (245A) of a digital object (218) from the first client (230), and provide (4210) the metadata representing the digital object virtual representation (245A) to the second client (270) for instantiation in the second public zone (262) of the second collaborative virtual room (261) rendered from the perspective of the second entity (295). The server (255) is configured to receive (4305) metadata representing a first altered digital object virtual representation (245B) of the digital object (218) from the first client (230), and provide (4310) the metadata representing the first altered digital object virtual representation (245B) to the second client (270) for instantiation in the second public zone (262) of the second collaborative virtual room (261) rendered from the perspective of the second entity (295). The server (255) is configured to receive (4325) metadata representing a second altered digital object virtual representation (245C) of the digital object (218) from the second client (270), and provide (4330) the metadata representing the second altered digital object virtual representation (245C) to the first client (230) for instantiation in the first public zone (242) of the first collaborative virtual room (241) from the perspective of the first entity (215).

The server (255) is configured to receive (4405) metadata representing a first altered digital object virtual representation (245B) of the digital object (218) from the second client (270). The server (255) is configured to provide (4410) the metadata representing the first altered digital object virtual representation (245B) to the first client (230) for instantiation in the first public zone (242) of the first collaborative virtual room (241) from the perspective of the first entity (215).

The server (255) is configured to receive (4505) metadata representing an interpretation of an emotion with respect to the first virtual representation (243) of the first entity (215) from the first client (230), and provide (4510) the metadata representing the interpretation of the emotion with respect to the first virtual representation (243) to the second client (270) to project the emotion based on the interpretation onto the first virtual representation (243) in the second public zone (262) of the second collaborative virtual room (261) from the perspective of the second entity (295). The emotion may be an assentive emotion or a dissentive emotion. The server (255) is configured to receive (4515) metadata representing a refined interpretation of the emotion with respect to the first virtual representation (243) of the first entity (215) from the second client (270).

The server (255) is configured to receive (4605) metadata representing an interpretation of a motion with respect to the first virtual representation (243) of the first entity (215) from the first client (230), and provide (4610) the metadata representing the interpretation of the motion with respect to the first virtual representation (243) to the second client (270) to project a positional transformation based on the interpretation of the motion onto the first virtual representation (243) in the second public zone (262) of the second collaborative virtual room (261) from the perspective of the second entity (295). The server (255) is configured to receive (4615) metadata representing a refined positional transformation based on a refined interpretation of the motion with respect to the first virtual representation (243) from the second client (270). Of course, the aforementioned actions may be performed by any client, server, etc. within a collaborative virtual session.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A client device for participating in a collaborative virtual meeting in a locally instantiated virtual room, via a network, with a second client device, said client device associable with a first coupler agent for interfacing with a first entity associated with said client device and said second client device associable with a second coupler agent for interfacing with a second entity associated with said second client device, said client device comprising:
at least one processor and at least one memory, said memory containing instructions whereby, when executed by said processor, said client device is operable to:
establish a session with said second client device, said session providing a two-way communication link between said client device and said second client device through said network; and,
instantiate a virtual representation of a second entity as a function of metadata received from said second client device, from a perspective of a first entity, in said locally instantiated virtual room, wherein said metadata is received from said second client device via said session without said client device requesting said metadata from an intermediate server of said network.

2. The client device recited in claim 1, wherein said first coupler agent and said second coupler agent are integral with said first client device and said second client device, respectively.

3. The client device recited in claim 1, wherein said first coupler agent is physically couplable to said first entity and operable to interpret physical movements thereof, and said second coupler agent is physically couplable to said second entity and operable to interpret physical movements thereof.

4. The client device recited in claim 3, wherein each of said first coupler agent and said second coupler agent comprises a head-mounted display (HMD).

5. The client device recited in claim 4, wherein said HMD is operable to display said locally instantiated virtual room.

6. The client device recited in claim 1, wherein said client device initiates said collaborative virtual meeting with said second client device.

7. The client device recited in claim 6, wherein said session is established by sending a request from said client device to a server of said network, wherein said server hosts management functions that are operative, in response to said request, to send an invitation to said second client device to join said collaborative virtual meeting.

8. The client device recited in claim 7, wherein said client device and said second client device interact with said management functions hosted by said server to establish, maintain and terminate said session.

9. The client device recited in claim 1, wherein said client device is further operative to create a record of said collaborative virtual meeting.

10. The client device recited in claim 9, wherein said client device is further operative to search for and analyze information in said record.

11. The client device recited in claim 1, wherein said client device is further operative to transmit metadata representative of said first entity to said second client device via said session.

12. The client device recited in claim 1, wherein said client device is further operative to instantiate a virtual representation of said first entity in said locally instantiated virtual room.

13. The client device recited in claim 12, wherein said virtual representation of said first entity and said virtual representation of said second entity are presented as avatars.

14. A method of operating a client device for participating in a collaborative virtual meeting in a locally instantiated virtual room, via a network, with a second client device, said client device associable with a first coupler agent for interfacing with a first entity associated with said client device and said second client device associable with a second coupler agent for interfacing with a second entity associated with said second client device, said method comprising:

establishing a session with said second client device, said session providing a two-way communication link between said client device and said second client device through said network;

receiving metadata representative of said second entity from said second client device; and, instantiating a virtual representation of said second entity as a function of said metadata received from said second client device, from a perspective of a first entity, in said locally instantiated virtual room, wherein said metadata is received from said second client device via said session without said client device requesting said metadata from an intermediate server of said network.

15. The method recited in claim 14, wherein said first coupler agent is physically couplable to said first entity and operable to interpret physical movements thereof, and said second coupler agent is physically couplable to said second entity and operable to interpret physical movements thereof.

16. The method recited in claim 14, further comprising initiating said collaborative virtual meeting with said second client device.

17. The method recited in claim 16 wherein said session is established by sending a request from said client device to a server of said network, wherein said server hosts management functions that are operative, in response to said request, to send an invitation to said second client device to join said collaborative virtual meeting.

18. The method recited in claim 17, wherein said client device and said second client device interact with said management functions hosted by said server to establish, maintain and terminate said session.

19. The method recited in claim 14, further comprising transmitting metadata representative of said first entity to said second client device via said session.

20. The method recited in claim 14, further comprising instantiating a virtual representation of said first entity in said locally instantiated virtual room.

\* \* \* \* \*